United States Patent
Nguyen

(10) Patent No.: US 6,880,128 B2
(45) Date of Patent: Apr. 12, 2005

(54) EQUIPMENT INSPECTION AND EVALUATION SYSTEM, EQUIPMENT MANAGEMENT SYSTEM, AND COMPUTER-READABLE RECORD MEDIUM WITH EQUIPMENT MANAGEMENT PROGRAM STORED THEREIN

(75) Inventor: John H. Nguyen, Houston, TX (US)

(73) Assignee: TLV Company, Limited, Hyogo-Ken (JP)

(*) Notice: Subject to any disclaimer, the term of this patent is extended or adjusted under 35 U.S.C. 154(b) by 539 days.

(21) Appl. No.: 09/768,959

(22) Filed: Jan. 24, 2001

(65) Prior Publication Data

US 2001/0007093 A1 Jul. 5, 2001

Related U.S. Application Data

(62) Division of application No. 09/115,354, filed on Jul. 14, 1998, now Pat. No. 6,728,659.

(30) Foreign Application Priority Data

| Jul. 15, 1997 | (JP) | 9-207321 |
| Jul. 15, 1997 | (JP) | 9-207322 |
| Jul. 15, 1997 | (JP) | 9-207323 |
| Jul. 22, 1997 | (JP) | 9-212581 |
| Jul. 22, 1997 | (JP) | 9-212582 |

(51) Int. Cl.[7] .............................................. G06F 15/00
(52) U.S. Cl. ..................................... 715/744; 715/736
(58) Field of Search ............................... 715/736, 741, 715/744, 764; 345/763, 762, 765, 744, 781

(56) References Cited

U.S. PATENT DOCUMENTS

| 3,283,304 A | 11/1966 | Sinn et al. |
| 4,112,494 A | 9/1978 | Elliott et al. |
| 4,253,157 A | 2/1981 | Kirschner et al. |
| 4,318,184 A | 3/1982 | Millett et al. |
| 4,644,529 A | 2/1987 | Amstutz et al. |
| 4,657,727 A | 4/1987 | Mlynczak et al. |
| 4,727,750 A | 3/1988 | Yonemura |
| 4,788,849 A | 12/1988 | Yonemura et al. |
| 4,811,252 A | 3/1989 | Furuse |
| 4,898,022 A | 2/1990 | Yumoto et al. |
| 4,921,113 A | 5/1990 | Dubach |

(Continued)

FOREIGN PATENT DOCUMENTS

| EP | 0 597 467 | 5/1994 |
| EP | 0 745 916 | 12/1996 |
| JP | 2-8914 | 1/1990 |
| JP | 05 282576 | 10/1993 |
| JP | 06 347379 | 12/1994 |
| JP | 07-152430 | 6/1995 |
| JP | 07 281 728 | 10/1995 |

(Continued)

OTHER PUBLICATIONS

Merriam–Webster's Collegiate Dictionary: Tenth Edition, 1993, page 1218.

Primary Examiner—Cao Nguyen
(74) Attorney, Agent, or Firm—Kenyon & Kenyon

(57) ABSTRACT

An equipment inspecting and evaluating system can be used to inspect and evaluate steam traps by detecting a level of vibrations of each trap and the surface temperature of the housing of that trap. The detected vibration level and temperature are used to determine whether or not steam is leaking through that trap and to what extent steam leakage is. An equipment management system is connected to the inspection and evaluation system by a data transmission cable and receives inspection data of the traps from the inspection and evaluation system. The management system analyzes the received inspection data for computing the number of defective traps, the ratio of defective traps to the entire traps, the loss caused by steam leakage, etc.

14 Claims, 33 Drawing Sheets

U.S. PATENT DOCUMENTS

| | | | |
|---|---|---|---|
| 4,937,821 A | 6/1990 | Boulton | |
| 4,991,087 A | 2/1991 | Burkowski et al. | |
| 4,998,472 A | 3/1991 | Rodi et al. | |
| 5,005,142 A | 4/1991 | Lipchak et al. | |
| 5,047,960 A | 9/1991 | Sloan | |
| 5,067,094 A | 11/1991 | Hayes | |
| 5,093,911 A | 3/1992 | Parks et al. | |
| 5,223,207 A | 6/1993 | Gross et al. | |
| 5,235,525 A | 8/1993 | Bybee | |
| 5,249,140 A | 9/1993 | Kessler | |
| 5,290,110 A | 3/1994 | Takahashi | |
| 5,311,562 A | 5/1994 | Palusamy et al. | |
| 5,329,465 A | 7/1994 | Arcella et al. | |
| 5,347,623 A | 9/1994 | Takano et al. | |
| 5,425,270 A | 6/1995 | McDonald et al. | |
| 5,457,640 A | 10/1995 | Foller et al. | |
| 5,526,268 A * | 6/1996 | Tkacs et al. | 704/8 |
| 5,530,643 A * | 6/1996 | Hodorowski | 700/86 |
| 5,535,136 A | 7/1996 | Standifer | |
| 5,550,737 A | 8/1996 | Tedeschi | |
| 5,581,752 A | 12/1996 | Inoue et al. | |
| 5,636,144 A | 6/1997 | Kurtzberg et al. | |
| 5,708,909 A * | 1/1998 | Yamashita et al. | 399/10 |
| 5,745,899 A | 4/1998 | Burrows | |
| 5,768,578 A | 6/1998 | Kirk et al. | |
| 5,799,299 A | 8/1998 | Fujiwara | |
| 5,887,171 A | 3/1999 | Tada et al. | |
| 5,943,236 A | 8/1999 | Ohno et al. | |
| 6,002,868 A | 12/1999 | Jenkins et al. | |
| 6,049,827 A * | 4/2000 | Sugauchi et al. | 709/223 |

FOREIGN PATENT DOCUMENTS

| | | |
|---|---|---|
| JP | 08-004993 | 1/1996 |
| JP | 08-241116 | 9/1996 |
| JP | 08 314 537 | 11/1996 |
| JP | 09 114518 | 5/1997 |

* cited by examiner

| Trap Code | Model | Manufacturer | Trap Type | Processing Data D |
|---|---|---|---|---|
| 0001 | AAA | PQR | DISC | $D_1$ |
| 0002 | BBB | PQR | BUCKET | $D_2$ |
| 0003 | CCC | STU | DISC | $D_3$ |
| 0004 | DDD | STU | FLOAT | $D_4$ |
| 0005 | EEE | XYZ | FLOAT | $D_5$ |
| ⋮ | ⋮ | ⋮ | ⋮ | ⋮ |

| Data Name | Format | Size |
|---|---|---|
| STX | Hex code | 1byte |
| Area No. | Dec | 3bytes |
| Trap No. | Dec | 5bytes |
| Trap Model | Dec | 4bytes |
| Trap Type | Dec | 1byte |
| Inspection Date | Dec | 8bytes |
| Judgment | Dec | 2bytes |
| Application | Dec | 2bytes |
| Operational Pressure | Dec | 3bytes |
| Priority | Dec | 2bytes |
| ⋮ | ⋮ | ⋮ |
| User Original Data | Dec | 3bytes |
| Check Sum | Hex | 4bytes |
| ETB | Hex code | 1byte |
| CR | Hex code | 1byte |

FIG.12

| Area | Trap | Model | Trap Type | Inspection Date | Evaluation | Application | Pressure | Priority |
|---|---|---|---|---|---|---|---|---|
| 001 | 00001 | ABC | BUCKET | 07/18/1997 | Good | Heating | 0-50 | Important |
| 001 | 00002 | CDE | THERMO | 07/18/1997 | Good | Heating | 0-50 | Important |
| 001 | 00003 | EFG | TEMP.ADJ. | 07/18/1997 | Leak/M | Heating | 0-50 | Important |
| 001 | 00004 | GHI | TEMP.ADJ. | 07/18/1997 | Good | Heating | 0-50 | Important |
| 001 | 00005 | JKL | FLOAT | 06/30/1997 | Fail Adjust | Heating | 0-50 | Important |
| 001 | 00006 | GHI | TEMP.ADJ. | 06/30/1997 | Not Inspected | Heating | 0-50 | Important |
| 001 | 00007 | EFG | TEMP.ADJ. | 06/30/1997 | Leak/L | Heating | 0-50 | General |
| 001 | 00008 | CDE | THERMO | 06/30/1997 | Good | Heating | 0-50 | General |
| 001 | 00009 | CDE | THERMO | 01/18/1997 | Leak/S | Heating | 0-50 | General |
| 001 | 00010 | GHI | TEMP.ADJ. | 01/18/1997 | Good | Heating | 0-50 | General |
| 001 | 00011 | CDE | THERMO | 01/18/1997 | Good | Heating | 0-50 | General |
| 001 | 00012 | LMN | DISC | 01/18/1997 | Good | Drip | 50-150 | Important |
| --- | --- | --- | --- | --- | --- | --- | --- | --- |

| Area | Result | Trap | Model | Trap Type | Inspection Date | Application | Pressure | Loss($) |
|---|---|---|---|---|---|---|---|---|
| 001 | Defective | 00005 | JKL | FLOAT | 06/30/1997 | Heating | 0-50 | 0.00 |
| | | 00007 | EFG | TEMP.ADJ. | 06/30/1997 | Heating | 0-50 | 4.00 |
| | Not Inspected | 00006 | GHI | TEMP.ADJ. | 06/30/1997 | Heating | 0-50 | 0.00 |
| | Good | 00001 | ABC | BUCKET | 07/18/1997 | Heating | 0-50 | 0.00 |
| | | 00002 | CDE | THERMO | 07/18/1997 | Heating | 0-50 | 0.00 |
| | | 00003 | EFG | TEMP.ADJ. | 07/18/1997 | Heating | 0-50 | 2.00 |
| | | 00004 | GHI | TEMP.ADJ. | 07/18/1997 | Heating | 0-50 | 0.00 |
| | | 00008 | CDE | THERMO | 06/30/1997 | Heating | 0-50 | 0.00 |
| | | 00009 | CDE | THERMO | 01/18/1997 | Heating | 0-50 | 1.00 |
| | | 00010 | GHI | TEMP.ADJ. | 01/18/1997 | Heating | 0-50 | 0.00 |
| | | 00011 | CDE | THERMO | 01/18/1997 | Heating | 0-50 | 0.00 |
| | | 00012 | LMN | DISC | 01/18/1997 | Drip | 50-150 | 0.00 |
| ... | | ... | ... | ... | ... | ... | ... | ... |

| Code | Name | Comments |
|---|---|---|
| 0 | PPP | XXX-1 |
| 1 | QQQ | XXX-2 |
| 2 | RRR | XXX-3 |
| 3 | SSS | YYY-1 |
| 4 | TTT | YYY-2 |
| 5 | UUU | YYY-3 |

User 1 — 71    72

Edit Code - End User 1

Code : 5    73a / 73b / 23a
73

Name : UUU — 74

Comments : YYY-3
75

76 — OK        Cancel — 77

FIG.17 (b)

| Area | Trap | Model | Processing Data | Manufacturer | Month of Use | User-1 | Note |
|---|---|---|---|---|---|---|---|
| 001 | 00001 | ABC | D11 | PQR | 0-12 | PPP | ******** |
| 001 | 00002 | CDE | D12 | XYZ | 0-12 | PPP | ******** |
| 001 | 00003 | EFG | D13 | XYZ | 0-12 | PPP | ******** |
| 001 | 00004 | GHI | D14 | PQR | 0-12 | PPP | |
| 001 | 00005 | JKL | D15 | PQR | 0-12 | PPP | ******** |
| 001 | 00006 | GHI | D14 | PQR | 0-12 | PPP | |
| 001 | 00007 | EFG | D13 | XYZ | 12-24 | QQQ | |
| 001 | 00008 | CDE | D12 | XYZ | 12-24 | QQQ | ******** |
| 001 | 00009 | CDE | D12 | XYZ | 12-24 | QQQ | ******** |
| 001 | 00010 | GHI | D14 | PQR | 12-24 | SSS | |
| 001 | 00011 | CDE | D12 | XYZ | 12-24 | SSS | |
| 001 | 00012 | LMN | D16 | PQR | 0-12 | UUU | ******** |
| --- | --- | --- | --- | --- | --- | --- | --- |

EQUIPMENT INSPECTION AND EVALUATION SYSTEM, EQUIPMENT MANAGEMENT SYSTEM, AND COMPUTER-READABLE RECORD MEDIUM WITH EQUIPMENT MANAGEMENT PROGRAM STORED THEREIN

RELATED APPLICATION(S)

This application is a divisional of patent application Ser. No. 09/115,354, filed Jul. 14, 1998 now U.S. Pat. No. 6,728,659.

FIELD OF THE INVENTION

This invention relates to an equipment inspection and evaluation system for inspecting and evaluating constituent devices of equipment, e.g. steam traps forming parts of a piping system of steam-utilizing equipment. This invention relates also to an equipment management system for managing such equipment on the basis of various information including evaluation of the equipment made by such equipment inspection and evaluation system, and, in particular, to such an equipment management system using a computer.

BACKGROUND OF THE INVENTION

A steam trap is an automatic valve which automatically drains and removes condensate from steam lines of steam-utilizing equipment of a plant without permitting steam to escape from the lines. If any one of such steam traps fails to operate normally, for example, when steam leaks through the steam trap or the valve becomes inoperative, the efficiency of the plant decreases and, in some cases, the entire plant malfunctions. It is, therefore, important to periodically inspect and evaluate individual steam traps to maintain the steam-utilizing equipment.

In general, steam-utilizing equipment includes a large number of steam traps, and evaluation of them requires a great deal of work and time, and, hence, great cost. Furthermore, in order to make the inspection, evaluation and maintenance of steam traps reliable, information on the equipment, including the results of the evaluation of individual steam traps, should be centrally managed so that operating states of the individual steam traps as part of the entire equipment can be determined.

Accordingly, an object of the present invention is to provide an equipment inspection and evaluation system which can efficiently inspect and evaluate individual devices forming parts of equipment, e.g. steam traps of steam-utilizing equipment.

Another object of the present invention is to provide an equipment management system which can reliably and efficiently manage information about individual devices, e.g. steam traps, including results of evaluation made by the equipment inspection and evaluation system.

Still another object of the present invention is to provide a record medium with an equipment management program stored therein for use in realizing a computerized equipment management system.

SUMMARY OF THE INVENTION

According to the present invention, an equipment inspection and evaluation system for inspecting and evaluating individual devices forming the equipment includes a main memory section in which a plurality of inspection data processing sequences for processing data obtained by inspecting respective ones of a plurality of devices forming the equipment are stored. The system includes also an auxiliary memory section. A sequence storage control section receives at least one externally applied sequence storage command, selects one of the inspection data processing sequences stored in the main memory section corresponding to the received at least one sequence storage command, and stores the selected inspection data processing sequence in the auxiliary memory section. The system includes further a sequence calling section which receives an externally applied sequence calling command corresponding to one of the devices, and selects the inspection data processing sequences stored in the auxiliary memory section corresponding to the received sequence calling command. An inspection data processing section receives inspection data obtained by actual inspection of the one device, processes the received inspection data to evaluate the inspected one device in accordance with the inspection data processing sequence for the one device called by the sequence calling section, and outputs the results of the processing.

The main memory section contains inspection data processing sequences for substantially all of commercially available devices, e.g. steam traps, which means that a large number of inspection data processing sequences are stored in the main memory section.

The inspection data processing section processes data obtained by inspecting a particular device to evaluate the operation of that particular device on the basis of the inspection data processing sequence for that particular device. In other words, different sequences are employed for different devices. Accordingly, reliable evaluation of devices can be made.

These inspection data processing sequences are stored in the main memory section. Since there are a number of such sequences, it is not easy to locate a desired one out of them.

The sequence storage control section selects only ones of the inspection data processing sequences in the main memory section for devices to be evaluated and stores the selected sequences in the auxiliary memory section. The selection and storage in the auxiliary memory section of inspection data processing sequences are done in response to the sequence storage commands applied to the sequence storage control section. When a particular device is to be evaluated, the sequence calling section calls a desired processing sequence corresponding to that particular device stored in the auxiliary memory section. Thus, a desired sequence can be selected from a smaller number of sequences, so that the selection is easier.

The devices forming the equipment may be of a plurality of different types, and the auxiliary memory section may include a plurality of storage regions for the respective types of the devices. The sequence storage control section causes the inspection data processing sequence corresponding to each sequence storage command to be stored in the storage region of the auxiliary memory section for the type of the device to be evaluated in accordance with that inspection data processing sequence. The sequence calling command comprises a combination of a type selection command for selecting a desired one of the types of the devices and a sequence selection command for selecting a desired one of the inspection data processing sequences. The sequence calling section selects one of the storage regions corresponding to the type selected in response to the type selection command, and calls a desired one of the inspection data processing sequences stored in the selected storage region corresponding to the sequence selection command.

The auxiliary memory section is divided into plural storage regions. Inspection data processing sequences to be stored in the auxiliary memory section are sorted in accordance with types of the devices corresponding to the respective inspection data processing sequences, and are stored in the storage regions for the respective types. The sequence calling section first selects the storage region for the type in accordance with a type selection command, e.g. the type of the device to be evaluated. The sequence calling section then calls the inspection data processing sequence corresponding to the sequence selection command, i.e. the sequence for the device to be evaluated, from the processing sequences stored in the selected storage regions. The region from which the inspection data processing sequences are selected is further subdivided.

According to an aspect of the present invention, an equipment inspection and evaluation system is provided for inspecting and evaluating a plurality of devices, including at least one trap and at least one valve, forming equipment, which includes a sequence memory section having stored therein a trap inspection and evaluation sequence to be executed for inspecting and evaluating a trap in a piping system. The sequence memory section has further stored therein a valve inspection and evaluation sequence to be executed for inspecting and evaluating a valve in the piping system. A sequence selecting section selects one of the trap and valve evaluation sequences in response to an externally applied sequence selection command corresponding to a device to be inspected and evaluated. The system further includes a device inspecting and evaluating section for inspecting and evaluating a device in accordance with the inspection and evaluation sequence selected by the sequence selecting section.

The term "trap" used in the specification of this application represents a steam trap disposed in steam lines, an air trap in compressed air piping or a gas trap disposed in gas piping, for example. Also, the term "valve" used herein represents a manually operable valve, an automatic valve or a pressure-regulating valve, for example.

The sequence memory section contains a trap inspection and evaluation sequence for use in inspecting and evaluating traps, and a valve inspection and evaluation sequence for use in inspecting and evaluating valves. When the sequence selection command for selecting the trap inspection and evaluation sequence is externally applied to the sequence selecting section, the sequence selecting section selects the trap inspection and evaluation sequence, and the device inspecting and evaluating section inspects and evaluates a trap in accordance with the selected trap inspection and evaluation sequence. For inspection and evaluation of valves, the sequence selection command for valves is applied, and the sequence selecting section selects the valve inspection and evaluation sequence, according to which the device inspecting and evaluating section inspects and evaluates valves. Accordingly, with a single inspection and evaluation system, reliable inspection and evaluation of both traps and valves can be made.

According to another feature of the invention, there is provided an equipment inspection and evaluation system for inspecting and evaluating equipment including a plurality of devices including at least one trap and at least one valve. The system includes a sequence memory section having stored therein a trap inspection and evaluation sequence to be executed for inspecting and evaluating the trap in a piping system and a valve inspection and evaluation sequence to be executed for inspecting and evaluating the valve in the piping system. A sequence selecting section selects either of the trap and valve inspection and evaluation sequence in response to an externally applied sequence selection command corresponding to devices to be inspected and evaluated. The system includes also a device inspecting and evaluating section having first and second inspection and evaluation modes which can alternate with each other. The device inspecting and evaluating section makes inspection and evaluation of devices in one of the first and second inspection and evaluation modes selected in response to an externally applied mode selection command. When in the first mode, the device inspecting and evaluating section inspects and evaluates devices in accordance with the inspection and evaluation sequences selected by the sequence selecting section. The device inspecting and evaluating section, when in the second mode, inspects and evaluates a predetermined number, e.g. two, of traps or valves (or inspects and evaluates the same trap or valve a predetermined number of times, twice in the present case) in accordance with the selected one of the inspection and evaluation sequences selected by the sequence selecting section and, then, inspects and evaluates the same number, i.e. two in this case, of valves or traps (or inspects and evaluates the same valve or trap the same number of times, i.e. twice) in accordance with the other evaluation sequence. The alternation of the modes is done automatically.

The sequence memory section contains a trap inspection and evaluation sequence and a valve inspection and evaluation sequence. Assuming that only traps are to be inspected and evaluated, a sequence selection command for selecting the trap inspection and evaluation sequence is applied together with a mode selection command for selecting the first inspection and evaluation mode. The sequence selecting section selects the trap inspection and evaluation sequence, and the device inspecting and evaluating section inspects and evaluates the traps in accordance with the trap inspection and evaluation sequence.

On the other hand, if only valves should be evaluated, a sequence selection command for selecting the valve inspection and evaluation sequence together with a mode selection command for selecting the first inspection and evaluation mode is applied. Then, the sequence selecting section selects the valve inspection and evaluation sequence, and the device inspecting and evaluating section inspects and evaluates the valves in accordance with the valve inspection and evaluation sequence.

For evaluating both traps and valves, the sequence selection command for selecting devices to be evaluated first, e.g. traps, is applied to the system together with the mode selection command for selecting the second inspection and evaluation mode. Then, the sequence selecting section selects the trap inspection and evaluation sequence, and the device inspecting and evaluating section inspects and evaluates a predetermined number, e.g. two, of traps in accordance with the trap inspection and evaluation sequence. When the inspection and evaluation of the predetermined number of traps is finished, the device inspecting and evaluating section starts inspection and evaluation of the same number, i.e. two in this case, of valves in accordance with the valve inspection and evaluation sequence. After that, the inspection and evaluation of traps and the inspection and evaluation of valves may be done alternately until a desired number of traps and valves are inspected and evaluated. It should be noted that instead of inspecting and evaluating a predetermined number of devices, the same device can be inspected and evaluated the predetermined number of times.

If the inspection and evaluation of valves should be done first, the sequence selection command for selecting the valve inspection and evaluation sequence is applied first.

The equipment inspection and evaluation section of the equipment inspection and evaluation system may include a vibration detecting section for detecting vibrations occurring in each device. The vibration detecting section provides vibration representative data representing the detected vibrations. The inspection and evaluation section includes also a detection data processing section, which receives the vibration representative data from the vibration detecting section and processes the received vibration representative data in accordance with the inspection and evaluation sequence being currently executed. The trap inspection and evaluation sequence causes the detection data processing section to process the vibration representative data in accordance with a stored correlation between the amount of leakage of a fluid being regulated by each trap and the magnitude of vibrations of that trap caused by the fluid leakage, to thereby compute the amount of fluid leakage through that trap. The valve inspection and evaluation sequence causes the detection data processing section to compute the magnitude of vibrations in each valve from the vibration representative data.

The term "fluid" used herein represents steam when traps and valves are used in steam lines, for example. For traps and valves used in piping for compressed air, the fluid is compressed air. If traps and valves are used in piping for a gas, the gas is the "fluid".

According to the above-described system, when a fluid leaks through a trap, the amount of leakage of fluid is computed from the magnitude or level of ultrasonic vibrations produced in the trap, more specifically, the housing of the trap, due to the fluid leakage. The computation is done on the basis of the fact that the magnitude or level of vibrations of a trap and the amount of leakage of the fluid correlate to each other. For evaluating traps in accordance with the trap inspection and evaluation sequence, the vibration detecting section detects vibrations generated in the trap housing and provides detected vibration representative data representing the detected vibrations. The data from the vibration detecting section is processed in the detection data processing section to compute the amount of the leakage of the fluid.

The inspection and evaluation of valves in accordance with the valve inspection and evaluation sequence is based on the fact that leakage of a fluid through a valve generates ultrasonic vibrations in the valve or valve housing. The vibration detecting section detects vibrations of the valve housing and provides detected vibration representative data, which is processed in the detection data processing section to compute the magnitude or level of the vibrations.

Usually, valves are subject to minute vibrations caused by background noise. According to the present invention, whether vibrations occurring in valves are caused by background noise or by leakage of a fluid can be determined from the vibration level computed by the detection data processing section.

The device equipment inspection and evaluation system of the present invention may include a vibration detecting section detecting vibrations generated in the devices and providing vibration representative data representing detected vibrations, a temperature detecting section detecting the temperature of the devices and providing temperature representative data representing detected temperatures, and a detection data processing section receiving the vibration representative data and the temperature representative data and processing the received data in accordance with that one of the inspection and evaluation sequences which is being currently employed. The trap inspection and evaluation sequence causes the detection data processing section to process the vibration and temperature representative data in accordance with a stored correlation between the amount of leakage of a fluid being regulated by a trap and the magnitude of vibrations of the trap caused by the fluid leakage and the temperature of the trap, to thereby compute the amount of fluid leakage through the trap. The valve inspection and evaluation sequence causes the detection data processing section to compute the magnitude of vibrations in a valve from at least the vibration representative data.

According to this feature, the amount of leakage of a fluid in a trap is computed from the level of the detected vibrations in accordance with the trap inspection and evaluation sequence, on the basis of the correlation existing between the amount of leakage and the level of ultrasonic vibrations generated in the trap by the leakage of the fluid. Strictly speaking, however, the correlation between the vibration level and the amount of fluid leakage depends on the pressure of the fluid in the trap. The fluid pressure in the trap and the temperature of the trap correlate to each other. Accordingly, the temperature of the trap is detected by the temperature detecting section, and the detected temperature representative data is processed in the detection data processing section to derive indirectly the fluid pressure within the trap. The amount of fluid leakage is computed by processing the detected vibration representative data on the basis of the correlation, with the fluid pressure being a parameter.

On the other hand, the inspection and evaluation of valves is based on ultrasonic vibrations generated in the valves by the fluid leakage through the valves. The detection data processing section processes the detected vibration representative data in accordance with the valve inspection and evaluation sequence to compute the magnitude of the vibrations occurring in the valve. According to the feature being discussed, in addition to the detected vibration representative data, the detected temperature representative data representing the temperature of the valve is supplied to the detection data processing section. The surface temperature of the valve can be known by processing the detected temperature representative data in the detection data processing section.

The invention is also directed to an equipment management system. The equipment management system includes a classifying section and an analyzing section. The classifying section classifies a predetermined number of types of evaluation results obtained by inspecting and evaluating individual ones of plural devices forming equipment into a plurality of grades including first and second grades. The analyzing section analyzes the classified evaluation results.

The first and second grades may represent normal operation (GOOD) of a device and a failure (DEFECTIVE) of a device, respectively.

According to this invention, whether evaluation results should be classified as GOOD or DEFECTIVE can be determined in the classifying section arbitrarily, for example, in accordance with the management plan of a person running the equipment. The analyzing section analyzes the evaluation results as classified in the classifying section. The person who is operating the equipment can freely determine the standard according to which the respective devices of the equipment are judged to be normal or defective, and, therefore, maintenance and management of the equipment can be made in a manner desired by the person operating the equipment.

This invention also provides a computer-readable record medium in which an equipment management program is recorded. The equipment management program is executed to operate a computer to perform a classification sequence for classifying evaluation results obtained by inspecting and evaluating individual devices forming equipment into a plurality of grades including first and second grades. The computer is also caused to perform an analyzing sequence for analyzing the evaluation results as classified in accordance with the classification sequence.

The record medium may be a flexible disc (FD), a hard disc, a magnetic tape, a CD-ROM, a magneto-optical (MO) disc, a digital versatile disc (DVD), or a paper tape.

The first and second grades may represent normal operation (GOOD) of a device and a failure (DEFECTIVE) of a device, respectively.

According to the present invention, an equipment management system is provided, which includes a detailed data storage section having recorded therein detailed data of a plurality of devices forming equipment. The data are sorted on the basis of at least one predetermined basic item common to all the devices. The system further includes an item adding section through which any desired additional item common to all the devices for managing the devices can be added to the detailed data storage section. A data entry section is used to add data relating to the added item of the devices, and a management data processing section processes the detailed data and added data which are stored in the detailed data storage section.

The detailed data storage section has stored therein detailed data of a plurality of devices forming equipment. The detailed data includes data of at least one predetermined basic item common to all the devices and is sorted and stored on an item-by-item basis. The system also includes an item adding section through which any desired additional item common to all the devices necessary for managing the devices can be additionally set in the detailed data storage section. Additional data relating to the added item of the devices are entered through a data entry section. The management data processing section processes the detailed and additional data which are stored in the detailed data storage section, for managing the equipment.

According to the present invention there is provided an equipment management system for managing equipment including a plurality of devices forming equipment, which includes a terminal apparatus and a management apparatus. The terminal apparatus includes a terminal memory section, a management item setting section setting, in the terminal memory section, a desired management item common to the devices, a data entry section for entering data relating to the set management items, and a data transmitting section transmitting the data entered for the respective management items. The management apparatus includes a main memory in which detailed data of the respective devices are stored, being sorted on the basis of at least one basic management item common to all the devices, a data receiving section receiving data transmitted from the data transmitting section of the terminal memory section, an adding section through which the data and corresponding management item received by the receiving section are additionally stored in the main memory section, and a management data processing section processing the added data added by the adding section and the detailed data stored in the main memory section.

The main memory section of the management apparatus has stored therein detailed data of the respective devices relating to the basic management items common to all the devices. A separate management item common to the devices can be added by, for example, a person who is managing the equipment, through the terminal apparatus. The added item is transmitted to the management apparatus and additionally set in the main memory section. The detailed data relating to the respective basic management items and the data relating to the added management item of the devices are processed for the management of the respective devices.

According to the present invention, there is provided a record medium having recorded therein an equipment management program which is executed by a computer to manage devices forming equipment. The equipment managing program causes the computer to execute a management item adding sequence. The management item adding sequence is for additionally setting in a detailed data memory section (in which detailed data, relating to at least one basic management item common to all the devices of the respective devices, is stored) an additional management item common to the devices. The program also causes the computer to execute a data entry sequence for entering additional data relating to the additional management item of the respective devices. The computer also executes, in accordance with the equipment managing program, a management data processing sequence for processing the detailed and additional data stored in the detailed data memory section.

The present invention can also provide a record medium having recorded therein an equipment management program which is executed by a computer to manage devices forming equipment, to make the computer execute a receiving sequence for receiving, from a terminal apparatus, data relating to management items common to all the devices. The computer also executes, in accordance with the equipment management program, an adding sequence for adding the data and management items received in accordance with the receiving sequence to a main memory section of a management apparatus, in which detailed data of the respective devices sorted on the basis of at least one basic management item common to the devices has been stored. Also, the computer executes a management data processing sequence for processing the data added in accordance with the adding sequence and the detailed data stored in the main memory section for managing the devices of the equipment.

According to another feature of the present invention, there is provided an equipment management system for managing devices forming equipment, which includes a detailed data memory section, a display section having a display screen, a first display control section, a symbol selecting section, and a second display control section. The detailed data memory section has stored therein detailed data of the respective devices. The first display control section causes a representation of the equipment to be displayed on the display screen and also causes symbols corresponding to respective devices to be displayed at appropriate locations on the representation of the equipment. The symbol selecting section selects symbols displayed on the display screen, and the second display control section calls detailed data corresponding to the selected symbols from the detailed data memory section and causes the called detailed data to be displayed on the display screen.

According to this feature, a representation, e.g. a diagram, of the equipment is displayed on the display screen, and symbols, e.g. icons, are disposed on the equipment diagram to indicate that devices corresponding to the respective icons are disposed in the equipment at locations corresponding to the locations displayed on the diagram on the screen. Desired ones of the icons are selected through the symbol selecting section. The second display control section calls detailed data of the devices corresponding to the selected icons from the detailed data memory section and displays the called detailed data on the display screen. Thus, relationship in position among the respective devices in the equipment and detailed data of the devices can be readily grasped on the display screen.

The detailed data of the device may include either first judgment data indicating that the device is operating normally or second judgment data indicating that the device is not operating normally. The first display control section causes a symbol of a device of which the detailed data contains one of the first and second judgment data to be displayed in a different manner than a symbol of a device of which the detailed data contains the other of the first and second judgment data.

Thus, whether the respective devices operate normally or not can be readily known from their symbols displayed on the display screen.

Also, the first display control section may include an equipment representation display control section for use in displaying the equipment representation on the display screen in response to an externally applied representation drawing command. In addition, the first display control section includes a symbol display control section for use in displaying a symbol at a desired position on the equipment representation on the display screen in response to an externally applied symbol positioning command.

With this arrangement, a desired equipment representation can be freely drawn on the display screen by applying a representation drawing command to the equipment representation display control section. Also, the position of each symbol on the display screen can be freely controlled by means of a symbol positioning command to the symbol display control section. Accordingly, this equipment management system can handle equipment of various dimensions and various constructions in which individual devices are disposed differently.

The present invention can also provide a computer-readable record medium having recorded therein an equipment management program which is executed by a computer having a display screen for managing equipment including a plurality of devices. The equipment management program makes the computer execute a first display sequence, a symbol selecting sequence and a second display sequence. The first display sequence is for displaying a representation of the equipment on the display screen and also displaying a symbol for at least one of the devices at an appropriate position on the equipment representation on the display screen. The symbol selecting sequence is for selecting a desired one of the symbols displayed on the display screen. The second display sequence is for calling detailed data for the selected device out of detailed data stored beforehand and displaying the called detailed data on the display screen.

The detailed data for the respective devices may include either first judgment data indicating that the device is operating normally or second judgment data indicating that the device is not operating normally. The first display control sequence causes a symbol of a device of which the detailed data contains one of the first and second judgment data to be displayed in a different manner than a symbol of a device of which the detailed data contains the other of the first and second judgment data.

With this record medium, a computer can display symbols of normally operating devices in a different manner than the remaining symbols. Alternatively, symbols for defective devices may be displayed in a different manner than the other symbols.

Also, the computer-readable record medium may contain a first display sequence which includes an equipment representation displaying sequence and a symbol displaying sequence. The equipment representation displaying sequence is for displaying the equipment representation on the display screen in response to an externally applied representation drawing command. The symbol displaying sequence is for displaying a symbol at a desired position on the equipment representation on the display screen in response to an externally applied symbol positioning command.

A desired equipment representation can be freely drawn on the display screen by applying a representation drawing command to the computer. Also, the position of each symbol on the display screen can be freely controlled by applying a symbol positioning command to the computer.

According to another feature of the present invention, an equipment management system is provided, which includes a detailed data memory section, a data retrieval condition setting section, a data retrieving section and a data output section. The detailed data memory has stored therein detailed data including indexes for a plurality of devices forming equipment. The data retrieval condition setting section sets at least one data retrieval condition for retrieving detailed data for a device to be inspected and evaluated. The data retrieving section retrieves detailed data of a device meeting at least one of data retrieval conditions. The data output section outputs at least part of the retrieved detailed data including the index.

The term "data output section" used herein represents, for example, a device for outputting detailed data in the form of digital signals, and a device for outputting the indexes contained in the detailed data in visual and/or audio form.

The data retrieval condition setting section sets one or more desired data retrieval conditions. The data retrieving section retrieves detailed data meeting at least one of the set conditions, and the retrieved detailed data is displayed on a screen or output as digital data, for example.

The equipment management system may further include a data re-arranging section for re-arranging the detailed data retrieved by the data retrieval section, and the data output section outputs at least part of the re-arranged detailed data, including their indexes.

The detailed data as retrieved by the data retrieval section are re-arranged or sorted, for example, in a predetermined order by the data re-arranging section. The re-arranged retrieved data are output in a visual and/or audio form or in a digital data form.

The present invention may provide a computer-readable record medium having recorded therein an equipment management program which is executed by a computer for managing equipment including a plurality of devices. The equipment management program operates the computer to execute a data retrieval condition setting sequence, a data retrieving sequence, and a data outputting sequence. The data retrieval condition setting sequence is for setting at least one data retrieval condition for retrieving detailed data for a device to be inspected and evaluated, and the data retrieving sequence is for retrieving detailed data of a device meeting at least one of data retrieval conditions. The data outputting sequence is for outputting at least part of the retrieved detailed data including its index.

A computer executing the program recorded in this record medium sets one or more desired data retrieval conditions and then, retrieves detailed data meeting the set conditions. The retrieved detailed data is displayed on a screen or output as sound or as digital data, for example.

The program recorded on the record medium may further execute a data re-arranging sequence for re-arranging the retrieved detailed data. The data outputting sequence outputs at least part of the re-arranged detailed data including their indexes.

Accordingly, the respective detailed data as retrieved by the data retrieval sequence are re-arranged in a predetermined order in the data re-arranging sequence. The re-arranged or sorted retrieved data are output in a visual and/or audio form or in a digital data form.

The present invention can further provide an equipment inspection and evaluation system including a device inspecting and evaluating section for inspecting and evaluating a plurality of devices forming equipment in accordance with a predetermined inspection and evaluation sequence. The system further includes an index memory section having stored therein indexes for the respective devices. The indexes are arranged in a predetermined order. The system also includes an index calling section which first calls the foremost index and, then, calls succeeding indexes one by one in the predetermined order each time an external index output command is applied. An index output section outputs indexes called by the index calling section.

The indexes stored in the index memory section may be those of the devices to be evaluated. The index output section outputs the indexes in a visual and/or audio form, for example.

With this system, the foremost index in the indexes arranged in order is first output through the index output section. When another index output command is externally applied, the second one of the indexes is output. After that, each time the index output command is applied, the succeeding indexes are successively output one by one. Using the indexes output through the index output section, an operator can determine in what order the devices should be inspected and evaluated.

The equipment inspection and evaluation system may include further an index output command generating section which generates and applies an index output command to the index calling section each time the inspection and evaluation section finishes inspection and evaluation of a device.

Thus, the index output from the index output section is automatically renewed in the predetermined order one by one each time inspection and evaluation of a device is finished.

In order for the device inspecting and evaluating section to be able to make correct inspection and evaluation of devices when the device inspecting and evaluating section inspects and evaluates each device in accordance with the inspection and evaluation sequence for that device, the inspection and evaluation system may further include a sequence memory section having stored therein a plurality of inspection and evaluation sequences for the respective devices, a sequence calling section and a sequence setting section. The sequence calling section calls, when the index for a particular device is called by the index calling section, the inspection and evaluation sequence for the particular device from the sequence memory section. The sequence setting section sets the called inspection and evaluation sequence in the inspection and evaluation section for use in inspection and evaluation of the particular device.

In order for the device inspecting and evaluating section to make correct inspection and evaluation, the device inspecting and evaluating section inspects and evaluates a particular device in accordance with the inspection and evaluation sequence for that particular device. When one of the indexes is called by the index calling section, the sequence calling section calls the inspection and evaluation sequence for the device indicated by the called index from the sequence memory section. The called inspection and evaluation sequence is set in the device inspection and evaluation section by the sequence setting section. Thus, the inspection and evaluation sequence matching the index output from the index output section is automatically available for the device inspection and evaluation section, so that appropriate inspection and evaluation can be made.

According to the present invention, the equipment inspection and evaluation system may further include a data receiving section receiving at least a part of the detailed data output from an equipment management system having a data output-section. The system also includes an index storage control sections which stores the indexes contained in the received detailed data in the index memory section.

The indexes of the respective devices retrieved in the equipment management system are applied to the equipment inspection and evaluation system and stored in the index memory section of the equipment inspection and evaluation system. The indexes of the devices retrieved in the equipment management system are output from the index output section of the equipment inspection and evaluation system.

In the present invention, the equipment may be a piping system, and the devices inspected and evaluated or managed may be traps of different types disposed the piping system.

BRIEF DESCRIPTION OF THE DRAWINGS

FIG. 12 shows a frame format of data transferred from the inspection and evaluation system to the management system.

FIG. 13 shows a part of data stored in the memory section of the management system shown in FIG. 1.

FIG. 14 shows an example of a display given when setting the references for use in inspecting and evaluating traps in the management system.

FIG. 15 shows an example of a table of results of evaluation of traps made in the management system.

FIGS. 17(a) and 17(b) show examples of displays for use in additionally setting special management items into the management system, in which FIG. 17(a) shows a list of data to be entered into the respective management items, and FIG. 17(b) shows the display displayed when data is renewed.

FIG. 18 shows a part of an example of data to be managed in the management system.

FIG. 27 shows an example of display for use in setting conditions in the management system for retrieving traps to be evaluated.

DETAILED DESCRIPTION OF EMBODIMENT

The present invention is described as being embodied in inspection and evaluation and management systems for steam traps, for example, with reference to FIGS. 1 through 33.

Figure 1:
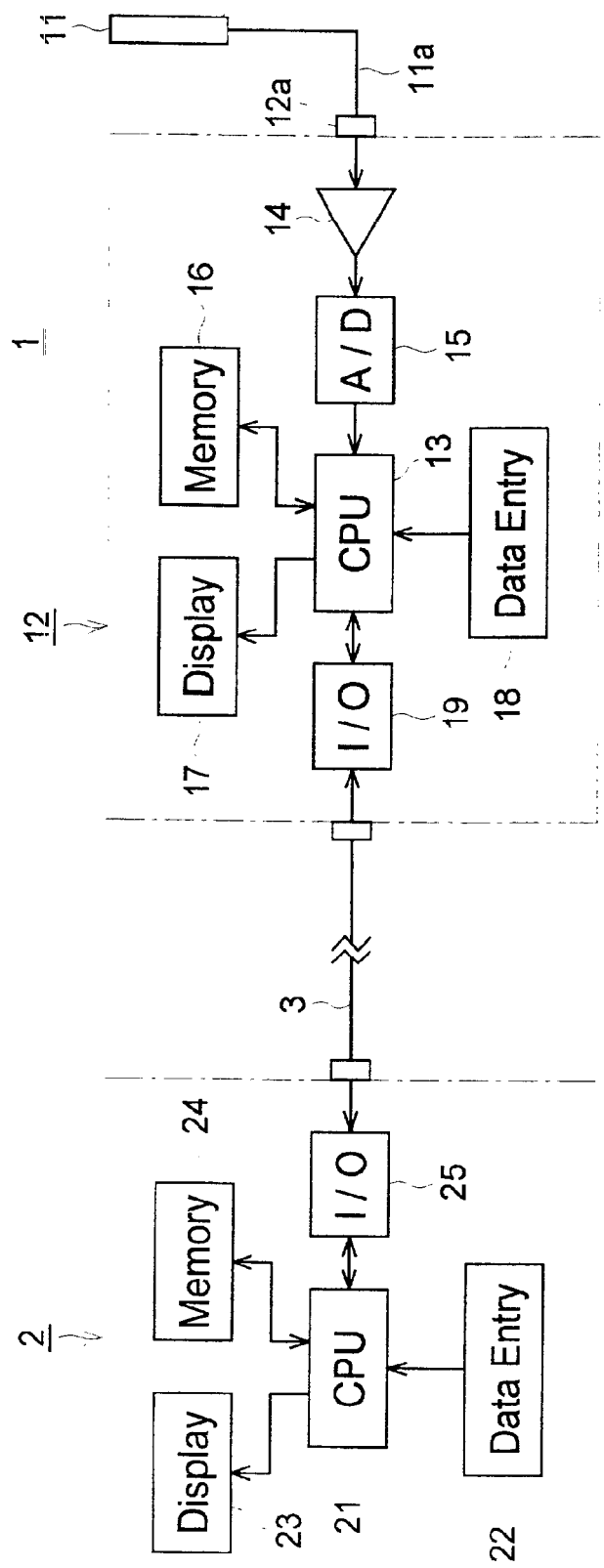
FIG. 1 is a schematic block diagram of equipment inspection and evaluation and management systems according to one embodiment of the present invention.

FIG. 1 is a block diagram of an inspecting and evaluating system 1 and a management system 2, which are coupled by a data transmission cable 3. It should be noted that the two systems are coupled to each other by the cable 3 only when data is transferred between them. Accordingly, when, for example, the inspection and evaluation system 1 is used to inspect and evaluate steam traps or other devices, or when the management system 2 is used to process data about each steam trap, they are separated from each other by removing the cable 3.

When steam leaks through a trap (not shown), relatively high frequency, continuous ultrasonic vibrations occur in the trap. The magnitude of vibrations, i.e. the vibration level L and the surface temperature T of the trap correlate to the amount of steam leakage. (The surface temperature T correlates to the steam pressure within the trap, and, therefore, to the amount of steam leakage.) On the basis of the correlation, the inspection and evaluation system 1 judges from the measured vibration level L and temperature T whether or not steam leaks through particular traps, and to what extent steam leaks. For that purpose, the inspection and evaluation system 1 includes a probe 11 and an inspection and evaluation apparatus 12. The probe 11 detects a vibration level L and surface temperature T of a particular trap. The inspection and evaluation apparatus 12 receives and processes measurement signals from the probe 11 to determine whether or not steam is leaking through that trap and, if steam is leaking, to what degree the steam leakage is.

The probe 11 has a vibration sensor (not shown) for sensing the level L of vibrations and a temperature sensor (not shown) for sensing the temperature T of a trap. The vibration and temperature sensors are disposed within the probe 11 at its tip end. When the probe 11 is pressed against the surface of a trap to be inspected, the sensors sense the vibration level L and the temperature T at the surface of the trap and outputs a vibration-representative signal and a temperature-representative signal which correspond to the sensed vibrations and temperature. The signals are coupled to the inspection and evaluation apparatus 12 including a CPU 13 via a dedicated cable 11a.

The vibration and temperature representative signals are amplified in an amplifier 14 and, then, converted into digital signals in an analog-to-digital (A/D) converter 15. At the output of the A/D converter 15, trap inspection-result representative data of a particular trap (hereinafter referred to as trap inspection data) is provided. The trap inspection data is applied to a CPU 13, which processes information representative of the trap vibration level L and the trap surface temperature T contained in the trap inspection data in accordance with correlation data D (FIG. 3) stored in a memory 16 provided by, for example, a ROM or RAM. The correlation data D represents correlation of the trap vibration level and surface temperature to the amount of steam leakage through the trap. Processing the trap inspection data D, the CPU 13 judges whether or not any steam leaks from that trap and, if any steam is leaking, to what extent steam is leaking. The results of that judgment are displayed on a display 17, e.g. a liquid crystal display and also stored in the memory 16.

When the inspection of all of desired traps is completed, the inspection and evaluation system 1 is coupled via the cable 3 to the management system 2. A command is given to the CPU 13 through an operating section 18 which may include plural push buttons or keys, for transferring the judgment results to the management system 2. The judgment results are transmitted to the management system 2 via an I/O interface 19 and the cable 3. Detailed description of data processing in the management system 2 is given later.

The correlation of the amount of steam leakage to the vibration level L and surface temperature T of traps varies depending on structures of traps to be inspected. Traps may be classified on the basis of their principles of operation into disc-type traps, bucket-type traps, thermostatic (THERMO) traps, float-type traps and temperature-adjustable traps, for example. On the other hand, even when two traps are of the same type, they may exhibit different correlations if they are manufactured by different manufacturers. Accordingly, for correct inspection and evaluation of traps based on such correlation, the inspection and evaluation of traps must be based on the correlation (correlation data D) for the structures or types of the particular traps to be inspected.

For that purpose, the inspection and evaluation system 1 contains in the memory 16, a plurality of correlation data D for substantially all of the commercially available traps. Accordingly, regardless of the types of traps to be inspected and evaluated, correct inspection and evaluation can be made only if the traps are commercially available ones.

Figures 2, 3:
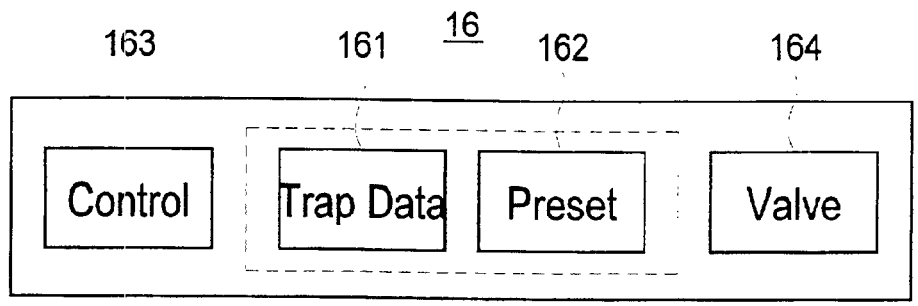
FIG. 2 shows a configuration in a memory of an equipment inspection and evaluation system shown in FIG. 1.
FIG. 3 shows a storage configuration in a trap data memory region shown in FIG. 2.

The memory 16 includes a trap data memory region 161 as shown in FIG. 2. All of the available correlation data D are stored in this memory region 161. In addition to the respective correlation data D, the memory region 161 stores trap data including types of respective traps, company codes indicating companies which manufactured the respective traps, the operating principles of the traps etc.

Each trap is assigned with its own number including, for example, four digits, which is referred hereinafter to as the trap code. In the trap data memory region 161, the respective trap data including the correlation data D are arranged on the basis of their trap code in a trap code list as shown in FIG. 3.

There are more than 2,000 models of traps in each of the types. The trap data memory region 161 stores trap data and, hence, correlation data D, of as many as more than 2,000 traps. In order to inspect and evaluate one trap, it is necessary to find out one correlation data D out of more than 2,000 correlation data D stored in the memory region 161. It is not easy to locate only the desired one in so much data.

According to the present invention, as shown in FIG. 2, the memory 16 includes a region referred to as the preset region 162, separate from the trap data memory region 161. In the preset region 162, data of only desired ones of the traps, e.g. only those traps which are to be inspected and evaluated by the inspection and evaluation system, are stored beforehand or preset. The traps for which data are stored in the preset region 162 may be, for example, traps in a steam plant to be inspected and evaluated.

In the actual inspection and evaluation procedure, trap data including correlation data D of a particular trap is called from the data stored in the preset region 162. With this arrangement, the range from which desired data is to be found can be narrower.

Writing of trap data into the preset region 162 and calling or reading desired trap data from the preset region 162 is carried out by the CPU 13 in accordance with a key entry through the data entry section 18. The CPU 13 also causes a message based on the key entry to be displayed on the display 17.

Control programs according to which the CPU 13 operates are stored in a control program region 163 in the memory 16. In the illustrated embodiment, the control program region 163 is in a ROM configuration. The trap data memory region 161 and the preset region 162 are of a RAM configuration.

Figure 4:
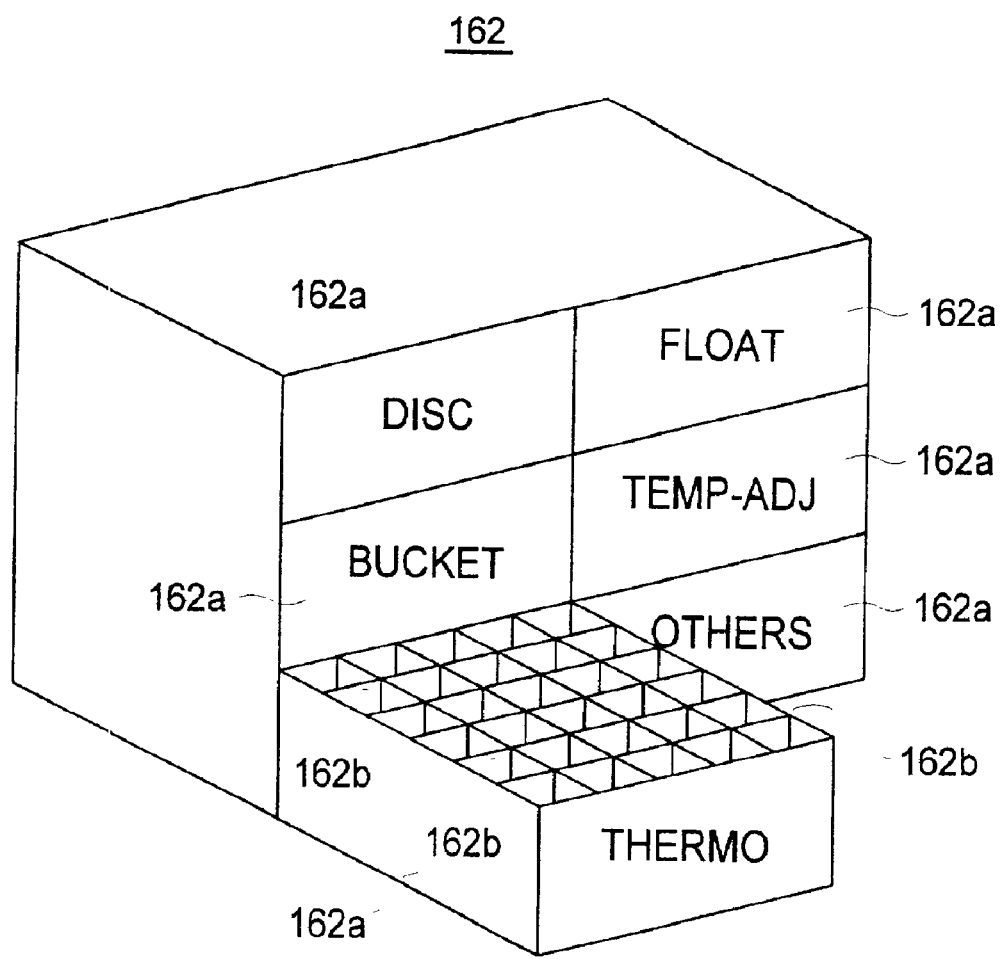
FIG. 4 shows a conceptual configuration of a preset region shown in FIG. 2.

FIG. 4 is a conceptual representation of the structure of the preset region 162. The preset region 162 includes a plurality, e.g. six, of partitioned memory sub-regions 162a, each for one of the six trap types, namely, the disc-type, the bucket-type, the thermostatic type, the float-type, the temperature-adjustable type, and other types. Each of the sub-regions 162a includes a plurality, e.g. 30, of smaller memory regions 162b. Trap data for one trap model is stored in each smaller memory region 162b. Thus, in the example shown in FIG. 4, trap data of thirty (30) trap model of each type can be stored in each sub-region 162a.

Figure 5:
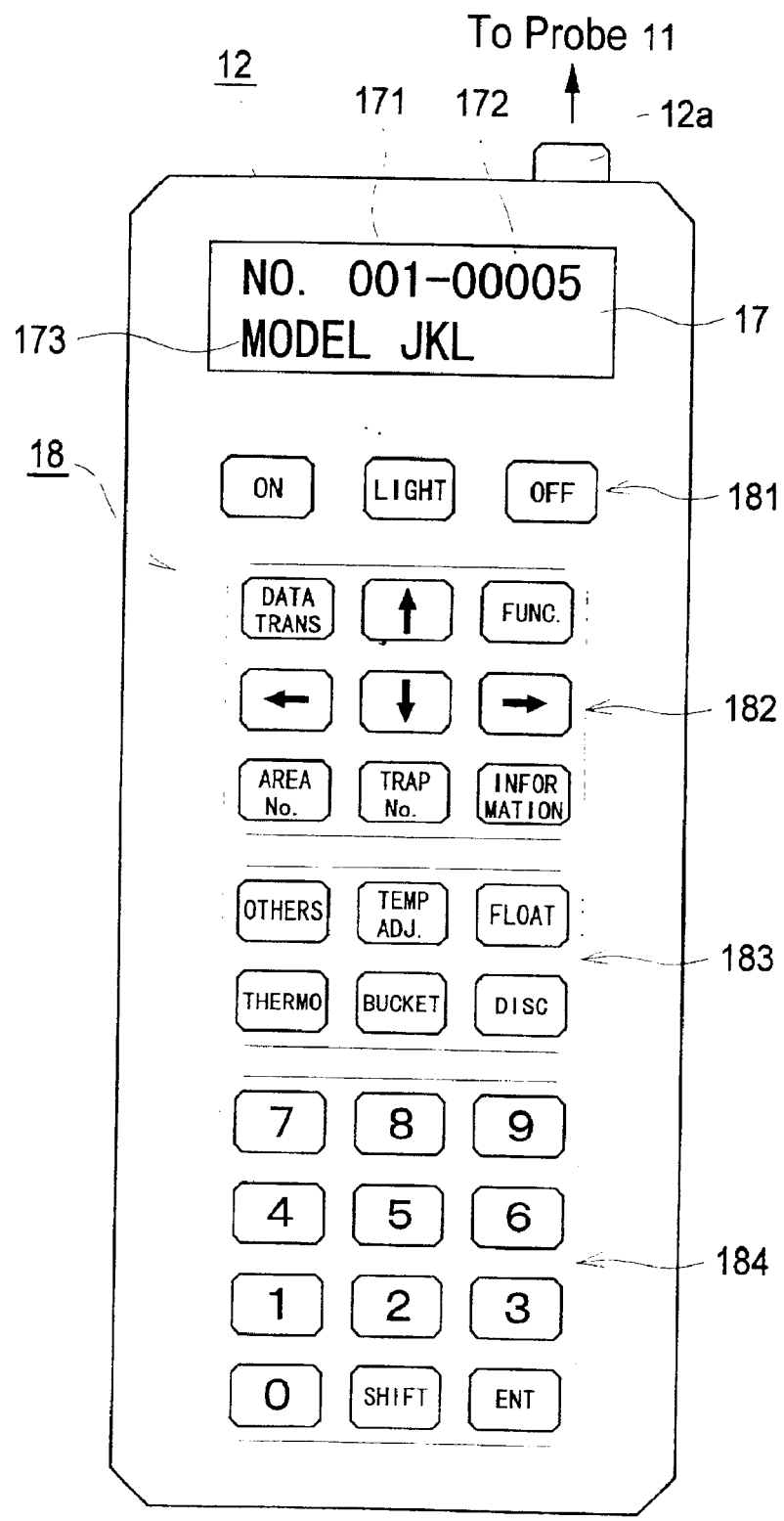
FIG. 5 is a front elevational view of an inspection and evaluation apparatus of the inspection and evaluation system shown in FIG. 1.

As previously stated, commands for writing and reading desired trap data in and from the preset region 162 are give through the data entry section 18. The keys on the data entry section 18 are arranged as shown in FIG. 5 which is a front view of the inspection and evaluation apparatus 12. The keys are sorted into a power switch key group 181, a function key group 182, a trap type selecting key group 183, and a numerical key group 184. The display 17 is disposed in the top portion above these key groups, and may be a liquid crystal display panel which can display a message in, for example, two rows. The inspection and evaluation apparatus 12 is generally rectangular and has such a size that it can be held by hand. The inspection and evaluation apparatus 12 has an input terminal 12a at the top end surface for connecting the apparatus 12 to the probe 11 via the cable 11a.

Next will be described, how to manipulate the keys on the data entry section 18 and how the CPU 13 operates for writing desired trap data into the preset region 162, using the trap codes, with reference to FIGS. 6 and 7.

Figure 6:
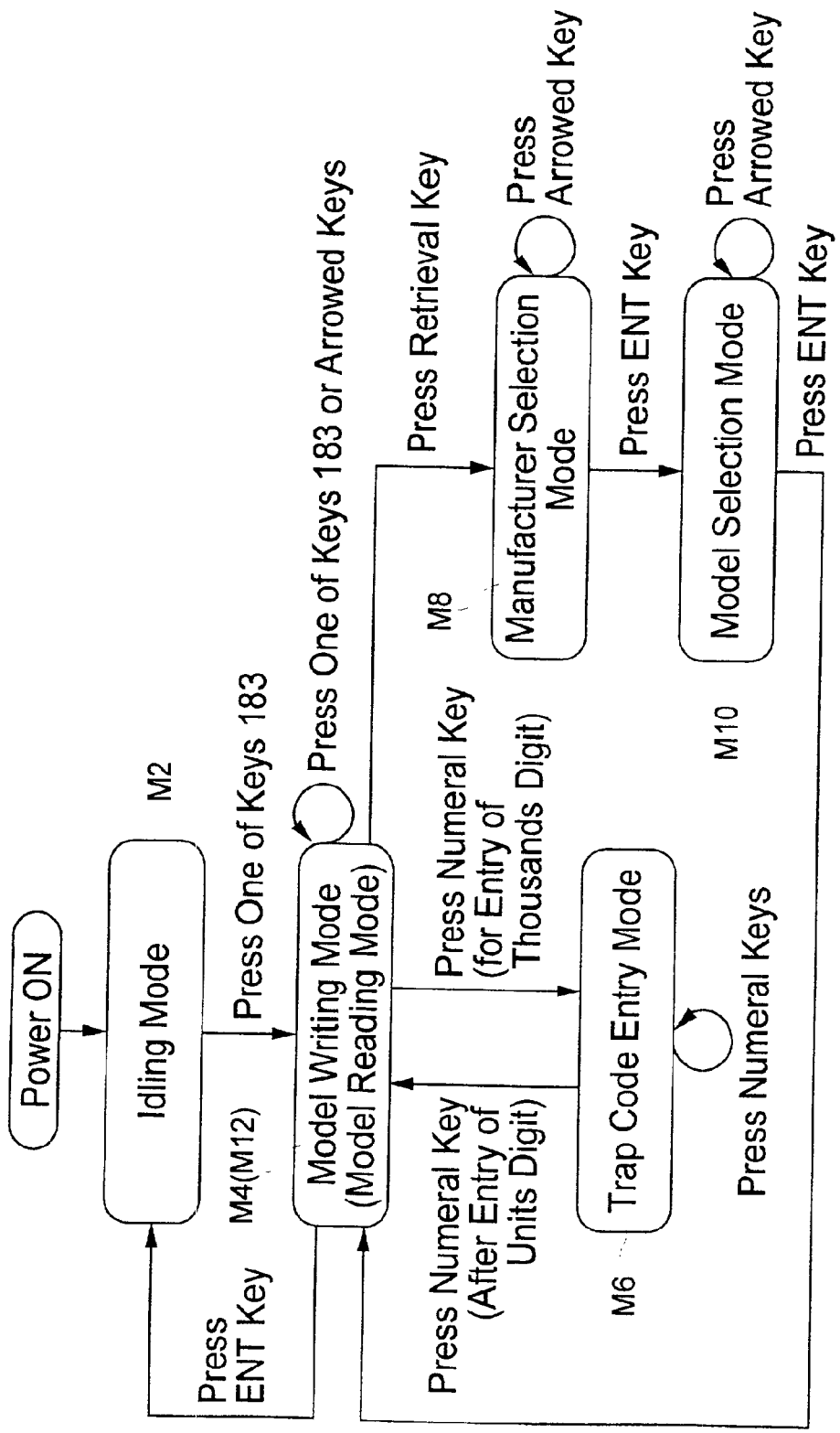
FIG. 6 is a state transition diagram showing operation of a CPU to set and call trap data in and from the preset region in the memory shown in FIG. 2.

FIG. 6 is a state transition diagram showing the operation of the CPU 13 when trap data is written in and read from the preset region 162. FIG. 7 illustrates the sequence of operating the keys on the data entry section 18 for writing trap data into the preset region 162, and also the messages on the display 17.

First, an ON key in the power switch group 181 is pressed. Upon actuation of the ON key, the CPU 13 checks itself with respect to its predetermined functions in about three seconds and places itself in an idling mode M2 as shown in FIG. 6. In the idling mode M2, the CPU 13 awaits a command from the data entry section 18, and also causes the display 17 to display a three-digit number and a five-digit number in an upper row, and "MODEL" in a lower row, as shown in FIG. 7, Part (a). The three-digit number in the upper row in the display 17 is an "area number" representing the area of a steam handling plant where a particular trap is located. The five-digit number in the lower row is a "trap number" given to each trap to be inspected and evaluated. Both numbers are arbitrarily assigned by a person who manages the traps, but, in this stage, no more description about them is given since they do not participate in writing and reading trap data in and from the preset region 162.

Next, the type of the trap is selected by pressing an appropriate key in the trap type selecting key group 183. Then, the CPU 13 enters into a model writing mode M4 and causes the display 17 to display, after the indication of "MODEL" in the lower row, a two-digit number and a trap type selected through the trap type selecting key 183, as shown in FIG. 7, Part (b). FIG. 7, Part (b) shows that the "FLOAT" key in the trap type key group 183 was pressed. If it is desired to change the trap type to another type from the FLOAT type, the key for the desired type is pressed.

Figure 7:
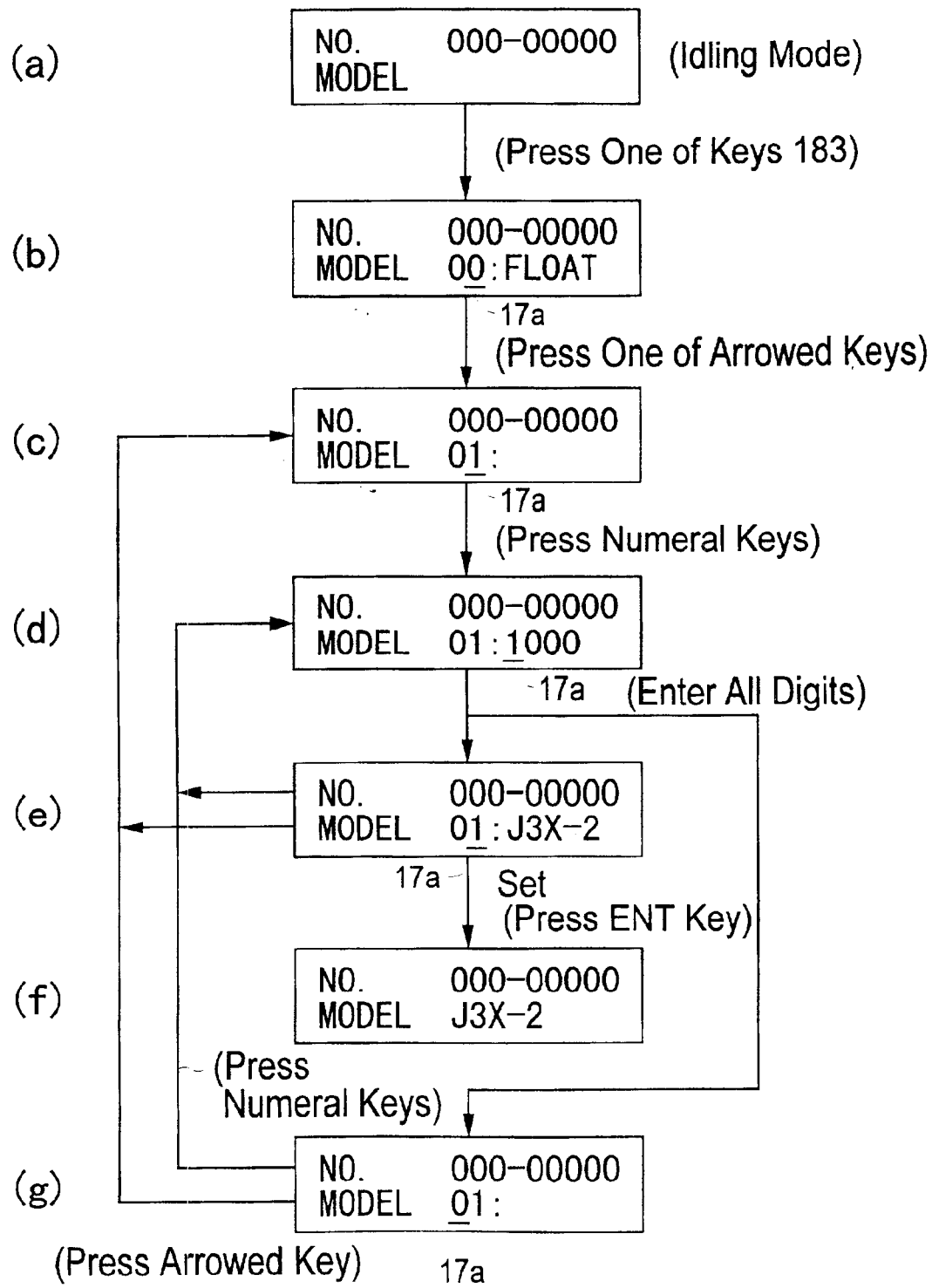
FIG. 7 shows how to operate keys on a keyboard of the inspection and evaluation system in order to set trap data of a desired trap in the preset region, and also a form of display given in a display section of the inspection and evaluation system shown in FIG. 5.

The two-digit number in the lower row shown in FIG. 7, Part (b) is the number of one of the thirty smaller memory regions 162b in the sub-memory region 162a for the selected trap type of the preset region 162. The smaller memory regions 162b are numbered from 00 through 30.

Keys with arrows "↑" and "↓" indicated on their surfaces in the function key group 182 are pressed to enter one of numbers 00 through 30 corresponding to a desired smaller memory region. In other words, one of the smaller memory region 162b in which to store desired trap data is selected by operating the "↑" and "↓" keys. For example, the "↑" key may be pressed once to select a first smaller memory region numbered "01", which may be referred to as memory number. In this case, the message displayed is as shown in FIG. 7, Part (c). Below the memory number (or in the first digit of the memory number) on the display 17, a cursor 17a blinks, indicating that the digit can be changed. It should be noted that the memory number "00" does not represent a smaller memory region 162b, but it is a kind of message to indicate that the CPU 13 is now in the model writing mode M4. Therefore, no trap data can be written in this memory number "00".

After selecting the memory number, numeral keys are used to enter the trap code of a trap of which trap data should be written, beginning with the digit in the highest position toward the digit in the lowest position, e.g. from the thousands digit, the hundreds digit, the tens digit down to the units digit. When the thousands digit is entered, the CPU 13 enters into a trap code entry mode M6. The message on the display 17 displayed when the thousands digit of, for example, "1" is entered is shown in FIG. 7, Part (d). It is seen that the cursor 17a, too, has moved to the position below the thousands digit.

When four digits forming a trap code have been all entered in the trap code entry mode M6, the CPU 13 returns to the model writing mode M4.

The trap code for a particular trap can be known from a table containing trap codes shown in relation to corresponding trap models.

After entering the trap code, the CPU 13 checks the entered trap code with trap data stored in the trap data memory region 161 and finds out whether or not trap data for the respective trap codes are present in the trap data memory region 161. If it is found that the trap data is present, the CPU 13 checks if the trap corresponding to the entered trap code is of the initially entered trap type (entered in the state shown in FIG. 7, Part (b)), i.e. whether the trap is a float type trap. If the trap type is the correct one, the CPU 13 makes a trap model corresponding to the entered trap code displayed on the display 17. FIG. 7, Part (e) shows an example in which a trap model "J3X-2" is displayed on the display 17 corresponding to a entered trap code "1000".

Then, when the CPU 13 is in the state shown in FIG. 7, Part (e), an "ENT" key in the numeral key group 184 is pressed, the CPU reads the trap data corresponding to the entered trap, i.e. the trap data for the trap of which the model is "J3X-2" in the illustrated example, from the trap data memory region 161. The read trap data is written in the first memory region 162b. Then, the message on the display 17 changes to a message indicating that the writing of the trap data has been finished. This message is shown in FIG. 7, Part (f). The CPU 13 returns to the idling mode M2.

Alternatively, the trap data can be written by pressing the "↑" and "↓" keys when the apparatus is in the state shown in FIG. 7, Part (e). In this case, upon pressing the arrowed key, the message on the display 17 returns to the state shown in FIG. 7, Part (c).

Further, if it is desired in the state shown in FIG. 7, Part (e) to alter the trap to be written, the trap code for the desired trap is entered by pressing appropriate numerical keys, which returns the apparatus 12 to the state shown in FIG. 7, Part (d).

In the state shown in FIG. 7, Part (d), if no trap data corresponding to the entered trap code is found in the trap data memory region 161, or if the trap type corresponding to the entered trap code is not the initially selected trap type even when the trap data is found in the region 161, the CPU 13 returns to the state shown in FIG. 7, Part (c), as shown in FIG. 7, Part (g). In such a case, a correct trap code should be entered.

In the state of FIG. 7, Part (g), if, for example, the "ENT" key is pressed, the writing of trap data into the first trap memory region 162b or the renewal of trap data in the first memory region 162b is not done.

According to the data writing method thus far described with reference to FIG. 7, a trap code of a desired trap is entered directly by pressing keys on the keyboard. However, if one does not know the trap code of the desired trap, he or she must find it out from the previously described trap code list. According to the illustrated example, in addition to the trap code entry method, a trap model retrieving and entering method is also employed. In the trap model retrieving and entering method, a trap model of the desired trap is retrieved, and the trap data for the desired trap is written on the basis of the retrieved trap model. The trap model retrieving and entering method is described in detail with reference to FIGS. 6 and 8.

Figure 8:
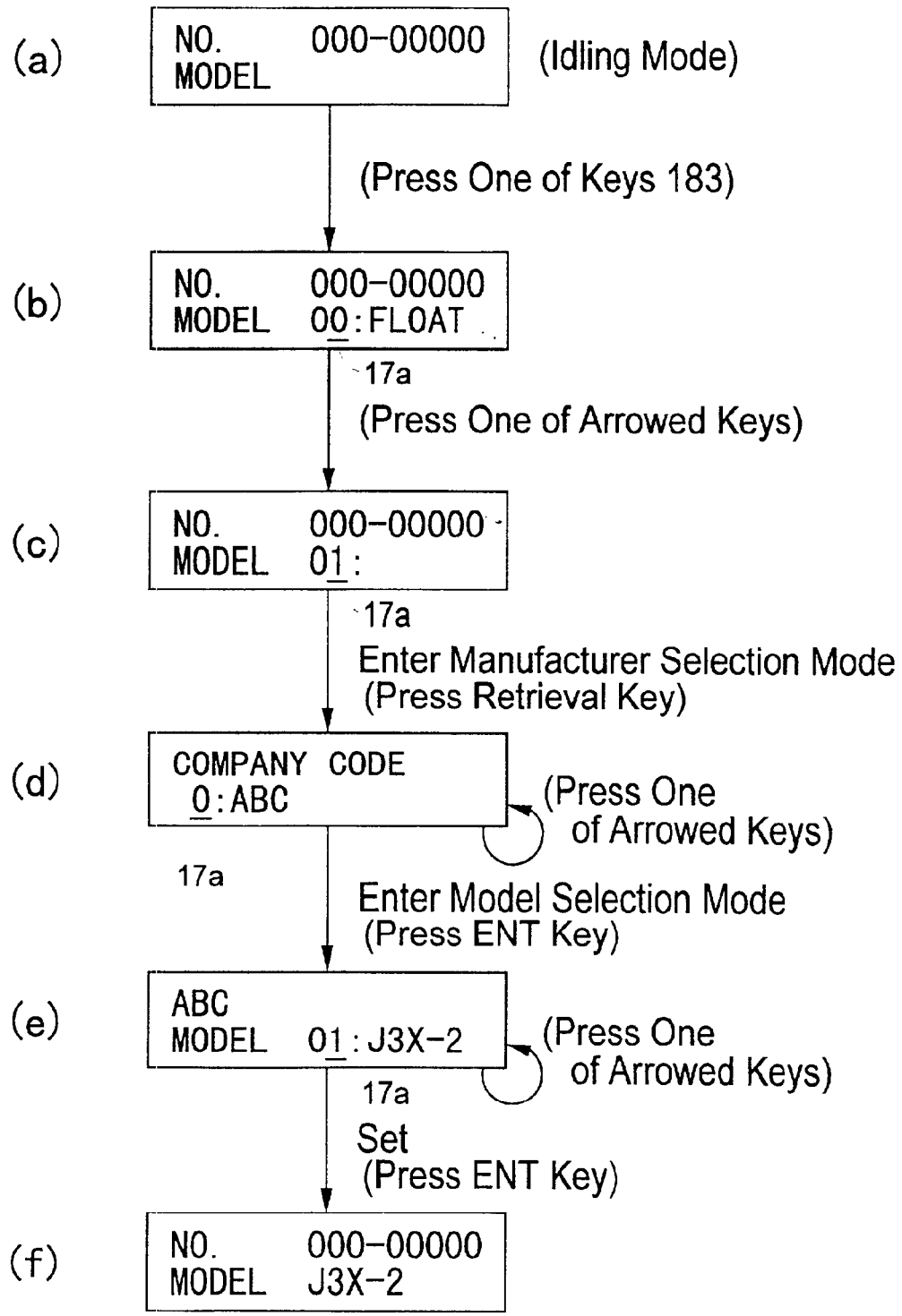
FIG. 8 shows a different procedure than FIG. 7 to be employed to set trap data and a different form of display.

The states illustrated in FIG. 8, Parts (a) through (c) are similar to the states shown in FIG. 7, Parts (a) through (c). When the message shown in FIG. 8, Part (c) is displayed, the CPU 13 is in the model writing mode M4. In the mode M4, when a retrieval key is pressed, the CPU 13 enters into a manufacturer selection mode M8 as shown in FIG. 6. In the illustrated inspection and evaluation apparatus 12, there is no key named "retrieval key", but a key labeled "INFORMATION" in the function key group 182 is used as the retrieval key. At the same time the retrieval key or "INFORMATION" key is pressed, the message on the display 17 changes to the one shown in FIG. 8, Part (d). Specifically, words "COMPANY CODE" are displayed in the upper row, and a company code consisting of, for example, one digit, as well as the corresponding company name is displayed in the lower row. In the illustrated example, a company code "0" and its corresponding company name "ABC" are displayed.

The manufacturer selection mode M8 is a mode for selecting the manufacturer of a trap whose trap data is to be written. The manufacturer is selected by pressing one of the "↑" and "↓" keys. When one of the "↑" and "↓" keys is pressed, the number or company code below which the cursor 17a is blinking changes (increases or decreases), and the company name also changes.

After a manufacturer is selected in the manufacturer selection mode M8, the CPU enters into a model selection mode M10, in which the model of a desired one of the traps manufactured by the selected manufacturer is selected. Specifically, the "ENT" key is pressed when the display is as shown in FIG. 8, Part (d), and the CPU 13 enters into the mode M10. This causes a display shown in FIG. 8, Part (e) to be displayed. The trap shown in FIG. 8, Part (e) is, for example, a float type trap, Model J3X-2 manufactured by ABC Company.

Different from the previously described trap code entry method, the trap model retrieving and entering method enables an operator to write trap data for a desired trap even if he does not know the trap code. Accordingly, he need not use the trap code list.

Figure 9:
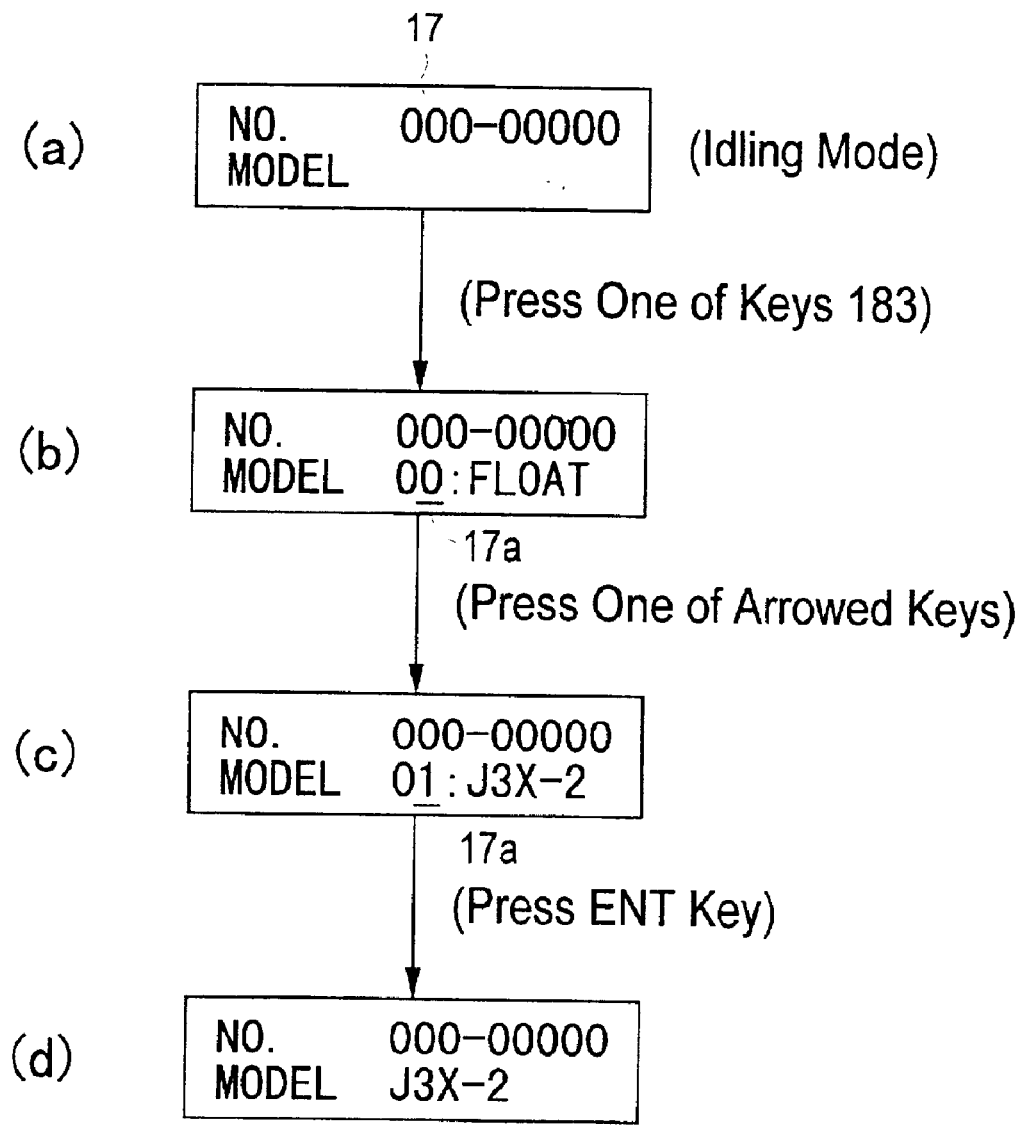
FIG. 9 shows how to operate keys on a keyboard of the inspection and evaluation system in order to call desired trap data stored in the preset region, and also a form of display given in a display section of the inspection and evaluation system shown in FIG. 5.

Next, referring to FIGS. 5 and 9, how to read out trap data written in the respective smaller memory regions 162b of the preset region 162 of the memory 16.

As is seen, what are shown in FIG. 9, Parts (a) through (c) are the same as those shown in FIG. 7, Parts (a) through (c), or in FIG. 8, Parts (a) through (c). It should be noted that in FIG. 9, Part (c), different from FIG. 7, Part (c) and FIG. 8, Part (c), a message "J3X-2" is displayed in the portion of the lower row of the display 17 following the message "MODEL 01". This is because the trap data for a Model "J3X-2" trap has been already written in the smaller memory region 162 having the memory number "01". As described previously, when the display 17 is in the state shown in FIG. 9, Part (c), the CPU 13 is in the model writing mode M4. However, it should be note that when the CPU 13 is in the mode M4, it is also in a model reading mode M12 for reading or calling trap data for a desired trap.

In the state shown in FIG. 9, Part (c), i.e. in the model reading mode 12 shown in FIG. 6, the "ENT" key is pressed after the smaller memory region 162b where trap data for the desired trap is stored is selected by pressing one of the arrowed keys. In FIG. 9, Part (c), the selected smaller memory region 162b is the first region numbered "01" where the trap data for the Model "J3X-2" trap is contained. When the "ENT" key is pressed, the trap data stored in the selected smaller memory region is called, and the model of the trap of which the trap data has been called is displayed on the display 17, as shown in FIG. 9, Part (d). In the case of FIG. 9, Part (d), the trap data for Model "J3X-2" trap has been called. An operator can know the trap type and model of a trap to be inspected since they are indicated on a plate attached to the trap housing.

When the trap data is called, the CPU 13 returns to the idling mode M2. Then, the trap which is Model "J3X-2" is inspected and evaluated in accordance with the called trap data, which results in precise inspection and evaluation.

As described above, according to the present invention, trap data for only those ones, out of a number of traps, which are immediately to be inspected can be selectively stored in the preset region 162. When a particular trap is to be inspected, first the type of that trap is selected, and desired trap data is selected from the trap data for the selected trap type. Thus, it is easier to call desired trap data than calling it from the trap data for all the models of all the types.

In the illustrated example, the maximum number of trap data that can be stored in the preset region for each trap type is thirty (30). The value of thirty is employed for the following reason. Usually, one steam-utilizing plant uses from about 10 to about 20 trap models at most for each trap type. Accordingly, thirty smaller memory regions 162b for each trap type can handle almost any plant. However, the number of the smaller memory regions 162b is not limited to thirty.

In the above-described example, the preset region 162 in which trap data are stored is divided into a plurality of sub-regions 162a each for one trap type. The preset region 162 may be divided on a different basis, e.g. on a manufacturer basis.

Furthermore, the method for writing and calling trap data in and from the preset region 162 is not limited to the described ones. For example, it may be arranged that only the capital letter of the model name of a desired trap may be used to retrieve the model of that trap (i.e. forward matching search) to find out the trap model. Using this trap model, the trap data is written or called.

Figure 10:
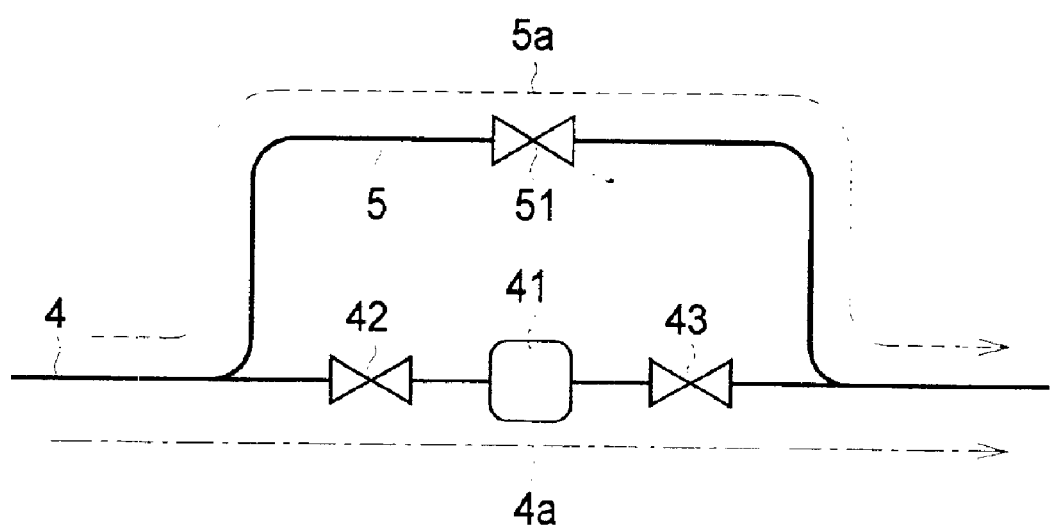
FIG. 10 is a schematic representation of a steam piping system including a bypass pipe.

A steam piping system may include one or more assemblies each including a main pipe 4 and a bypass pipe 5, like the one shown in FIG. 10. When a trap 41, for example, disposed in the main pipe 4 may fail, leaking steam, it should be repaired or replaced. In such a case, the bypass pipe 5 is used to bypass the trap 41 so that steam flow between two points on opposite sides of the trap 41 can be maintained. The bypass pipe 5 includes a bypass valve 51 for controlling the flow of steam through the pipe 5. Valves 42 and 43 are disposed on opposite sides of the trap 41 for controlling the flow of steam through the trap 41.

If the trap 41 can operate normally, the valves 42 and 43 are opened with the bypass valve 51 closed, so that steam can flow through the trap 41 as indicated by a dash-and-dot line arrow 4a. When the trap 41 fails, the valves 42 and 43 are closed, and the bypass valve 51 is opened. Then steam can detour through the bypass pipe 5 as indicated by a broken line arrow 5a. In this case, though drainage of condensate by the trap 41 is not available, at least the flow of steam can be maintained, so that the repairing or replacement of the trap can be done without need for stopping the operation of the plant.

If, however, the bypass valve 51 is broken and steam leaks from it, the operating efficiency of the plant decreases regardless whether or not the trap 41 operates normally. Accordingly, it is necessary to inspect not only the trap 41 in the main pipe but also the bypass valve 51.

The equipment inspection and evaluation system 1 according to the present invention has a valve inspecting and evaluating function, too. It is known that steam leaking through the valve 51 produces ultrasonic vibrations in the bypass valve 51, as in the case of traps. Accordingly, measuring the vibration level in the valve 51, it is possible to determine whether or not steam is leaking through the valve 51.

Vibrations in the valve 51 can be sensed by pressing the vibration sensor at the tip end of the probe 11 against the surface of the valve housing. The magnitude or level of the vibrations can be derived from the data obtained by sensing the vibrations. The system includes a valve inspection and evaluation program memory region 164 in the memory 16 in which a valve inspection and evaluation program is stored. According to this program, the vibration level is displayed on the display 17 and also temporarily stored in the memory 16. The valve inspection and evaluation program is executed in the CPU 13 to judge whether or not the bypass valve 51 fails, e.g. whether or not steam is leaking.

When the tip end of the probe 11 is pressed against the surface of the valve 51, not only the vibrations but also the temperature at the surface of the valve 51 is detected. The valve inspection and evaluation program processes the temperature data from the probe 11 to derive the temperature of the valve 51. The temperature is displayed on the display 17 and stored in the memory 16, together with the vibration level. Thus, an operator can know whether or not the bypass valve 51 fails, and also the surface temperature of the valve 51.

It should be noted that when the equipment inspection and evaluation system of the present invention is used, it is necessary to choose one of the trap inspection and evaluation program and the valve inspection and evaluation program depending on the device to be inspected and evaluated. If the trap 41 is to be evaluated, the trap inspection and evaluation program must be executed, and if it is the valve 51 that is to be evaluated, the valve inspection and evaluation program must be chosen. For that purpose, the inspection and evaluation system according to the illustrated embodiment is arranged such that the inspection and evaluation program can be manually switched through the data entry section 18.

In addition to this manual switching mode, the system according to the illustrated embodiment of the present invention can be operated in an automatic switching mode. In the automatic switching mode, the trap inspection and evaluation program and the valve inspection and evaluation program are automatically switched in such a manner that a predetermined number, e.g. one, of traps 41 and the same number of valves 51 can be alternately evaluated. The selection of the programs can be done through the data entry section 18.

Figure 11:
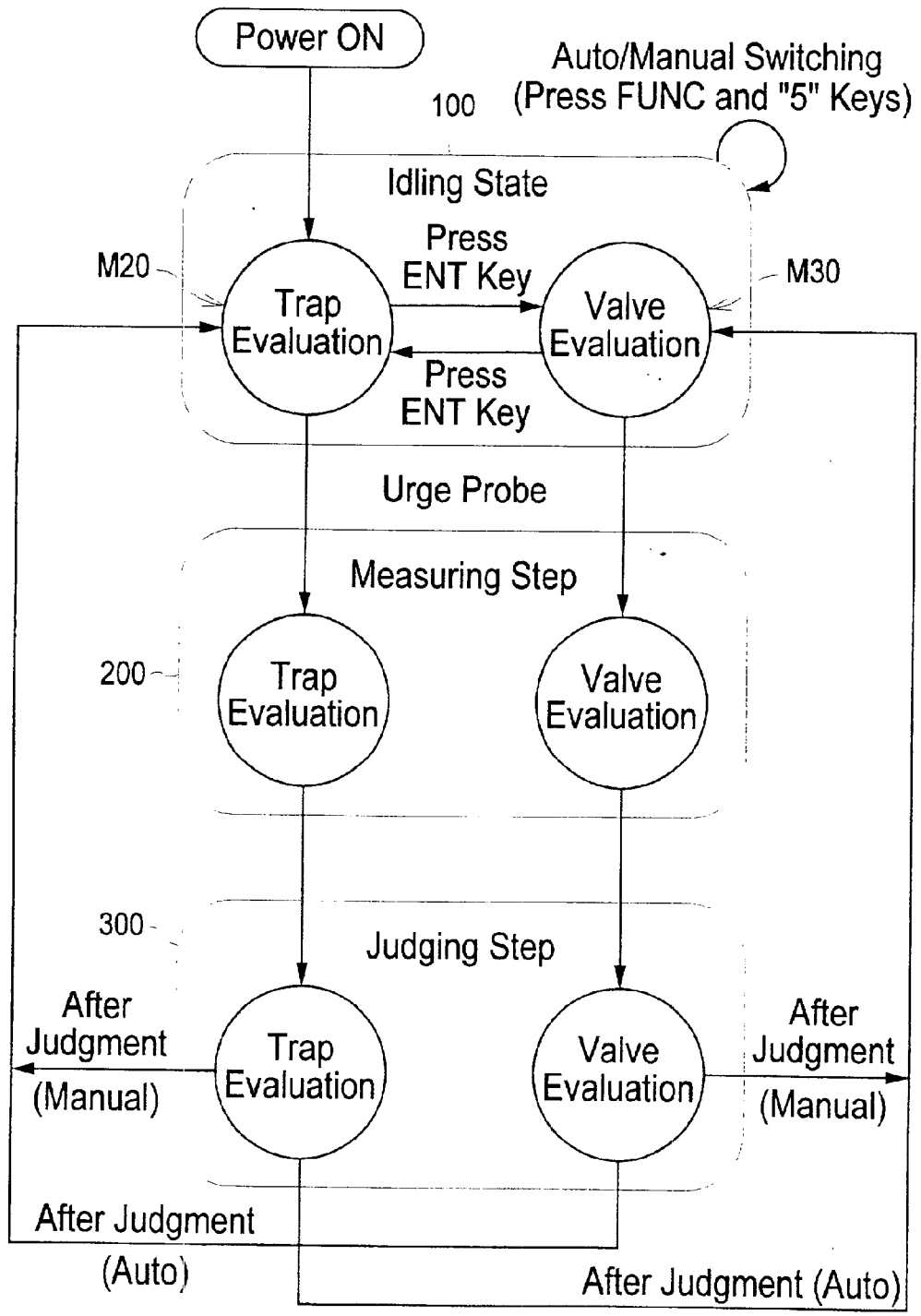
FIG. 11 is a state transition diagram schematically showing operation of the CPU of the inspection and evaluation system to inspect and evaluate traps and valves.

Now, operation of the CPU 13 of the inspection and evaluation system 1 according to the illustrated embodiment for inspecting and evaluating traps 41 and bypass valves 51 is described with reference to FIG. 11. FIG. 11 is a state transition diagram conceptually illustrating operation of the CPU 13, which operates in a manner illustrated in the state transition diagram of FIG. 11 in accordance with the programs. In FIG. 11, a trap inspection and evaluation mode M20 is a mode in which the CPU 13 processes inspection data including vibration-representative data and temperature-representative data provided by the probe 11 in accordance with the trap inspection and evaluation program, i.e. the correlation data D for the traps 41 to be inspected and evaluated. In a valve inspection and evaluation mode 30, the CPU 13 processes the inspection data in accordance with the valve inspection and evaluation program.

When the inspection and evaluation apparatus 12 is powered by pressing the ON key in the power switch key group 181, the CPU 13 checks itself in accordance with a predetermined procedure and, after that, enters into an idling state 100.

The term "idling state 100" used herein means substantially the same as the idling mode M2 in the state transition diagram shown in FIG. 6. In the idling state 100, the CPU 13 awaits a command and is ready for inspection and evaluation of a trap 41 or a valve 51. It should be noted that in the idling state 100 immediately after the apparatus 12 is turned on, the CPU 13 is in the trap inspection and evaluation mode M20 and is ready for inspecting and evaluating a trap 41. In addition, immediately after the turning on of the apparatus 12, the CPU 13 is always placed in the manual switching mode. Also, in the idling state 100, the CPU 13 displays a message on the display 17, indicating that the CPU 13 is in the idling state 100, in the trap inspection and evaluation mode M20, and in the manual switching mode.

Let it be assumed that the CPU 13 is to evaluate a trap 41 immediately after the inspection and evaluation apparatus 12 is turned on. When the probe 11 is pressed against the surface of the housing of a trap to be evaluated, a measurement starting switch (not shown) on the probe 11 is turned on, and the probe 11 starts measuring the level of ultrasonic vibrations and surface temperature of the trap 41. At the same time, the CPU 13 enters into a measuring step 200.

In the measuring step 200, the CPU 13 causes the display 17 to display a message that the ultrasonic vibration level and surface temperature of the trap 41 are being measured. It will take some time to precisely measure physical quantity of ultrasonic vibrations and temperature of the trap 41. Thus, the probe 11 may be urged against the trap 41 for, for example, about fifteen seconds.

After the measurements of vibrations and temperature, the CPU 13 enters into a judgement step 300, in which the CPU 13 processes the inspection data, i.e. data relating to the ultrasonic vibrations and temperature of the trap 41 in accordance with the trap inspection and evaluation program, using the correlation data D. By this processing, whether or not there is any steam leakage and, if any, to what extent the steam leakage is, are automatically made. The judgment made is displayed on the display 17 and also temporarily stored in the memory 16.

After the judgment step 300 is completed, the CPU 13 returns to the idling state 100, so that it is ready for inspecting and evaluating another trap 41. For inspection and evaluation of another trap 41, the probe 11 is pressed against the trap 41.

If a bypass valve 51 is to be evaluated instead of a trap 41, a key on the data entry section 18, e.g. the "ENT" key in the numerical key group 184, may be pressed once. This makes the CPU 13 shift into the valve inspection and evaluation mode M30 from the trap inspection and evaluation mode M20 and is ready for inspection and evaluation of a trap 51. At the same time, the display 17 displays a message indicating that the CPU 13 changes its mode from the trap inspection and evaluation mode M20 to the valve inspection and evaluation mode M30.

Similar to the inspection and evaluation of the trap 41, for inspecting and evaluating the bypass valve 51, the probe 11 is urged against the valve 51 to be evaluated, which automatically initiates the inspection and evaluation of the valve 51. Specifically, the CPU 13 produces vibration data and temperature data from the measurement in the measurement step 200, and processes the vibration and temperature data in accordance with the valve inspection and evaluation program to determine the vibration level and surface temperature of the bypass valve 51 in the judgment step 300. The vibration level and temperature are displayed and temporarily stored in the memory 16.

After the judgment step 300, the CPU 13 automatically returns to the idling state 100 and becomes ready for the next valve inspection and evaluation. Accordingly, if another bypass valve 51 should be inspected and evaluated, the probe 11 is urged against the valve surface, and the same procedure is repeated. On the other hand, if an operator wants to inspect and evaluate a trap 41, he presses the "ENT" key once, so that CPU 13 shifts from the valve inspection and evaluation mode M30 to the trap inspection and evaluation mode M20.

As described above, in the manual switching mode, by pressing the "ENT" key when the CPU 13 is in the idling state 100, the inspection and evaluation mode of the CPU 13 can be switched between the trap inspection and evaluation mode M20 and the valve inspection and evaluation mode M30. In other words, in the manual switching mode, unless the "ENT" key is pressed when the CPU 13 is in the idling state 100, the inspection and evaluation mode currently employed is not switched to the other. This feature is useful for successively inspecting and evaluating either of traps 41 and valves 51.

However, in order to alternately evaluate combinations of trap 41 and bypass valve 51, the inspection and evaluation mode is also alternately switched between the trap inspection and evaluation mode M20 and the valve inspection and evaluation mode M30 by pressing the "ENT" key a number of times, which is a very troublesome operation.

Accordingly, for alternately inspecting and evaluating traps 41 and bypass valves 51, the previously stated automatic switching mode is used to operate the CPU 13. According to the illustrated embodiment, the switching between the manual switching mode and the automatic switching mode is done by pressing a "FUNC" key in the function key group 182 followed by pressing a "5" key.

When the CPU 13 is set to operate in the manual switching mode, it can be changed to the automatic switching mode when the "FUNC" key and the "5" key are successively pressed in the named order in the idling state 100. A message indicating that the switching mode of the CPU 13 has been changed to the automatic switching mode is displayed on the display 17.

It should be noted that in the automatic switching mode of the CPU 13, too, if the "ENT" key is pressed when the CPU 13 is in the idling state 100, the inspection and evaluation mode can be switched between the trap inspection and evaluation mode M20 and the valve inspection and evaluation mode M30.

Let it be assumed that the CPU 13 is in the automatic switching mode and that the inspection and evaluation mode in which the CPU 13 is in is the trap inspection and evaluation mode M20. Also assume that a trap 41 is first evaluated. First, the probe 11 is pressed against the surface of the housing of the trap 41, and, the CPU 13 proceeds with the measurement step 200 and the judgment step 300 of the trap inspection and evaluation mode M20 for inspecting and evaluating the trap 41. When the judgment step 300 is finished, the CPU 13 shifts to the valve inspection and evaluation mode M30 and returns to the idling state 100.

Then, the CPU 13 is ready for inspecting and evaluating a bypass valve 51. The probe 11 is pressed against the surface of the housing of the valve 51 to be evaluated, the CPU 13 proceeds with the measurement step 200 and the judgment step 300 of the valve inspection and evaluation mode M30 for inspecting and evaluating the valve 51. After performing the judgment step 300, the CPU 13 shifts to the trap inspection and evaluation mode M20 and returns to the idling state 100.

Thus, in the automatic switching mode, the CPU 13 automatically shifts to one of the trap inspection and evaluation mode M20 and the valve inspection and evaluation mode M30 after it performs the inspection and evaluation in the other mode. Therefore, when the automatic switching mode is used for alternately inspecting and evaluating pairs of a trap and a bypass valve, there is no need for manually switching the switching mode alternately. As described above, if, in the automatic switching mode, it becomes necessary to successively evaluate two traps 41 or two valves 51, the "ENT" key is pressed when the CPU 13 is in the idling state 100, which can switch the inspection and evaluation mode from one mode to the other.

In the above-described example, the inspection and evaluation mode is switched from one to the other each time one trap or valve is evaluated. For example, each time two or more traps 41 or valves 51 are evaluated, the inspection and evaluation mode can be switched from, or to, the trap inspection and evaluation mode M20 to, or from, the valve inspection and evaluation mode M30. The number of devices to be evaluated each time may be changed.

In the above-described example, only the bypass valve 51 is evaluated in accordance with the valve inspection and evaluation program, but the valves 42 and 43 in the main pipe 4 may also be evaluated in accordance with the same valve inspection and evaluation program.

When the desired inspection and evaluation of the devices, such as traps and valves, have been completed, the evaluation results are transferred to the management system 2 by connecting the equipment inspection and evaluation system 1 to the management system 2 by, for example, an RS-232C data transmission cable 3.

A command is given through the data entry section 18 to the CPU 13 in the inspection and evaluation system 2 to transfer the evaluation results, and, in response to it, the CPU transfers the evaluation results via the I/O section 19 and the cable 2 to the management system 2.

Referring to FIG. 12, data transferred from the inspection and evaluation system 1 to the management system 2 is generally described.

In FIG. 12, "Judgment Code" represents data representative of the evaluation results. The evaluation results are encoded into 2-byte decimal data, for example. In addition to the evaluation result representative data, the data to be transferred includes the area number, the trap number, the trap model, the trap type, the date of inspection of a trap, the application, the operational steam pressure, the importance (Priority), the management data (User Original Code) described later, etc.

The data shown in FIG. 12 is data of one trap. Accordingly, if ten traps are inspected and evaluated, data of the ten traps are successively transferred in a frame format similar to the one shown.

In FIG. 12, the codes "STX", "Check Sum", "ETB" and "CR" are known control codes for use in digital data communications protocols, and denote "start of transmission", "check sum", "end of transmission" and "carriage return", respectively.

Examples of the evaluation results provided by the inspection and evaluation system 1 are as follows.

The inspection and evaluation system 1 or its CPU 13 judges whether or not there is any steam leakage, and, if there, judges the degree of leakage. For a trap having heavy steam leakage, i.e. a blowing trap, a display of "Blowing" is displayed on the display 17. Depending on the degree of steam leakage less than "Blowing", a display of "Leak/Large", "Leak/Medium" or "Leak/Small" is displayed for a large steam leakage trap from which the amount of steam leakage large, a medium steam leakage trap from which the amount of steam leakage is medium, and a small steam leakage trap from which the amount of steam leakage is small, respectively. If it is judged that traps are almost in an inoperative state, a display of "Blocked" is given on the display 17. If drainage of condensate is incomplete, so that condensate stays in the trap, which decreases the temperature of the trap, the inspection and evaluation system 1 detects it and provides a message of "Low Temp" on the display 17. Further, if a trap to be inspected and evaluated is of a temperature adjustable type, and if the temperature is outside the preset temperature range, the system 1 detects it and causes a message of "Fail Adjust" to be displayed. If nothing is judged wrong in the traps, a display of "Good" is displayed.

An experienced operator may locate from his experience where in the trap steam is leaking, from a trap body, a trap lid, a gasket or some other part. The inspection and evaluation system 1 according to the illustrated embodiment is arranged such that in addition to the evaluation results, information relating to the location where steam is leaking can be manually entered through the data entry section 18. If steam is leaking through the trap body, a display of "Leak/Body" is displayed, and if steam is leaking due to malfunctioning of a gasket, a message of "Leak/Gasket" is displayed.

For traps which have not inspected yet or for traps which are not operating, information representing it can be manually input in place of inspection results, and a message "Not Inspected Yet" or "Not in Service" is displayed.

As shown in FIG. 1, the management system 2 includes a CPU 21, a data entry section 22, including, for example, a keyboard and a mouse, connected to the CPU 21, a display 23, e.g. a cathode ray tube or a liquid crystal display, a memory 24 including a ROM and a RAM, and an I/O circuit 25. In terms of hardware, the management system 2 may be provided by, for example, a personal computer.

The memory 24 stores therein detailed data of respective traps. Detailed data include, for example, an area number indicating where a particular trap is disposed in the plant, a trap number, a trap model name, a manufacturer, an application or use of the trap, a steam pressure (operational pressure), and the priority of each trap. The memory 24 also stores therein a management program for providing arithmetic operations on and analyzing data transmitted from the inspection and evaluation system 1 for use in managing the plant and respective traps. The management program is provided for the memory 24 from a record medium (not shown), e.g. a flexible disc, a hard disc, a magnetic tape, a CD-ROM, a magneto-optical disc, a DVD and a paper tape.

Data sent from the inspection and evaluation system 1 through the cable 1 is applied through the I/O circuit 25 to the CPU 21, which, then, stores it in the memory 24. When storing data from the inspection and evaluation system 1 in the memory 24, the CPU 21 arranges data of traps which have been already stored in the memory and data from the system 1 in a list like the one shown in FIG. 13. In the list, the respective data are re-arranged on the basis of the area numbers and the trap numbers. The CPU 21 provides arithmetic operations on and analyzes the data stored in the memory 24 in accordance with the management program, to compute the number of defective traps, the percent defective, the loss caused by steam leakage from the defective traps, etc. The analysis may be displayed on the display 23, stored in the memory and/or output to peripheral apparatuses (not shown), such as a printer.

From the analysis of the data made by the management system 2, a person operating the plant can grasp the operation states and efficiencies of individual traps in the plant. He can foresee traps which will require repairing or replacement and, therefore, can achieve appropriate maintenance of the plant and traps.

What state of traps should be judged defective or which traps should be repaired or replaced may differ from person to person who runs plants. For example, even when steam is leaking through a trap, no adverse effect may be given to products manufactured by a plant in which the subject trap is used, though the operating efficiency of the plant decreases. Accordingly, one person may, but another may not, want to judge defective those traps for which the amount of steam leakage is medium or small, or may not want to judge them as ones which require repairing or replacement. Basically, the criteria according to which traps are judged defective, repaired or replaced should be set by plant managers.

This criteria setting can be realized by the management system 2 of the present invention. The CPU 21 of the management system 2 operates in the following manner in accordance with the management program.

Figure 14:
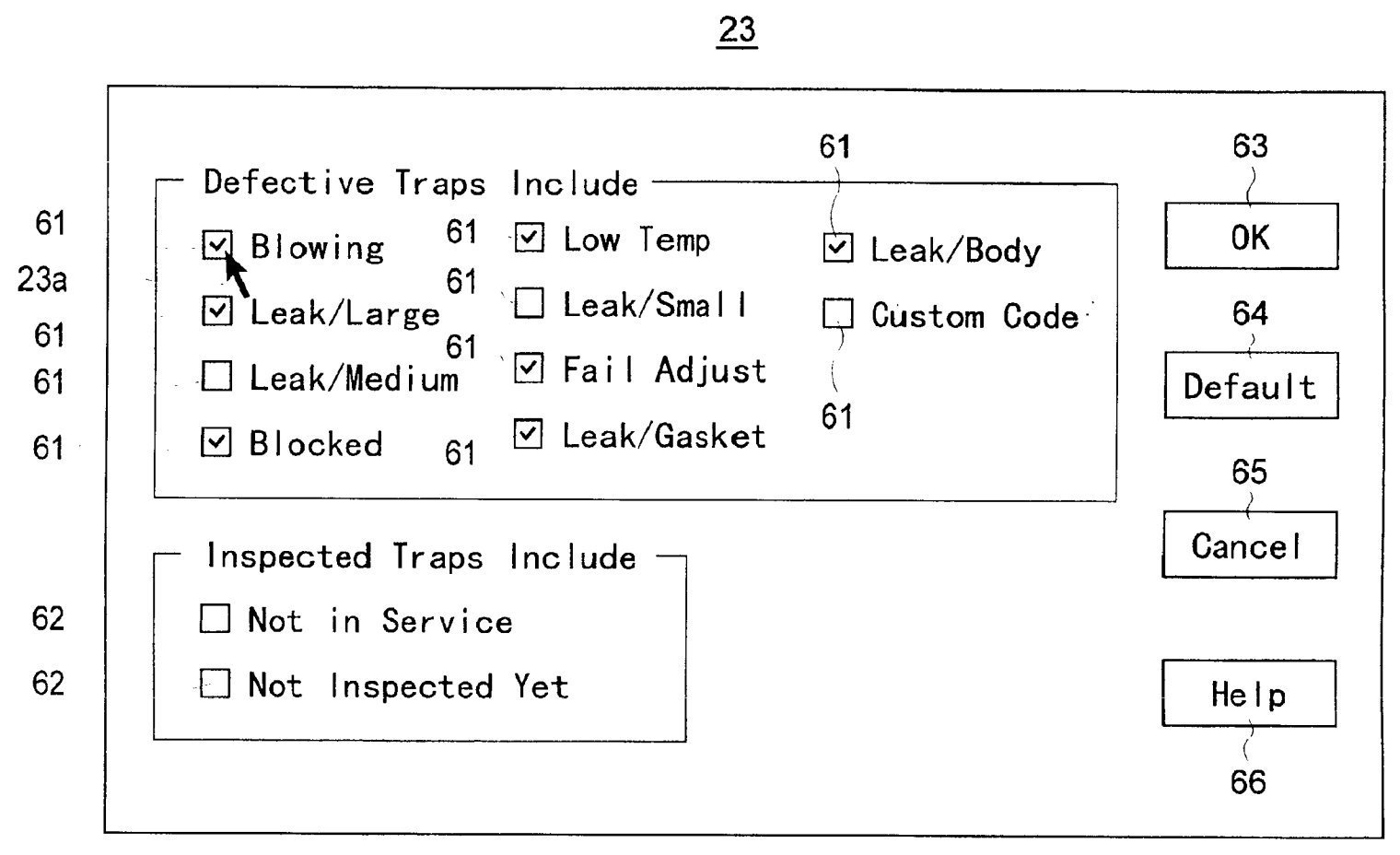

Prior to providing arithmetic operations and analysis on the data, the CPU 21 first causes the display 23 to display a picture like the one shown in FIG. 14. Using the picture, an operator can choose and determine which evaluation items respective traps should meet in order for them to be judged defective. A thick arrow 23a displayed in the upper left portion is a cursor, which can be freely moved over the screen by a mouse.

Squares 61 are displayed in front of respective evaluation items, such as "Blowing", "Leak/Large", "Leak/Medium", "Leak/Small", "Blocked", "Low Temp", "Fail Adjust", "Leak/Body" and "Leak/Gasket". If traps evaluated as any one of these items should be deemed defective, a check mark is attached in the square 61 before an appropriate item. In addition, the management system 2 is arranged such that an operator can add his or her own judgment item, which can be chosen by marking the square before the display of "Custom Code".

For setting the management system 2 so as to judge a "Blowing" trap as defective, the square 61 in front of the indication "Blowing" is marked with a check by moving the cursor 23a and pressing the left side button on the mouse.

The picture in FIG. 14 shows a setting for judging the following traps defective: traps from which steam is blowing (Blowing traps), traps from which steam is not blowing but is leaking in a relatively large amount (Leak/Large traps), traps which are blocked (Blocked traps), traps for which the temperature is too low (Low Temperature traps), traps failing to adjust temperature (Fail Adjust traps), traps having a body through which steam is leaking (Leak/Body traps) and traps having a gasket through which steam is leaking (Leak/Gasket traps).

Traps which have not been inspected yet, hereinafter referred to as non-inspected traps, and traps which are not being used, hereinafter referred to as not-in-service traps, can be categorized as defective traps. For that purpose, items "Not Inspected Yet" for non-inspected traps and "Not in Service" for not-in-service traps are displayed with squares 62 before them. If the square 62 before "Not-Inspected-Yet" or "Not-in-Service" is marked with a check mark, non-inspected traps or not-in-service traps are judged defective.

In order to cancel the setting, the cursor 23a is moved to the marked square in front of a desired item, and the left button on the mouse is clicked.

After checking the judgment items for judging defective traps, the cursor 23a is moved to click a button 63, "OK", in the upper right portion of the screen. Then, the CPU 21 treats only those traps which fall in the categories marked with a check, and treats those traps which fall in the unmarked categories as good or normal traps.

The evaluation results shown in FIG. 13 are analyzed to determine which traps are good and which traps are defective according to the criteria shown in FIG. 14. The results of judgment are shown in the list in FIG. 15. The trap having a trap number of "00005" evaluated as "Fail Adjust" and the trap having a trap number of "00007" evaluated as "Leak/ Large" are judged to be defective. However, the traps having trap numbers of "00003" and "00009" evaluated as "Leak/ Medium" and "Leak/Small", respectively, are judged "good". In FIG. 15, numerals in the column "Loss ($)" indicate losses in dollar incurred due to steam leakage.

If a button 64 labeled "Default" in the display shown in FIG. 14 is pressed or clicked, the CPU 21 automatically sets standard criteria. For example, in the "Default", the CPU 21 adds a check mark in the squares 61 in front of "Blowing", "Leak/Large", "Leak/Medium", "Leak/Small", "Blocked", "Low Temp", "Fail Adjust", "Leak/Body" and "Leak/ Gasket". Then, all the traps that fall in these categories are treated as defective traps.

When an operator presses or clicks a button 65 labeled "Cancel", the display on the screen is cancelled.

If a button 66 labeled "Help" is clicked, a help display containing explanations about the displayed items are given.

Figure 16:
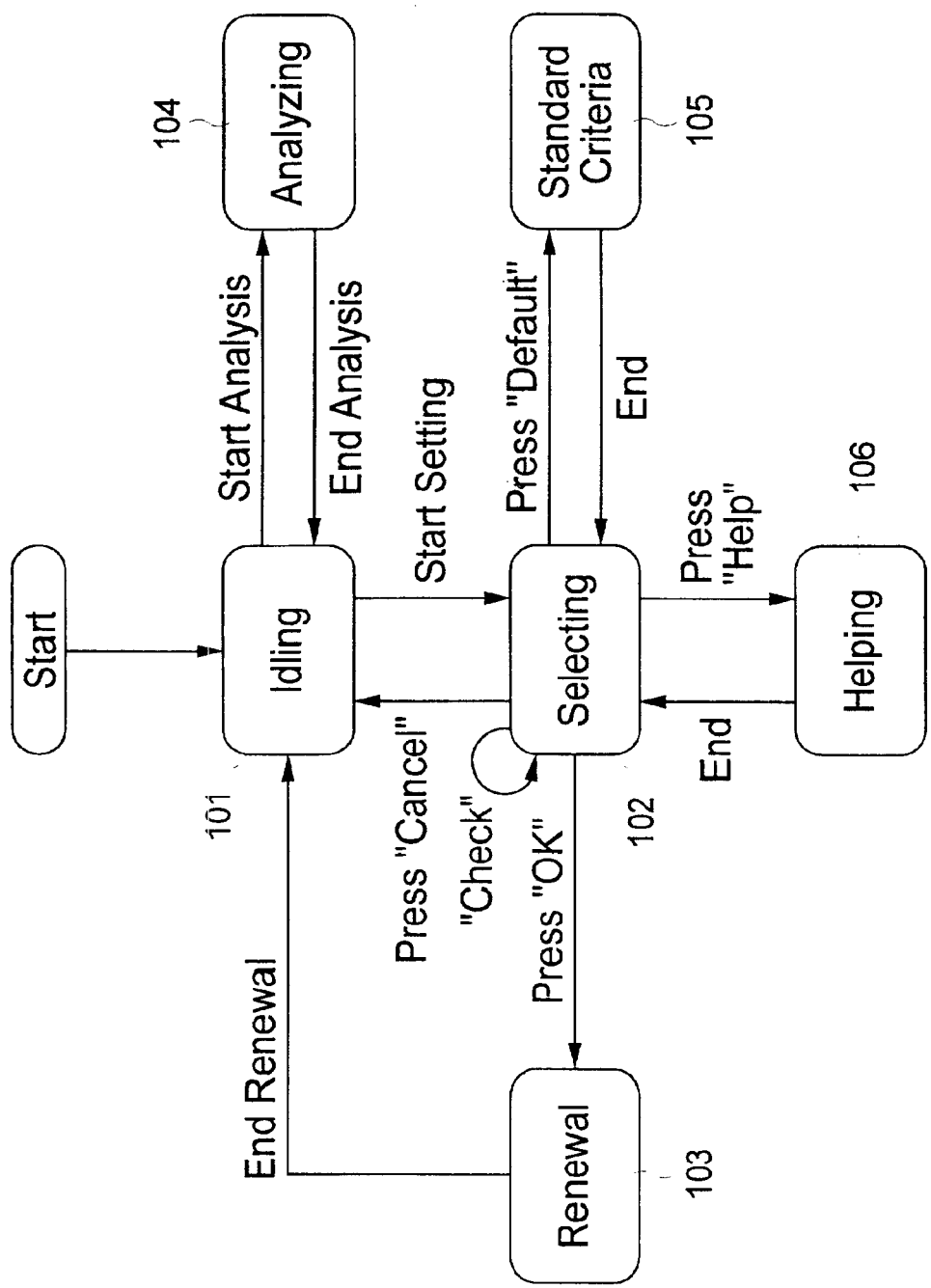
FIG. 16 is a state transition diagram schematically illustrating operation of the CPU of the management system to set the trap inspection and evaluation references and to analyze data of traps in accordance with the set references.

The operation of the CPU 21 for setting the judgment criteria and providing arithmetic operations on and analysis of data according to the criteria is shown in FIG. 16.

The CPU 21 first enters in an idling state 101, in which the CPU 21 causes a menu to be displayed on the display 23. An operator can set what kind of operation and analysis should be used.

The operator gives a command through the data entry section 22 to display the picture shown in FIG. 14. Then, the CPU 21 shifts to a selecting step 102 and the picture shown in FIG. 14 is displayed on the display 23. In the selecting step 102, the mouse is used to choose desired ones of the evaluation items by marking appropriate ones of the squares 61 and 62.

After the selection of the desired evaluation items, i.e. the setting of the judgment criteria, the CPU moves to a renewal step 103, in which the set criteria are stored. Then, the CPU 21 returns to the idling state 101.

In this state, when an operator gives a command to the CPU 21 through the data entry section 22 to start arithmetic operations and analysis of data, the CPU moves into an analyzing step 104. In the analyzing step 104, trap judgment based on the set criteria as stored in the renewal step 103 is carried out. The judgment results are displayed in the form shown, for example, in FIG. 15 on the display 23. The judgment results may be used to compute percent defective and other desired data. After the analysis in the analyzing step 104 is completed, the CPU 21 returns to the idling state 101.

If the "Default" button 64 is pressed when the CPU 21 is in the selecting step 102, the CPU 21 shifts into a standard criterion setting step 105, and the standard criteria described previously are set. After that, the CPU 102 returns to the selecting step 102.

If the "Cancel" button 65 is pressed when the CPU 21 is in the selecting step 102, the CPU 21 returns directly to the idling state 101.

If the "Help" button 66 is pressed or clicked when the CPU 21 is in the step 102, the CPU 21 moves to a helping step 106 and causes the help display to be displayed. If a command to end the help display is applied to the CPU 21 in the helping step 106, the CPU 21 returns to the selecting step 102.

As described above, in the management system 1 according the illustrated embodiment of the present invention, criteria for the judgment of the performance of traps evaluated by the inspection and evaluation system 2 can be freely set so that traps can be managed in any manners desired by plant running individuals.

The control sequence for the CPU 21 is not limited to the one shown in FIG. 16, but other suitable control sequences may be used.

Data of traps to be managed by the management system 2 are stored in the memory 24 in the form of a list in which traps are arranged, for example, on an area number and trap number basis, as shown in FIG. 13. The person running a particular plant may want to add some management items for better management of the traps. Such additional management items may include, for example, names of persons supervising particular traps and company names maintaining particular traps. According to one embodiment of the present invention, such special management items can be added for better management.

The management program includes a program for adding special management items. The CPU 21 operates in the following manner in accordance with the management program to add management items.

First, a command to notify the CPU 21 that a special management item is to be added is entered through the keyboard. In response to this command, the CPU 21 displays a picture like the one shown in FIG. 17(a) on the display 23, which is used to add a desired management item.

The picture in FIG. 17(a) includes a message 71 of "User 1", which is a first management item the user or the person who is running a particular plant desires to add, and a list 72 containing items labeled "Code", "Name" and "Comments", respectively. "Name" may be a name of a person or of anything assigned to "Code", and "Comments" are comments on each "Name". When the picture of FIG. 17(a) is first displayed, there are no entries in the respective boxes below "Code", "Name" and "Comments". For ease of explanation, the picture shown in FIG. 17(a) is a picture resulting from entering some data of the "User 1" item with respect to "Code", "Name" corresponding to the "Code" and "Comments".

For changing the contents of the list 72, the cursor 23a is moved to a desired one of the "Name" buttons by using the mouse, and the button is clicked, which results in display of a picture shown in FIG. 17(b). The picture shown in FIG. 17(b) contains input fields 73–75 labeled "Code", "Name" and "Comments" which respectively correspond to "Code", "Name" and "Comments" in the list 72 shown in FIG. 17(a). The respective input fields can be filled with desired data (characters) through the data entry section 22, to thereby edit, i.e. add, change or delete some or all of data previously input in each field.

If the display in the "Code" field 73, i.e. a Code number, is to be changed, either upward or downward oriented arrow 73a or 73b is clicked, which causes the code number displayed in the field 73 to change.

When the editing of the data is completed, an "OK" button 76 is clicked, which results in changing the corresponding data in the memory 24. Then, the display returns to the one shown in FIG. 17(a). The data contained in this displayed picture are the ones after the changes made using the display shown in FIG. 17(b).

If a "Cancel" button 77, instead of the "OK" button 76, is pressed, the CPU 21 does not provide alterations made in the display of FIG. 17(b) to the data, but restores the display of FIG. 17(a). In this case, the contents of the list 72 remain the same as the previous ones.

The new management item "User 1" prepared by the process using the displays shown in FIGS. 17(a) and 17(b) is added to the list shown in FIG. 13, which results in the list shown in FIG. 18. Thereafter, the CPU 21 processes the data in the new item "User 1" as a management item. For example, data in the item "User 1" can be data to be searched or retrieved.

The list of FIG. 18 contains items labeled "Processing Data", "Manufacturer" etc. which are not shown in FIG. 13. This is because FIGS. 13 and 18 are different portions of the same list. In addition to the data shown in FIGS. 13 and 18, other data, e.g. heights of the locations where traps are disposed, operating conditions of the piping system where particular traps are used (e.g. indication of whether the piping system is continuously or intermittently operated), and so forth are also stored as part of detailed trap data in the memory 24.

Figure 19:
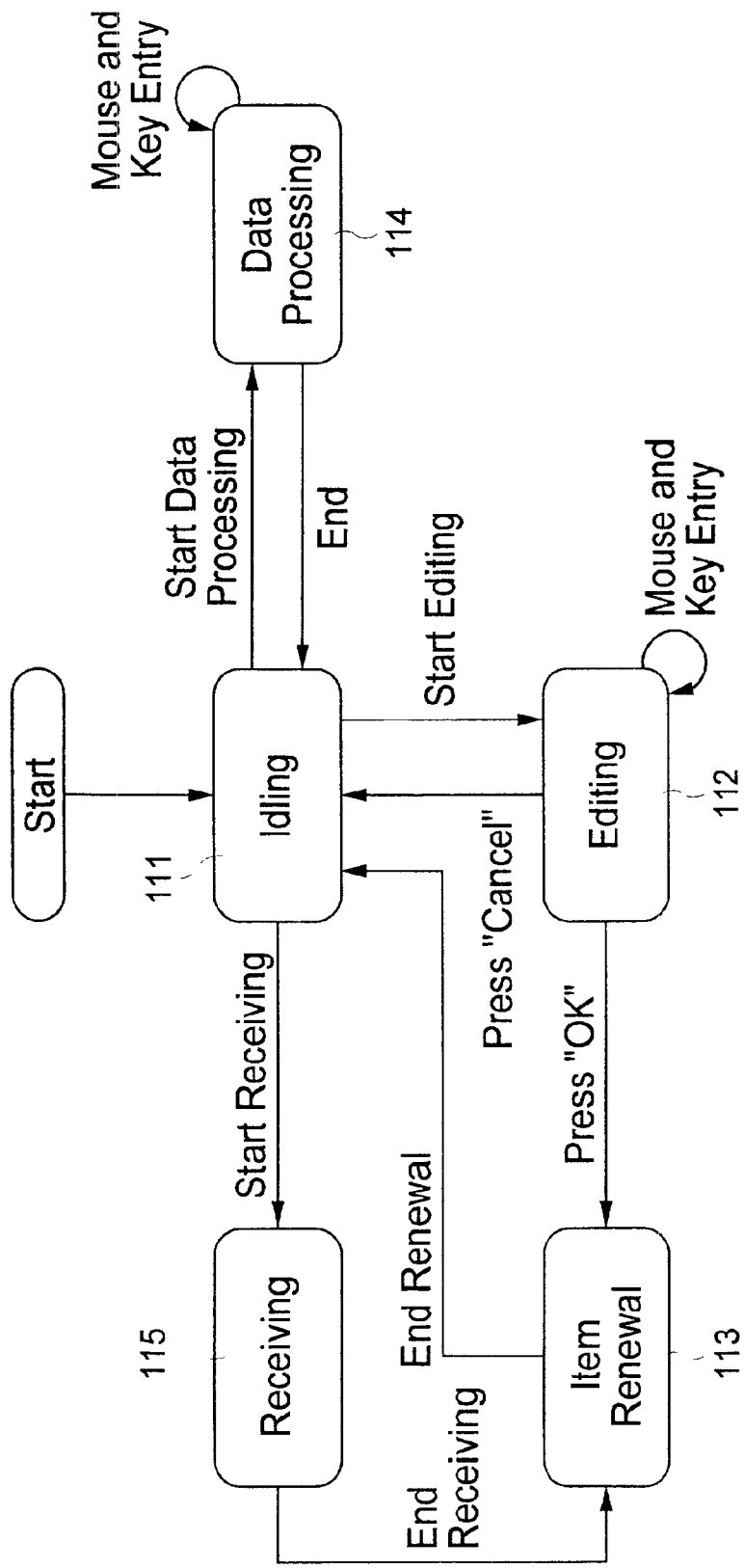
FIG. 19 is a state transition diagram schematically showing operation of the CPU of the management system to additionally set special management items.

The operation of the CPU 21 for adding a new management item is illustrated in the state transition diagram shown in FIG. 19.

First, the CPU 21 enters an idling state 111, and the display shown in FIG. 17(a) is displayed on the display 23.

The mouse is used to command that the display of FIG. 17(b) be displayed when the CPU 21 is in the idling state 111, shifting the CPU 21 into an editing step 112, so that the display shown in FIG. 17(b) is displayed on the display 23. Then, using the keys on the data entry section 22, addition, alteration and/or deletion of aimed data are done on the display shown in FIG. 17(b).

After the editing of the aimed data in the editing step 112, the "OK" button 76 is pressed or clicked, resulting in the shift of the CPU 21 to an item renewal step 113. In the renewal step 113, the detail or data of the management item, e.g. "User 1", edited in the editing step 112, is renewed, and, then, the CPU 21 returns to the idling state 111. At the same time, the display shown in FIG. 17(a) renewed in accordance with the changes made in the editing step 112 is displayed on the screen.

If a command is given through the data entry section 22 to the CPU 21 in the idling state 111 to initiate any data processing, the CPU 21 moves into a data processing step 114. In the data processing step 114, the CPU 21 modifies the data of respective traps shown in FIG. 18, with respect to the management item of which the data has been edited (e.g. added) by the use of the pictures shown in FIGS. 17(a) and 17(b).

For moving the CPU 21 out of the data processing step 114, a command is given through the data entry section 22, so that the CPU 21 returns to the idling state 111.

In addition to the steps 111–114, a receiving step 115 is included. In the receiving step 115, data from the inspection and evaluation system 1 is received. According to the invention, the editing of data of the management items can be done also in the inspection and evaluation system 1, and the editing (e.g. addition) of data made in the inspection and evaluation system 1 is transferred to the management system 2 to modify the processing to be done in the management system 2 in accordance with the edited data. In other words, the management items managed by the managing system 2 can be also edited through the inspection and evaluation system 1.

For that purpose, the CPU 13 of the inspection and evaluation system 1 can operate in a manner similar to the CPU 21 of the management system 2.

The editing operation of the CPU 13 is now described with reference to FIG. 20. The CPU 13 fist enters into an idling state 121, which is similar to the idling mode M2 shown in and described with reference to FIG. 6 and to the idling state 100 shown in and described with reference to FIG. 11. In the idling state 121, the CPU 13 is awaiting a command.

When a command to add a management item is given through the data entry section 18 to the CPU 13, the CPU 13 enters into an editing step 122. A desired management item is added through the data entry section 18, and detailed data relating to the added management item are entered, added or changed.

When the addition of a new management item or editing of data of the management item in the editing step 122 is finished, the CPU 13 enters into an item renewal step 123. In the item renewal step 123, the new management item and its edited detailed data prepared in the editing step 122 are added to the list of trap data stored in the memory 16. Then, the CPU 13 returns to the idling state 121. When the addition of a new item in the editing step 122 is cancelled, the CPU 13 returns directly to the idling state 121 without entering in the item renewal step 123.

If, in the idling state 121, a command to initiate any data processing is given through the data entry section 18, the CPU 13 enters in a data processing step 124, and processes detailed data of traps including the newly added management item.

For releasing the CPU 13 from the data processing step 124, a command is given through the data entry section 18, so that the CPU 13 returns to the idling state 121.

For transferring the detailed data of traps including the newly added management item to the management system 2, a command is given to the CPU 13 through the data entry section 18, so that the CPU 13 enters into a transmitting step 125. In the transmitting step 125, the CPU 13 transmits data of the newly added management item together with the detailed data of traps to the management system 2. The data are transmitted in the frame format shown in FIG. 12, e.g. in the form of three-byte decimal data. After transmitting the required data, the CPU 13 returns to the idling state 121.

In the management system 2, the CPU 21 enters in the receiving step 115 for receiving the data transmitted from the inspection and evaluation system 1. Then, the CPU 21 enters in the item renewal step 113 where it adds the management item added in the inspection and evaluation system 1 contained in the transmitted data. After that, the CPU 21 returns to the idling state 111, and repeats the previously stated operation.

As described above, the inspection and evaluation system 1 and the management system 2 are compatible with respect to data.

Figure 20:
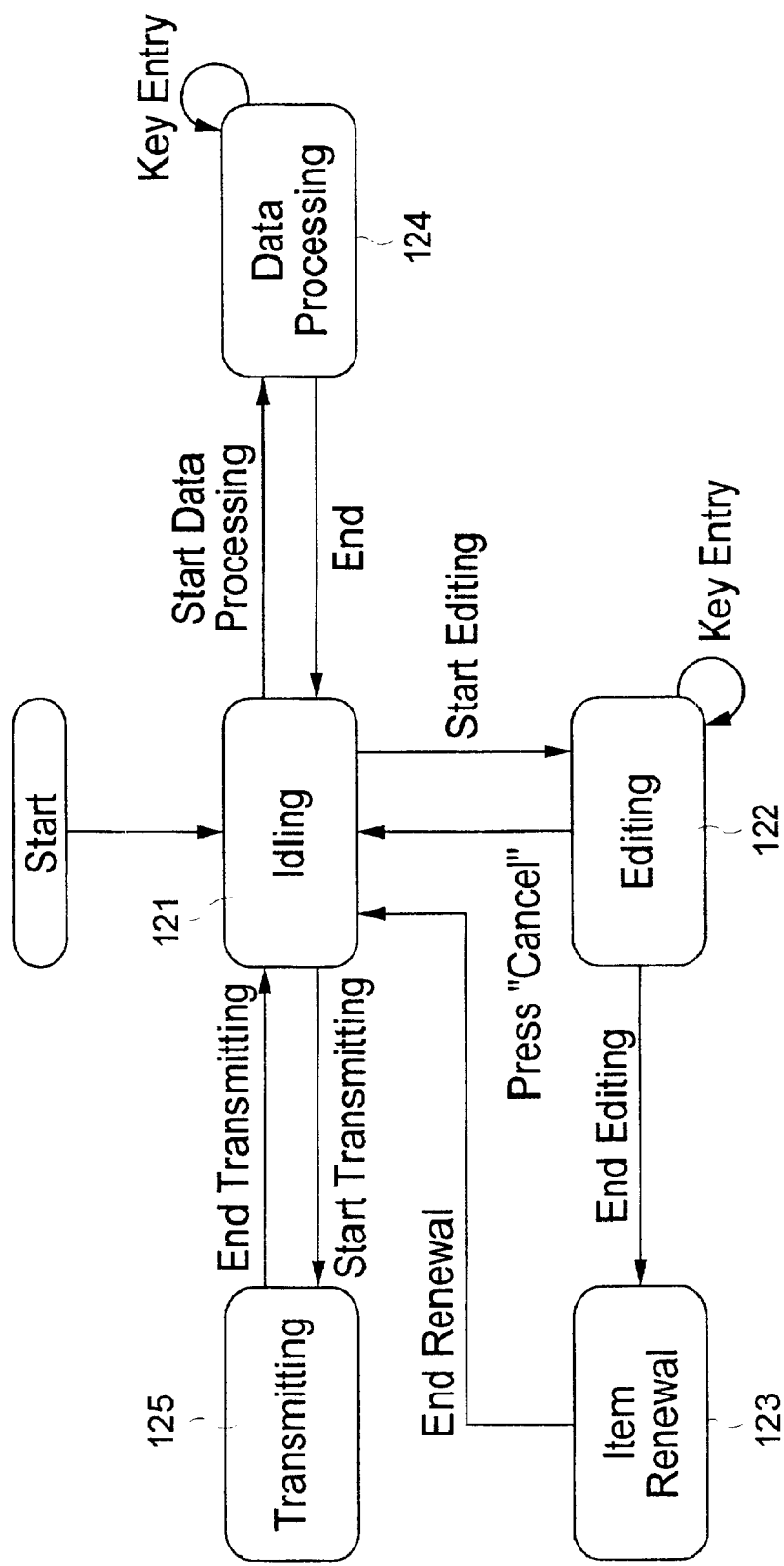
FIG. 20 is a state transition diagram schematically showing operation of the CPU of the inspection and evaluation system to additionally set special management items.

The CPUs 21 and 13 have been described as operating in the manner shown in the state transition diagrams of FIGS. 19 and 20, but they can be arranged to operate in different ways.

The number of management items to be added is not limited to one, but two or more items may be added.

According to the present invention, a piping diagram showing locations where respective traps are disposed can be freely drawn on the display 23 of the management system 2. By relating traps in the drawn piping diagram with detailed data stored in the memory 24, detailed information about the respective traps can be directly determined from the piping diagram.

A program for realizing this feature is also contained in the management program, and the CPU 21 operates in the following manner in accordance with the drawing program.

Figure 21:
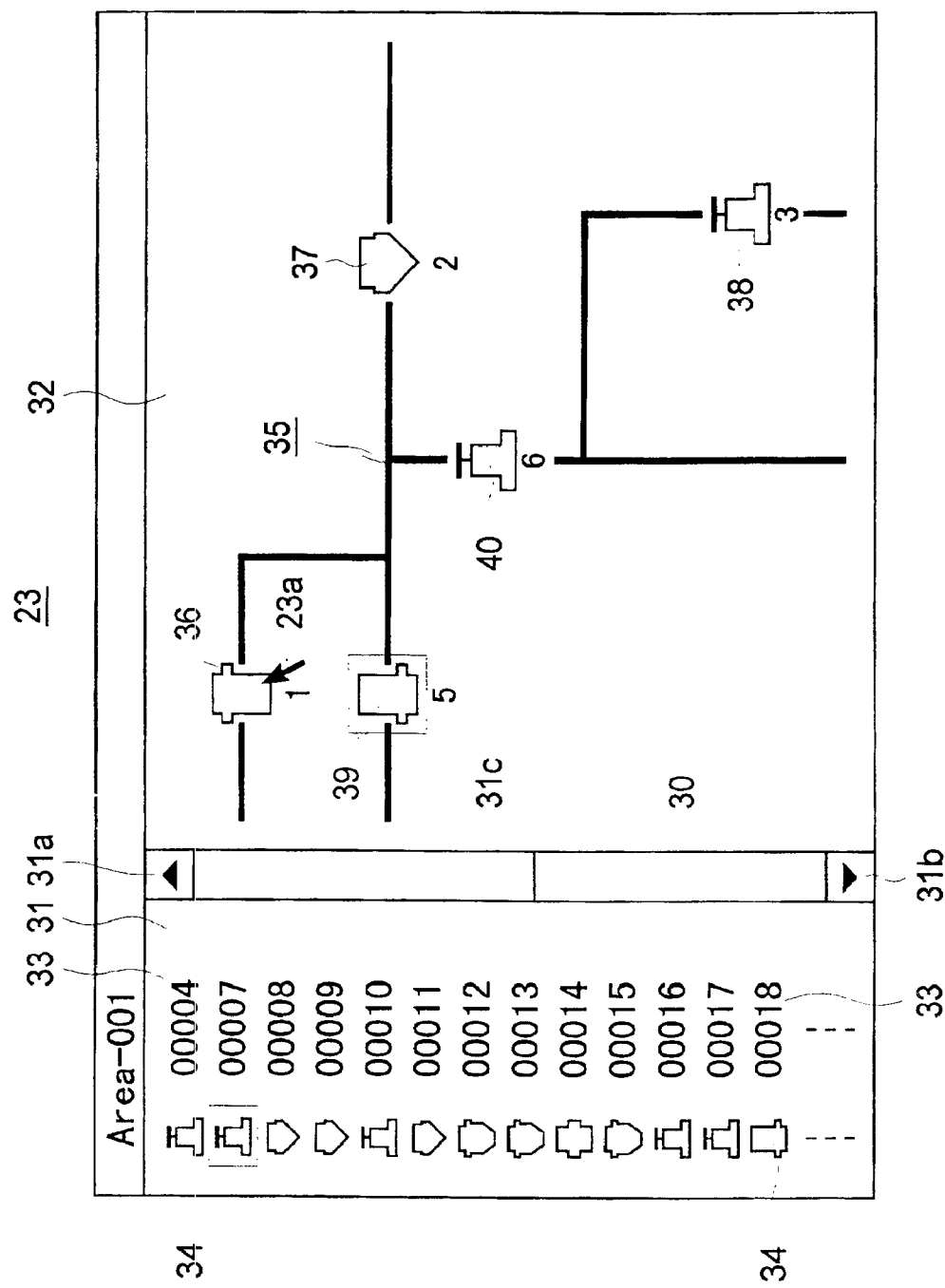
FIG. 21 shows an example of display appearing on the display of the management system in which a steam plant piping system and icons for respective traps in the piping system are displayed.

The CPU 21 displays a picture like the one shown in FIG. 21 on the display 23. A vertical line 30 divides the picture area into left and right regions 31 and 32. The vertical line 30 can be freely moved leftward or rightward by drag and drop, so that the ratio in area between the regions 31 and 32 can be changed.

In the display region 31, trap management numbers 33 in a particular area assigned with an area number of, e.g. "001" (displayed as "Area-001"), are displayed, being vertically arranged in order from the smallest one toward larger ones, as shown. Relatively small-sized icons 34 are displayed on the left sides of the respective trap numbers 33. The respective icons 34 have shapes corresponding to traps of the trap numbers.

Arrow buttons 31a and 31b are disposed on the right edge of the display region 31. The arrow buttons 31a and 31b are used to scroll the picture in the display region 31. In addition to the arrow buttons 31a and 31b, a scroll box 31c is disposed on the right edge of the display region 31 to indicate what portion of the entire traps is being displayed. What are displayed in the display region 31 can be changed by pressing either the arrow button 31a or 31b or dragging a scroll box 31c.

A piping diagram 35 for the area number "001" is displayed in the right display region 32. A plurality of icons 36–40 having a larger size than the icons 34 are displayed. The icons 36–40 indicate that traps are disposed at locations in the actual piping system corresponding to their locations on the displayed piping diagram. For ease of knowing the traps corresponding to the respective icons 36–40, trap numbers are displayed below the respective ones of the icons 36–40. Also, the respective icons 36–40 have shaped corresponding to the traps which the icons represent, as the icons 34. Different from the trap numbers displayed in the display region 31, the trap numbers displayed in the region 32 are the numbers displayed in the region 31 from which zeros (0) in higher positions in the numbers are removed. For example, trap numbers "00001" and "00100" displayed in the display region 31 are displayed as "1" and "100", respectively.

Figure 22:
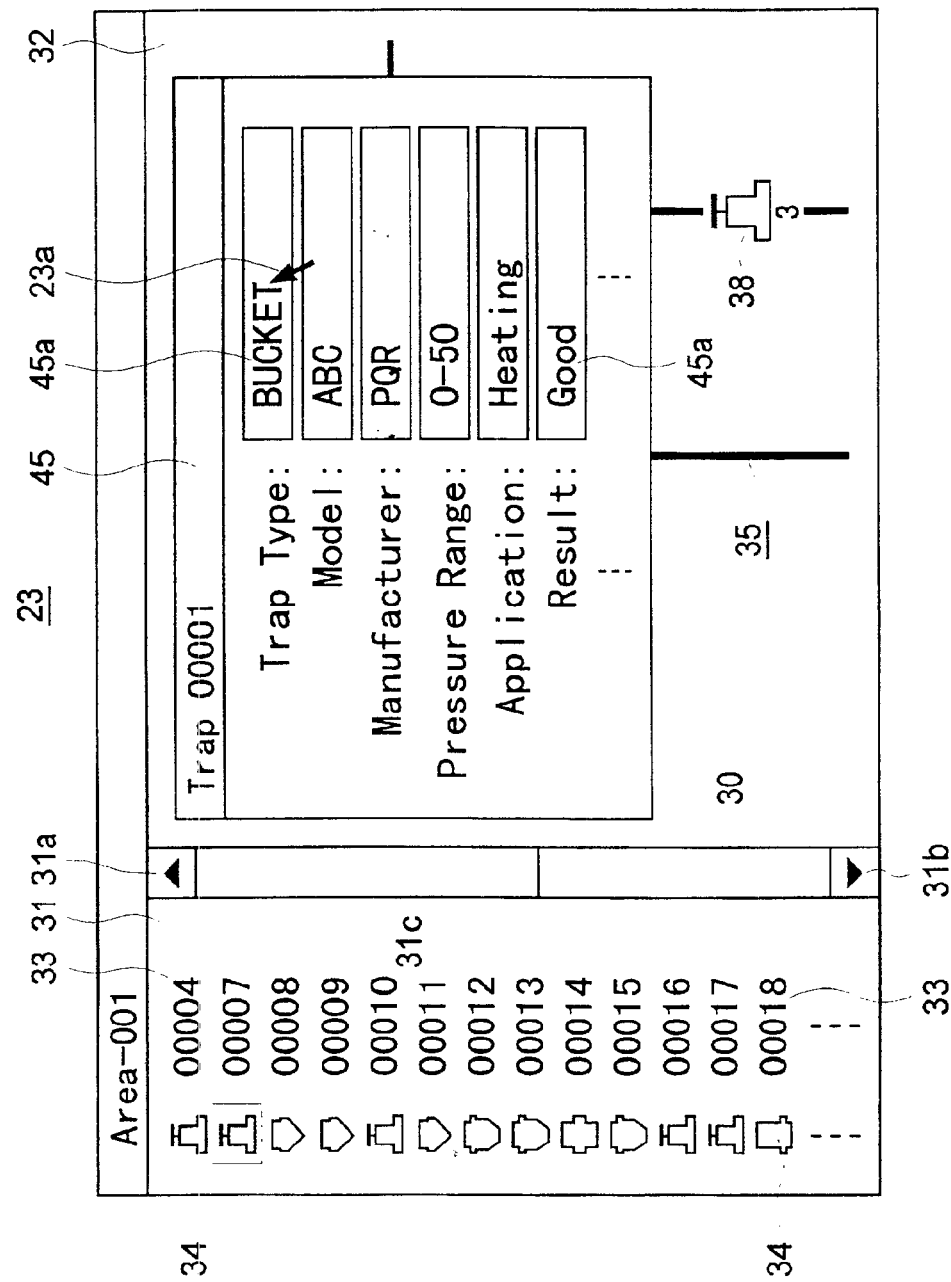
FIG. 22 is an example of detailed data of a particular trap selected from those displayed on the display screen shown in FIG. 21.

The respective icons 34 and the icons 36–40 are linked or associated with the detailed data shown in FIG. 13. The cursor 23a is moved onto one of the icons, and the icon is clicked twice (or double-clicked). Then, the detailed data of the trap corresponding to the double-clicked icon is called out of the memory, and, the same time, a display window 45 like the one shown in FIG. 22 is displayed on the display 23. The called detailed data is displayed in a predetermined format in the display window 45. FIG. 22 is an example resulting from double-clicking the icon 36, which displays, in the window 45, the detailed data of the trap with the trap management number "1" corresponding to the icon 36.

In the display window 45, the contents of data in boxes 45a can be changed. The cursor 23a is moved onto a desired data box 45a and clicked, the clicked data is renewable. The keys on the keyboard and the mouse are used to renew the data in the data box 45a.

As described previously, the detailed data includes the item "Result" (FIG. 15) showing the judgment of the data in "Evaluation" in the list shown in FIG. 14. The CPU 21 reflects the Result of judgment on the display of each of the icons 34, 36–40 in the display region 32. For example, as shown in FIG. 21, the icons for traps with the trap number "5" and "7" of which the judgment results shown in the column "Result" are "Failed" are displayed in a different form than the remaining ones. Specifically, the icons 34 for the trap No. 00007 in the region 31 and the icon 37 for the trap No. 5 (00005) in the region 32 are shaded. Instead of shading, coloring or reversing may be used.

Figure 23:
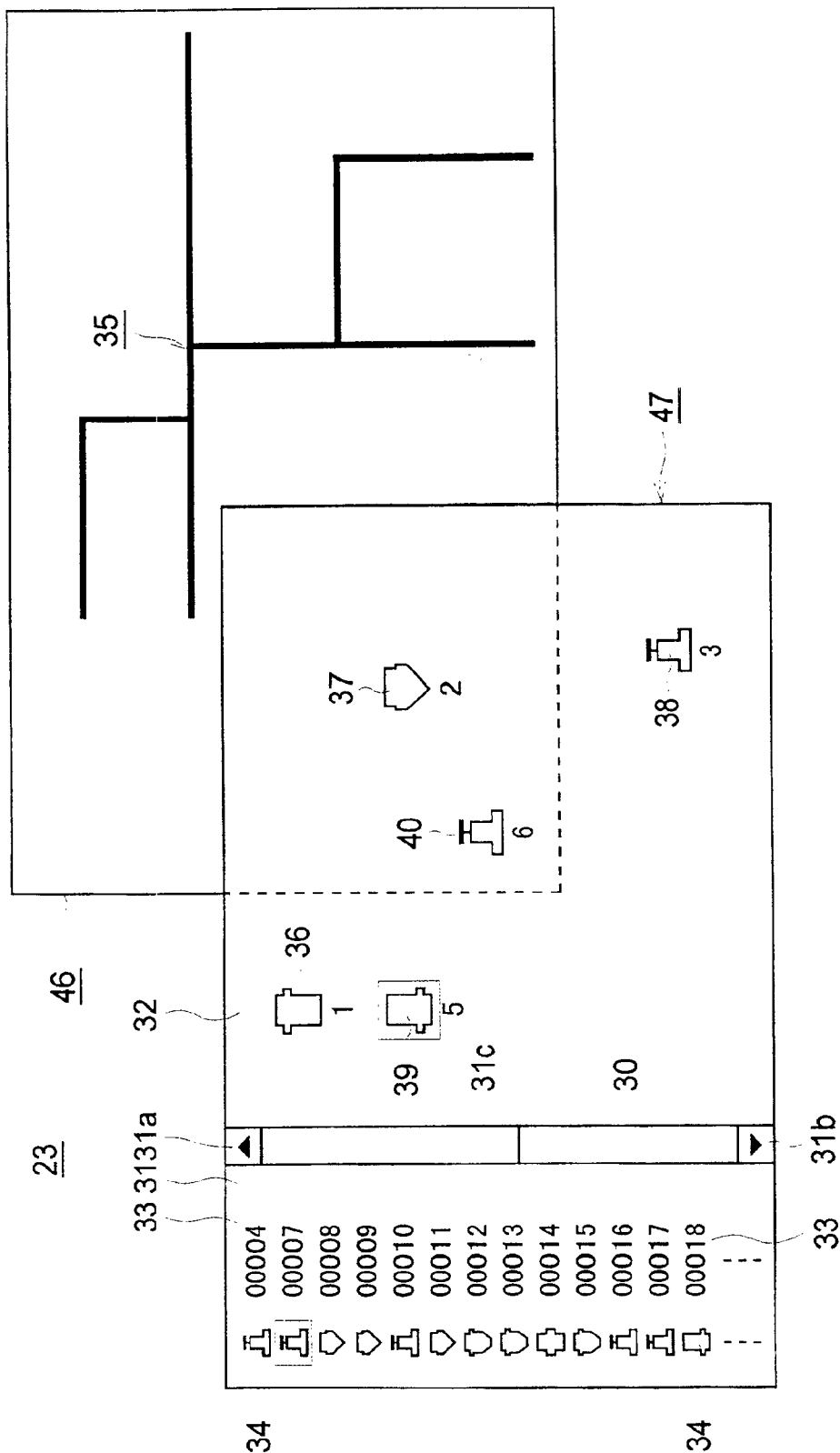
FIG. 23 illustrates the arrangement of the display shown in FIG. 21.

The display shown in FIG. 21 consists of two separate independent displays, namely, a piping diagram display 46 showing only the piping diagram 35 and a main display 47 showing items other than the piping diagram 35, with the main picture 47 superimposed on the display 46 (see FIG. 23).

Any desired piping diagram picture 46 may be prepared by drawing dots, lines and characters, using the mouse and keyboard of the data entry section 22.

Icons 34 and 36–40 can be freely moved across the main picture 47 by, for example, dragging. In the display region 31, the icons 34 and 36–40 are displayed in a smaller size with the trap management numbers 33 displayed on the right side of the respective icons. When the icons are dragged into the display region 32, the icons are enlarged as the icons 36–40 with trap management numbers displayed below the respective icons. The display window 45 displayed when one of the icons 34 and 36–40 is double-clicked is also displayed on the main picture 47.

Figure 24:
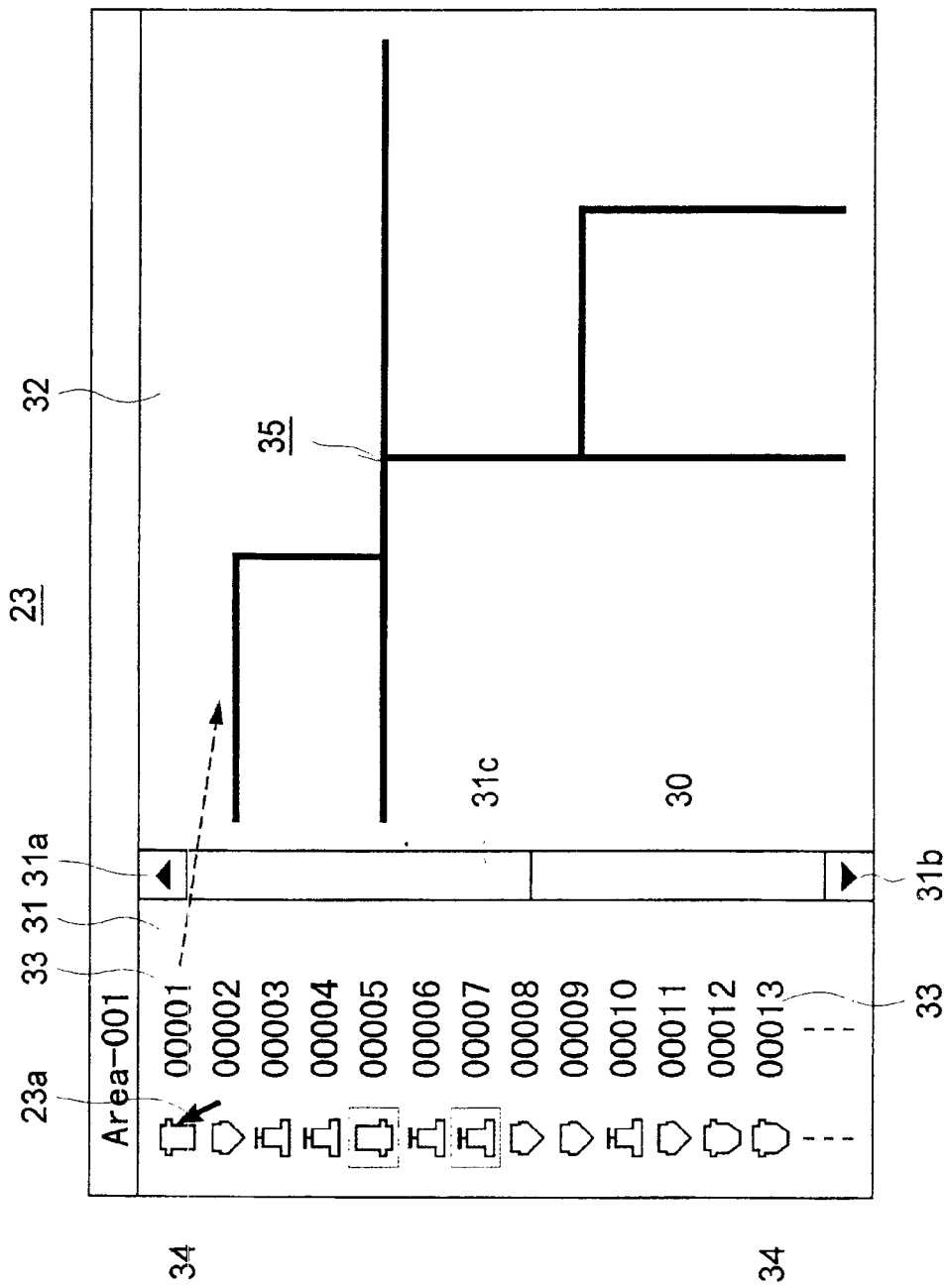
FIG. 24 illustrates how to form the display shown in FIG. 21.
Figure 25:
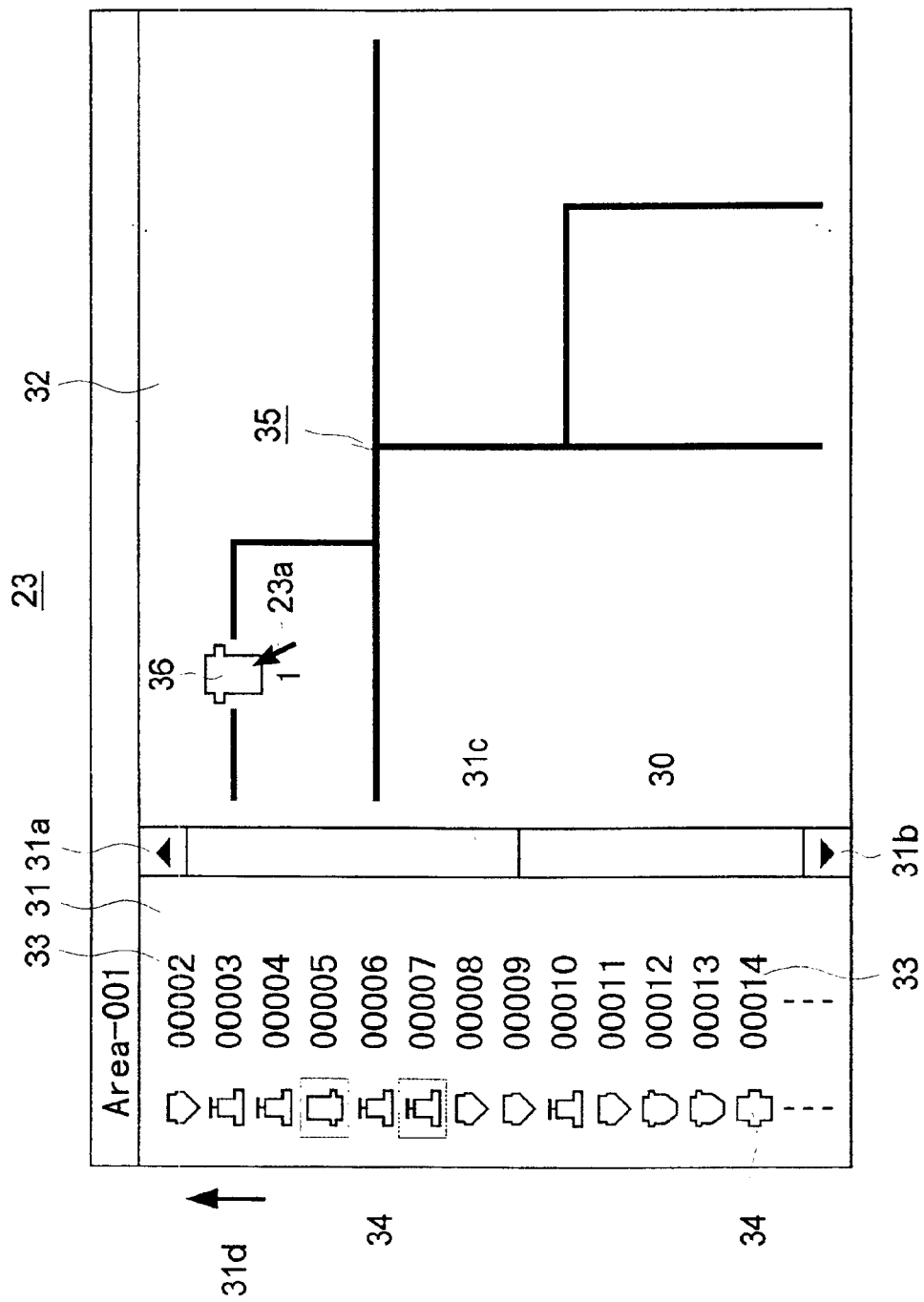
FIG. 25 shows the result of the processing shown in FIG. 24.

For preparing the picture shown in FIG. 21, for example, a desired piping diagram 35 in a desired area (Area No. 001 in the illustrated example) is first drawn on the picture 46, which results in a picture shown, for example, in FIG. 24. In the default, all of the icons are displayed in the left-hand side display region 31 as shown in FIG. 24.

Then, a desired one of the icons 34 in the right display region 31, e.g. the icon for the trap having a trap number of "000001" (or "1"), is dragged and dropped to a desired location on the piping diagram 35 as indicated by a broken line arrow in FIG. 24. The location corresponds to the actual location in the piping system where the trap No. 1 is disposed. This results in the picture shown in FIG. 25 in which the icon 36 (34) for the desired trap No. 1 is displayed at the desired location. When the icon 34 for the trap No. 1 is moved to the display region 32, the icons and trap numbers lower in order are shifted upward as indicated by an arrow 31d in FIG. 25.

In a similar manner, the icons 34 for the traps having the management numbers "2", "3", "5" and "6" are dragged and dropped to desired locations on the piping diagram 35, which finally results in the display shown in FIG. 21.

Figure 26:
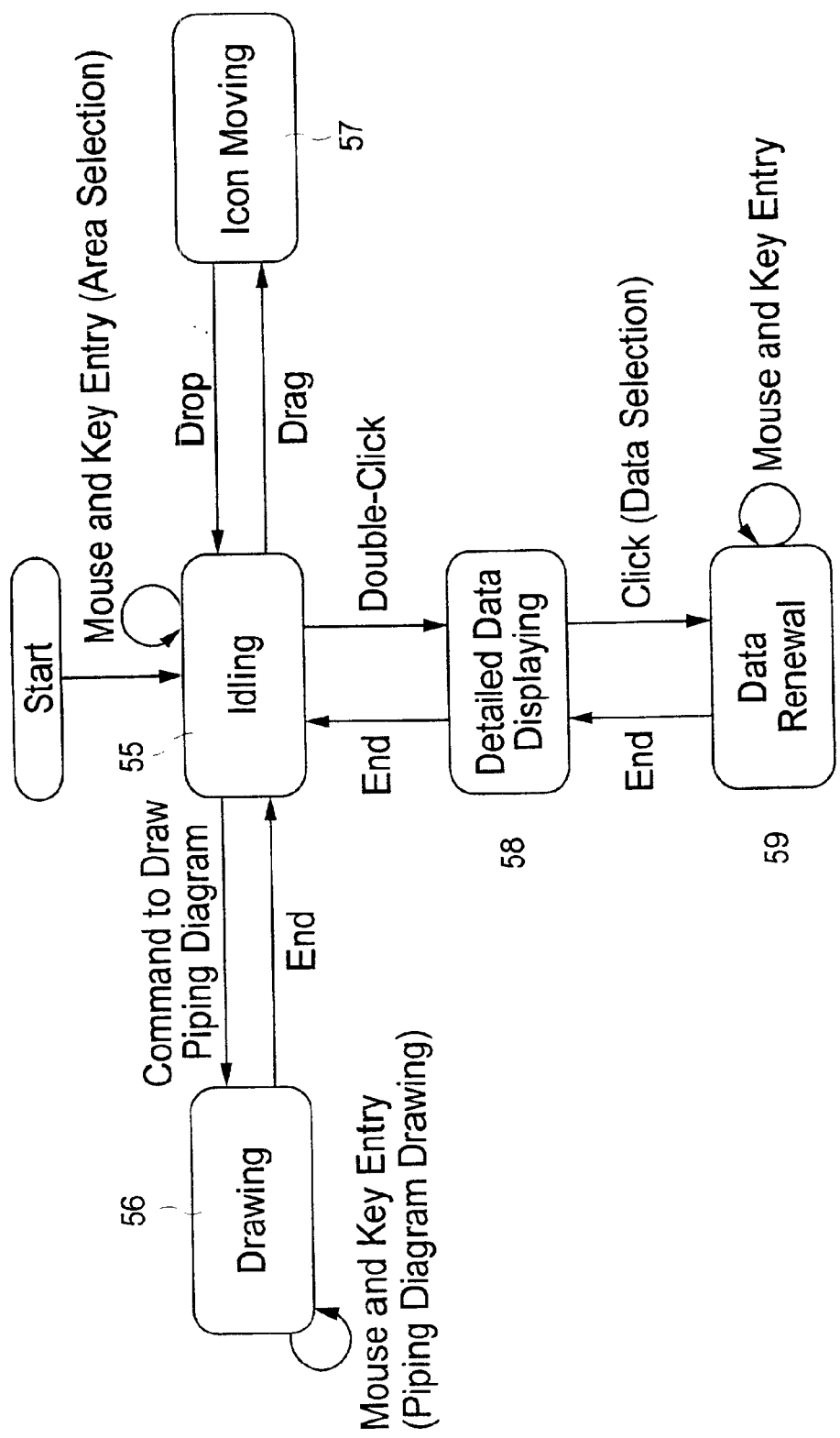
FIG. 26 is a state transition diagram schematically showing operation of the CPU of the management system to perform the functions shown in FIGS. 21 through 25.

The CPU 21 operates in accordance with the state transition diagram shown in FIG. 26 to realize the drawing of the piping diagram 35, the displaying of the icons 34, and 36–40 on the picture containing the piping diagram 35, and the displaying of the display window 45 with detailed trap data.

As shown in FIG. 26, the CPU 21 transits among an idling state 55, a piping diagram drawing step 56, an icon moving step 57, a detailed data displaying step 58 and a data renewal step 59.

First, the CPU 21 enters in the idling step 55 to await a command from the data entry section 22. An area to be supervised is selected by operating the data entry section 22, namely, by operating the mouse or keys on the keyboard.

Thereafter, a command to initiate the drawing of the piping diagram 35 is given with the mouse or keys, which causes the CPU 21 to enter the piping diagram drawing step 56. In the step 56, a desired piping diagram 35 is drawn in the manner as shown in FIG. 24 by means of the mouse and keys. The mouse or keys are used to notify the CPU 21 when the drawing of the piping diagram 35 is completed. Then, the CPU 21 returns to the idling step 55.

Thereafter, as indicated by the broken line arrow in FIG. 24, a desired icon 34 is selected and dragged in the idling step 55. When the dragging of the icon 34 is initiated, the CPU 21 shifts into the icon moving step 57. In the step 57, the CPU 21 moves the icon in response to the dragging. Then, the icon 34 (36) is dropped at the desired location on the piping diagram 35, the CPU 21 fixes it to that location and returns to the idling state 55.

As shown in FIG. 21, when a desired icon, e.g. the icon 36, is selected and double-clicked, the CPU 21 enters in the detailed data displaying step 58. In the detailed data displaying step 58, the CPU 21 calls the detailed data of the trap corresponding to the selected icon 36 from the memory 24, and, at the same time, displays the display window 45 on the screen as shown in FIG. 22. The CPU 21 displays the called detailed data in this display window 45. When a command to end the detailed data displaying step 58 is given through the mouse or keys to the CPU 21, the CPU 21 returns to the idling state 55.

In the detailed data displaying step 58, the cursor 23a may be moved onto one of the data boxes 45a displayed in the display window 45 and clicked. This puts the CPU 21 in the data renewal step 59. In the data renewal step 59, the CPU 21 changes the manner of displaying the selected data box 45a by, for example, reversing the characters and background, so that it is indicated that the data in the box

45a can be renewed. Then, the mouse or keys are operated to enter new data, and the data in the selected box 45a is renewed accordingly. Then, the CPU 21 returns to the detailed data displaying step 58.

As described above, according to the invention, it is easy to grasp the positional relationship among traps and the detailed data of the traps by simply seeing the piping diagram 35 and the icons 36–40, for example, disposed on it.

Since icons for defective traps are displayed in a different way from icons for "good" traps, it is also easy to identify such defective traps.

Furthermore, since any piping diagram can be drawn freely and since icons can be freely moved and disposed at any locations on the piping diagram, a variety of piping systems can be handled.

In the above-described example, a piping diagram is drawn on the display screen, but the plan of a plant may be drawn and icons for traps may be disposed on such plan. Alternatively, picture information, e.g. photos, of respective traps may be stored as part of detailed data of the respective traps in the memory 24, and the photos or picture information of traps may be displayed together with detailed data.

The management system 2 of the present invention has a function to determine in what order traps should be inspected and evaluated by the inspection and evaluation system 1 to provide the most efficient operation. The determination is made, using the detailed data of the respective traps.

The management program includes a trap inspecting and evaluating order determination program. The CPU 21 operates in the following manner in accordance with the management program.

Figure 27:
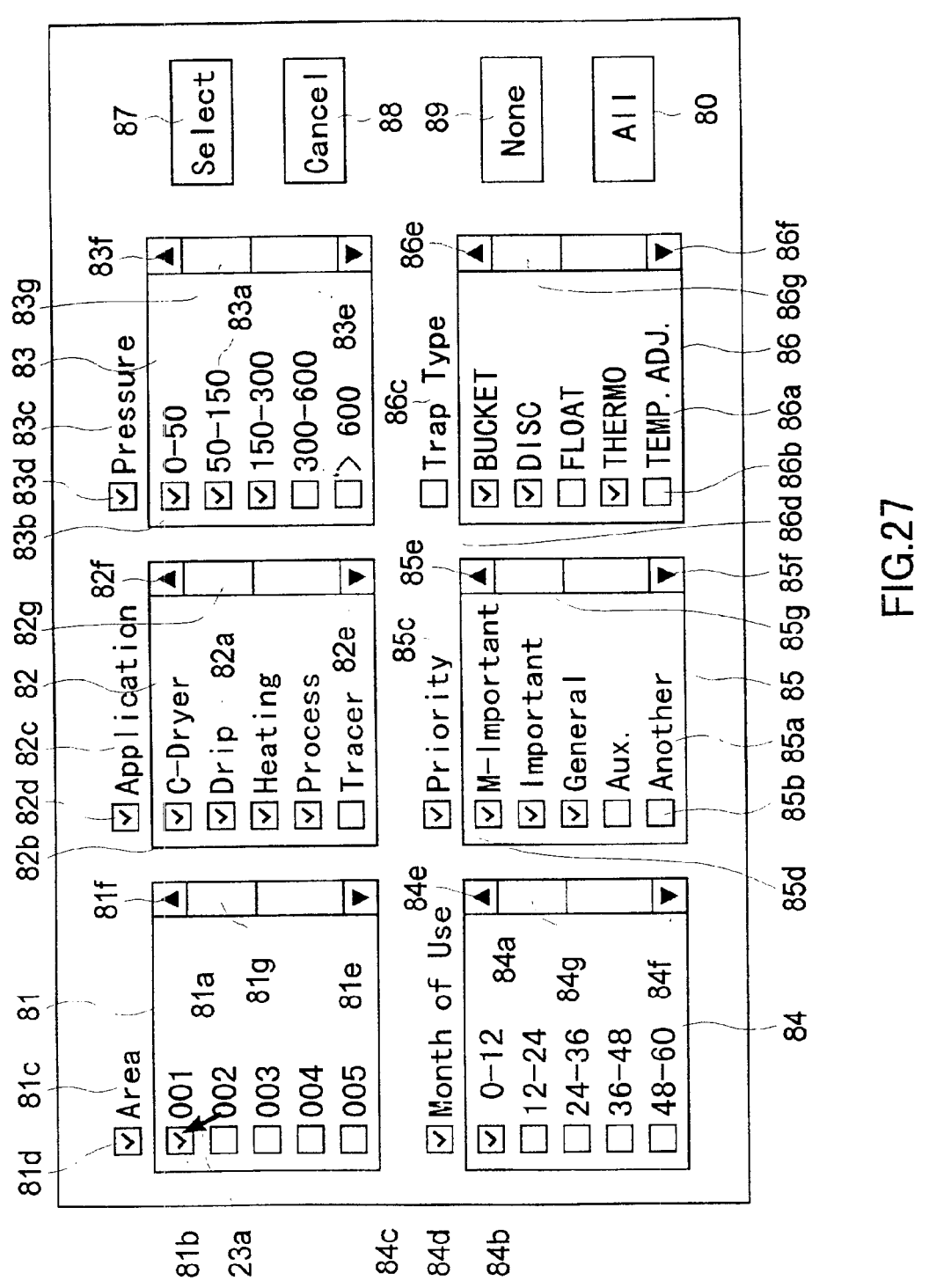

The CPU 21 first displays a picture like the one shown in FIG. 27 on the screen of the display 23. This picture is used to select traps to be inspected and evaluated. The picture includes six windows 81–86 arranged in two rows and three columns.

The upper left window 81 is used to select the area in which traps to be inspected are disposed. Area numbers 81a are displayed, being arranged vertically with square check boxes 81b on the left side of the respective area numbers.

When, for example, the area numbered 001 is to be selected, the cursor 23a is moved on the check box 81 for the area number "001", and the left button of the mouse is clicked to mark the box with a check, which indicates that the area "001", has been selected. More than one area may be selected instead.

Above the upper left corner of the window 81, a word "Area" 81c indicating that the window is an area selection window is displayed with a check box 81d disposed on its left. When the check box 81 is marked, the selection of areas made in the window 81 is made effective. The marking of the box 81d is made also by moving the cursor 23a and clicking the left button of the mouse. The check marks in the check boxes 81b and 81d, etc. can be removed by clicking the marked boxes again.

Arrow buttons 81e and 81f are disposed at the top and bottom ends of the right edge of the area selection window 81 for scrolling the display within the window 81. Either of the two buttons are pressed, the display scrolls upward or downward, so that that part of the display, e.g. the area number "006", which is not currently seen appears in the window 81. A scroll box 81g in a scroll bar extending between the two arrow buttons moves upward or downward as the display is scrolled. The scroll box 81g can be also used to scroll the display by moving the cursor 23a to the scroll box 81g and dragging up or down.

The middle window 82 in the upper row is an application selection window for selecting the application of traps to be inspected. In the window 82, plural applications of traps are displayed, including "C-Dryer" (for drying cylinders), "Drip" (for main piping), "Heating" (for heating rooms), "Process" (for processing piping) and "Tracer" (for measurement). Since the configuration of the window 82 is similar to the window 81, no detailed description is given, but the same letter is attached at the end of the reference numeral "82" for an item shown in the window 82 similar to the corresponding one in the window 81. For example, if traps used in a cylinder drying piping system, a main piping system, a heating piping system, and a processing piping system are to be inspected, check boxed 82b disposed on the right side of "C-Dryer", "Drip", "Heating" and "Process" are marked. To make the selection effective, the box 82d is marked with a check mark.

The window 83 is for steam pressures in the piping where traps to be inspected and evaluated are used. Indications are displayed within the window 83, including, for example, "0–50" (pressure not less than 0 psi but less than 50 psi), "50–150" (pressure not lower than 50 psi but lower than 150 psi), "150–300" (pressure not lower than 150 psi but lower than 300), "300–600" (pressure not lower than 300 psi but lower than 600 psi), and ">600" (pressure of 600 psi or higher). Since the configuration of the window 83, too, is similar to that of the window 81, its detailed description is not given, but the same letters are attached at the end of a reference numeral "83" for similar items. If traps used in a piping system having a steam pressure of from 0 psi but below 300 psi, for example, are to be inspected, the check boxes 83b on the right side of "0–50", "50–150" and "150–300" are marked.

The leftmost window 84 in the lower row is for the time periods during which traps to be inspected and evaluated have been used. The window 84 may contain displays of, for example, "0–12" (from zero to twelve months), "13–24" (from thirteen months to twenty-four months), "25–36" (from twenty-five months to thirty-six months), "37–48" (from thirty-seven months to forty-eight months) and "49–60" (from forty-nine months to sixty months). If traps which have been used for, for example, less than one year are to be inspected, the check box 84b on the right side of "0–12" is marked. Since the configuration of the window 84 is the same as that of the window 81, no detailed description is given, but the same letters are attached at the end of the reference numeral "84".

The central window 85 in the lower row is for priority or importance of traps to be inspected. In this window 85, displays, for example, "M-Important" (most important), "Important" (relatively important), "General", "Aux" (Auxiliary), and "Another" (important only in winter, for example). For inspecting the most important traps, relatively important traps and general traps, the check boxes 85b on the right side of "M-important", "Important" and "General" are marked. Since the configuration of the display window 85 is similar to that of the window 81, no more description about it is made, but the same letters are attached to the end of the reference numeral "85".

The rightmost window 86 in the lower row is for selecting trap types. The window 86 may contain displays of, for example, "BUCKET" (bucket-type traps), "DISC" (disc-type traps), "FLOAT" (float-type traps), "THERMO"

(thermostatic traps), and "TEMP. ADJ." (temperature-adjustable traps). For inspecting and evaluating bucket-type traps, disc-type traps and thermostatic-adjustable traps, the check boxes 86b in front of "BUCKET", "DISC" and "THERMO" are marked as shown. However, in the illustrated example, since the check box for "Trap Type" is not marked, traps of any types are subjected to selection. The configuration of the display window 86 is similar to that of the window 81, and, therefore, no more description about it is given, but the same letters are attached to the end of the reference numeral "86".

After selecting desired items in the respective windows 81–86, a button 87 identified as "Select" disposed on the right-hand side edge of the screen is pressed by moving the cursor 23a to the box 87 and clicking the left button on the mouse. Then, the CPU 21 searches the detailed data of traps including those shown in FIG. 13 for those data which meet all of the items set in the respective windows 81–86. For example, when the "select" button 87 is pressed with the setting of items as shown in FIG. 27, the CPU 21 searches for traps which are used in the area No. 001, are used in cylinder drying piping, main piping, heating piping and processing piping systems with the steam pressure therein being zero or higher but lower than 300 psi, have been used for twelve months or less, and are classified as "most important", "relatively important" or "ordinary".

If a button 88 identified as "Cancel" below the "Select" button 87 is pressed instead of the "Select" button 87, the CPU 21 ends the display of the picture of FIG. 27. If a button 89 labeled as "None" disposed below the "Cancel" button 88 is pressed, all the settings made are cleared so that all the check marks in the check boxes disappear. If a button 80 below the "None" button 89 is pressed, all the check boxes 81b, 82b, 83b, 84b, 85b and 86b are marked.

Figure 28:
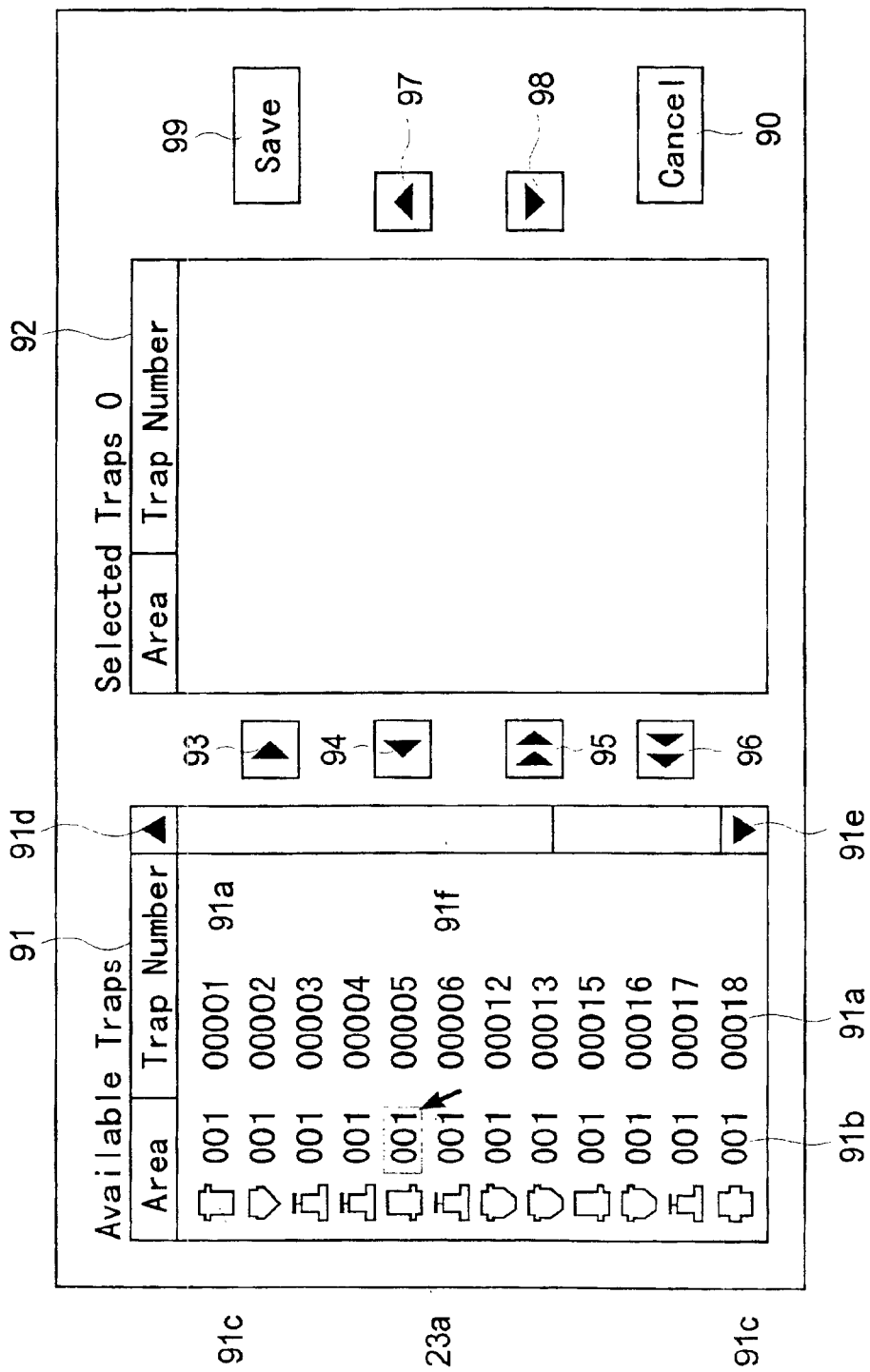
FIG. 28 shows the display displaying a result of retrieving traps meeting the set conditions shown in FIG. 27.

After the searching by the CPU 21 is completed, the CPU 21 changes the display to one like the display shown in FIG. 28. This picture includes the trap numbers 91a, such as "00001", of the traps to be inspected, and the area numbers of the areas selected (the area number "001" in the illustrated example), which are searched for, using the display of FIG. 27. The picture of FIG. 28 is used to determine the order of inspection of the selected traps.

The picture includes two display windows 91 and 92 arranged horizontally adjacent to each other. The trap management numbers 91a of the traps found are displayed in the window 91. The trap numbers are arranged downward in an increasing order with the smallest number being disposed uppermost. On the left side of each trap number, the area number 91b of the area in which that trap is disposed is displayed. Furthermore, on the left side of that area number, an icon 91c having a shape representing the type of that trap is displayed. The display in the window 91 can be scrolled, using arrow buttons 91d and 91e and a scroll box 91f, in a similar manner as described for the window 81 shown in FIG. 27.

If it is desired to inspect the trap having a trap number of "00005" first, the cursor 23a is moved to the area number 91b on the left side of the number "00005", and the mouse button is clicked. It causes the reversal of the display of the area number, by which one can know that the trap having a trap number of "00005" has been selected.

Figure 29:
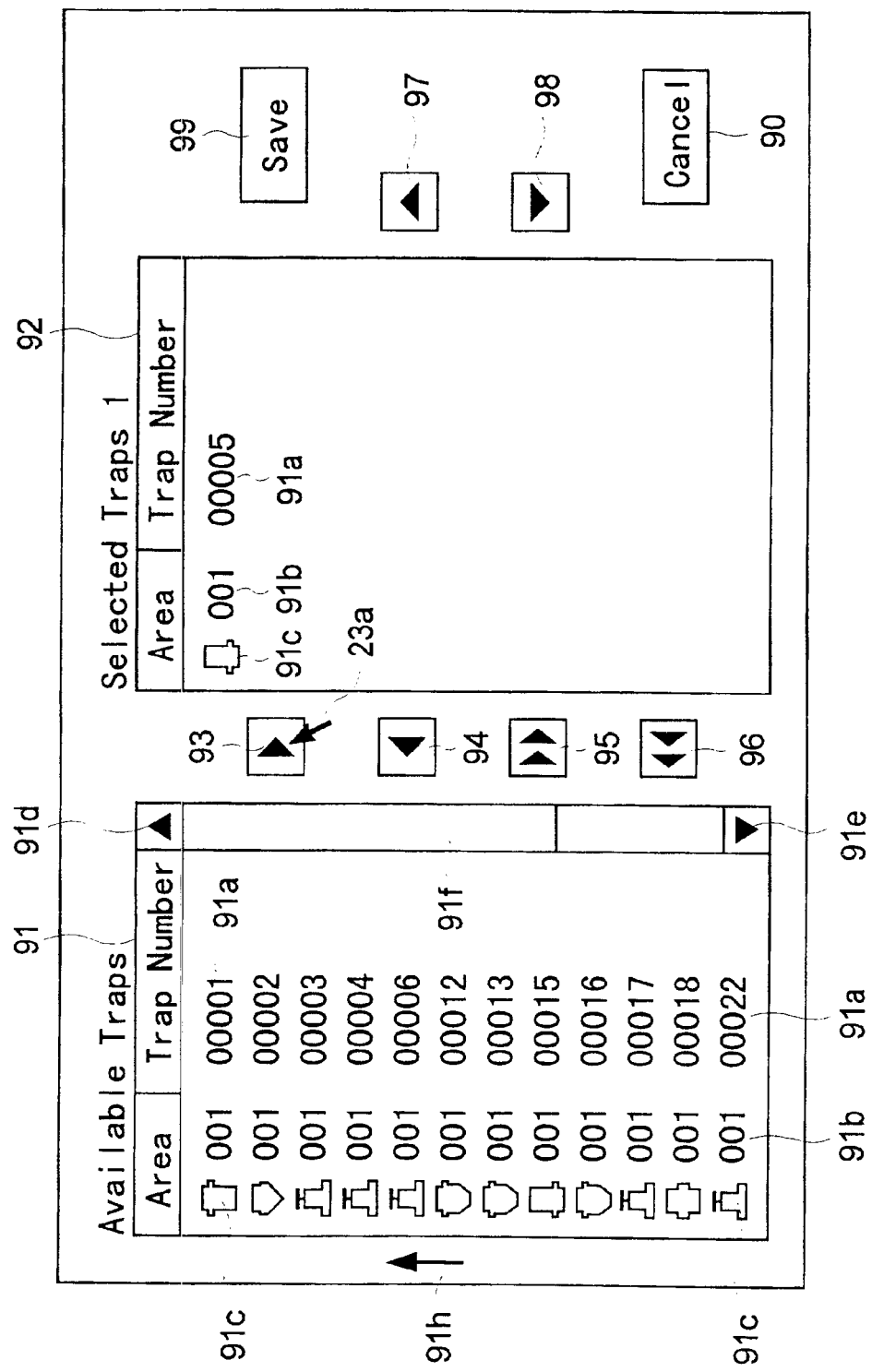
FIG. 29 illustrates how the retrieved data are re-arranged.

Then, the cursor 23a is moved onto the uppermost one 93 of four arrow buttons 93–96 displayed in the space between the windows 91 and 92, and the button 93, which is directed rightward, is pressed or clicked, using the mouse, as shown in FIG. 29. This causes the trap number "00005", the associated area number "001", and the associated icon to be moved from the left window 91 to the right window 92. At the same time, in the window 91, larger trap numbers 91a which have been displayed below the moved trap number "00005", and their associated area number 91b and icons 91c are shifted upward, as indicated by an arrow 51h in FIG. 29.

The indication "Selected Traps 1" above the window 92 indicates that the number of traps selected is one.

Figure 30:
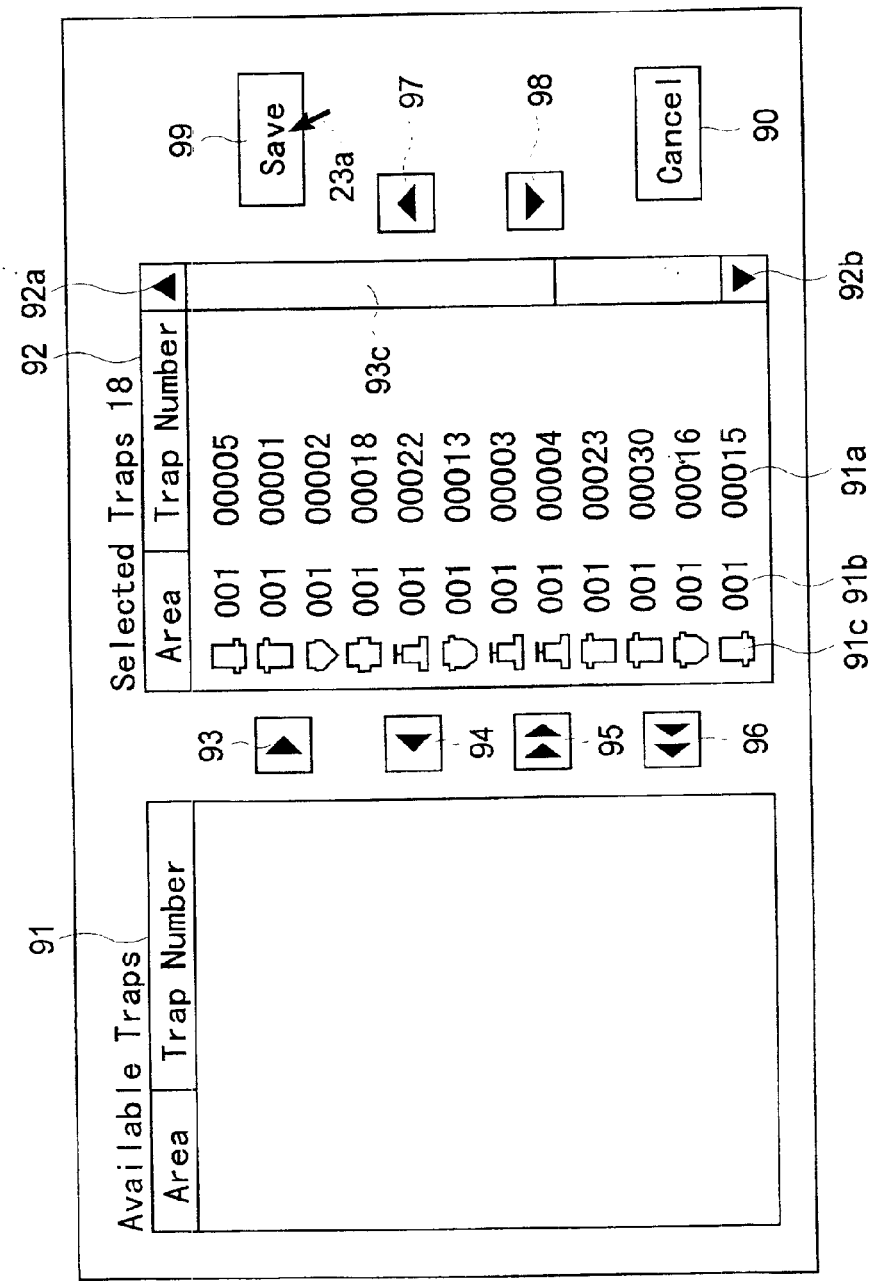
FIG. 30 shows retrieved data after they are re-arranged.

The same processing is repeated for all the remaining traps in the window 91 in the desired order of inspection, which results in a display as exemplified in FIG. 30. In the display window 92, the trap numbers 91a, their area numbers 91b and their icons 91c are displayed, being arranged vertically downward in the selected order. The number of selected traps, e.g. "18", is displayed as "Selected Traps 18". The window 91 is now empty.

When the number of trap numbers 91a, area numbers 91b and icons 91c which have been moved into the display window 92 becomes so large that all of them cannot be displayed in the screen, buttons 92a and 92b with upward and downward arrows and a scroll box 92c are automatically displayed at the right edge of the window 92, as shown in FIG. 30. By the arrow buttons 92a and 92b and the scroll box 92c, the display can be scrolled upward or downward. On the other hand, when it is no longer necessary to scroll the display in the window 91, the arrow buttons 91d and 91e and the scroll box 91f automatically disappear from the screen.

Although not shown in detail in FIG. 30, if it is desired to change the order of arrangement of the trap numbers in the window 92, the cursor 23a is moved to the area number 91b for the trap number 91a of the trap to be moved. Then, the left button on the mouse is clicked, which reverses the display of the area number 91b. After that either one of the upward and downward oriented arrow buttons 97 and 98 is pressed, which causes the selected trap management number 91a to move upward or downward. In this way, the order of the selected traps and, hence, the order of inspection of the selected traps can be changed.

For removing any of the traps in the window 92, the cursor 23a is moved to the area number in front of the trap number of the trap to be removed. Then, the left button on the mouse is clicked, which causes the reversal of the display of the area number. After that, the button 94 with a leftward oriented arrow on it displayed in the area between the windows 91 and 92 is pressed. This causes the management number 91 of the trap to be removed from the list in the window 92, its area number 91b and its icon 91c are moved back into the display window 91. Thus, the selection of the desired trap is cancelled.

If the messages displayed in the window 91 should be moved into the display window 92 all at once, rather than one by one, a button 95 with two rightward oriented arrows displayed in the area between the windows 91 and 92 is pressed, which causes all the displays in the window 91 to be moved into the window 92 at once.

If it is desired that the displays in the window 92 be removed to the display window 91 all at once, a button 96 with two leftward oriented arrows is pressed.

When the re-arranging of the traps to be inspected has been completed, a button 99 with a display of "Save" displayed in the right side portion of the window 92 is pressed, as shown in FIG. 30. Then, the CPU 21 operates to save or store the result of the re-arrangement in the memory 24, whereby the order of inspecting the traps by the inspection and evaluation system 1 is determined. If a button 90 with "Cancel" is pressed instead of the button 99, the CPU 21 stops the inspection order determination.

With the arrangement shown in FIGS. 27 and 28, a button 80 with an indication of "All" shown in FIG. 27 may be pressed to select (i.e. search) all the detailed data. After that, desired ones can be selected from them, using the display shown in FIG. 28.

Figure 31:
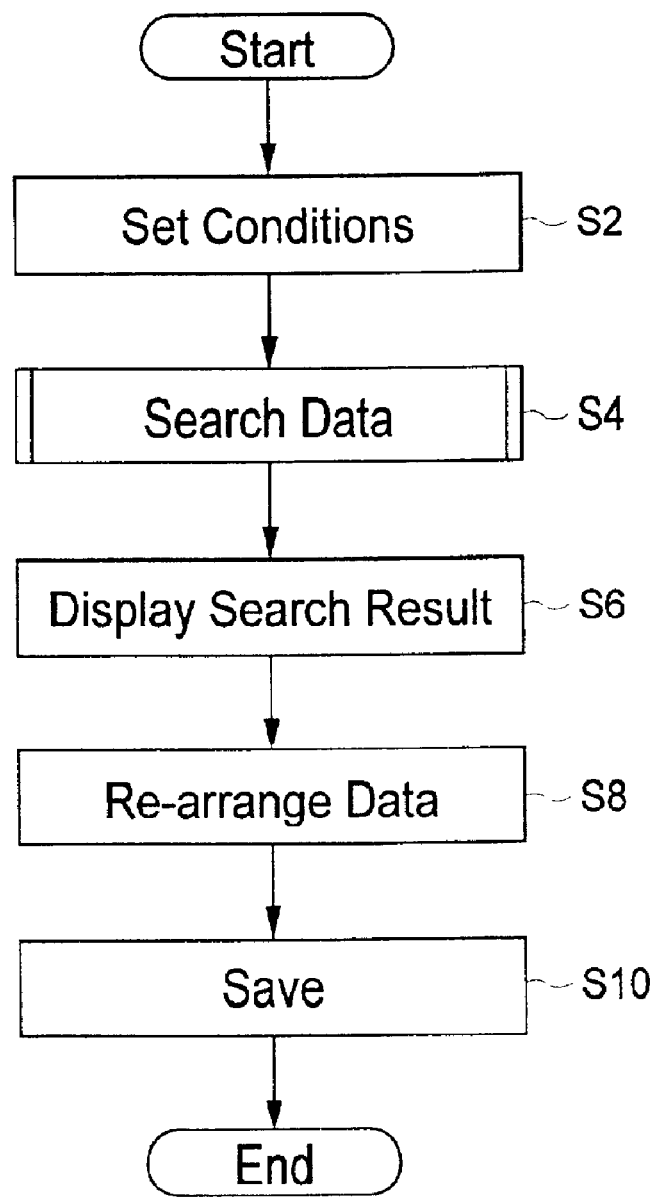
FIG. 31 is a flow chart illustrating operation of the CPU of the management system to perform the functions shown in FIGS. 27 through 30.
Figure 32A:
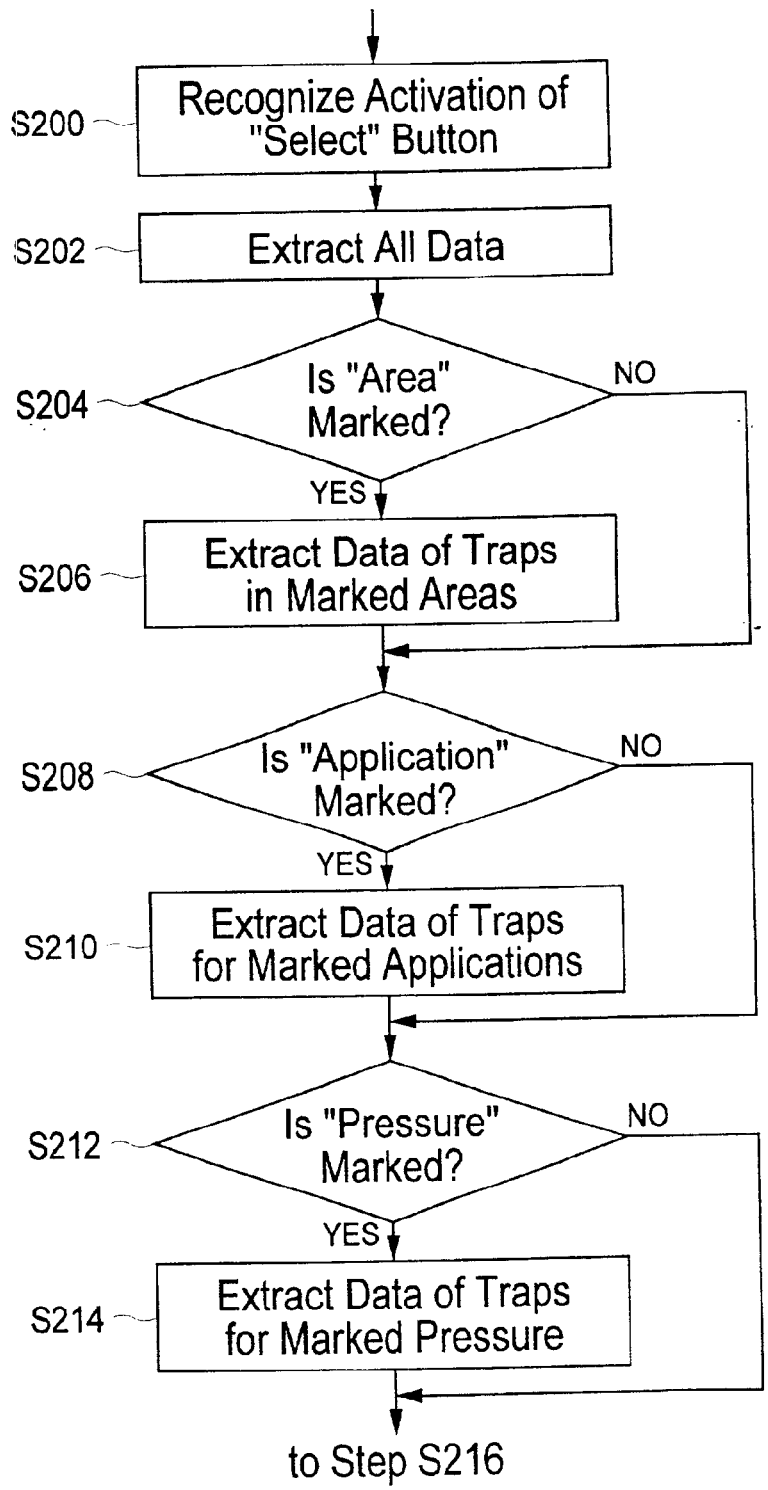
FIGS. 32A and 32B show a flow chart illustrating the data retrieving steps of FIG. 31 in greater detail.
Figure 32B:
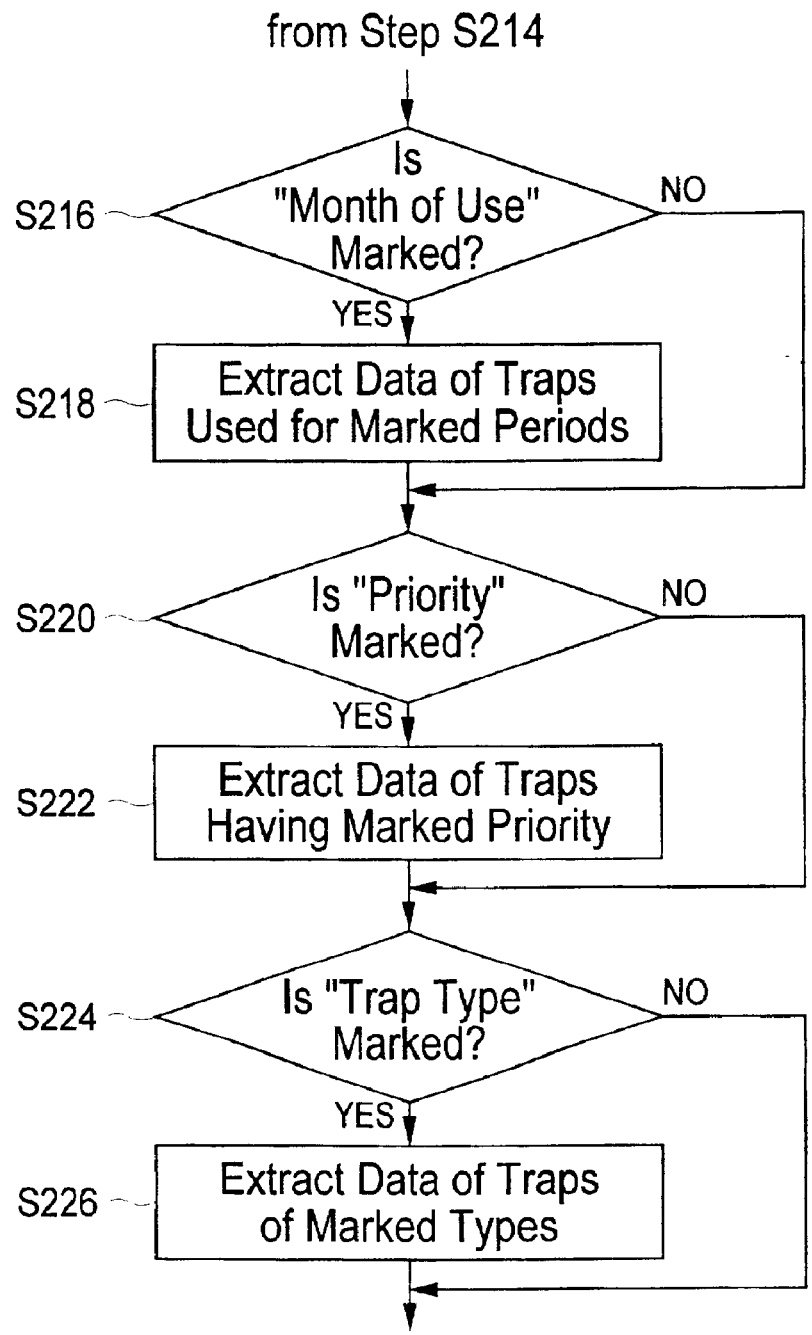

The operation of the CPU 21 of the management system 2 to determine the order of trap inspection can be expressed in the form of the flow chart shown in FIG. 31.

First, various conditions for searching for traps to be selected are determined in the manner described with reference to FIG. 27 (Step S2). Then, the "Select" button 87 is pressed to make the CPU 21 search detailed data of traps out of the data stored in the memory 24 according to the determined conditions (Step S4). The search may be executed in accordance with a flow chart shown in FIGS. 32A and 32B, for example.

Upon recognition of the pressing of the "Select" button 87 in Step S200, the CPU 21 extracts the detailed data of all the traps (Step S202).

Next, the CPU 21 checks if the check box 81d in front of the message "Area" in FIG. 27 is marked with a check mark (Step S204). If the box 80d is marked (i.e. the answer is YES), the CPU 21 extracts, from the detailed data of all the traps extracted in Step S202, the data including the marked area number(s) displayed in the area selection window 81 (Step S206). The extracted data are now to be searched in the following step. If it is found that the check box 81d for "Area" is not marked (i.e. the answer is NO), the CPU 21 skips Step S206 to Step S208.

In Step S208, the CPU 21 checks if the check box 82d for "Application" above the box 82 in FIG. 27 is marked with a check. If it is, i.e. if the answer is YES, the CPU 21 extracts from the data from Step S206 or the data from Step S204, the data of traps of which the application(s) is marked in the application window 82 are extracted (Step S210). If it is found in Step S208 that the check box 82d for "Application" is not marked (i.e. the answer is NO), the CPU 21 skips Step S210 to Step 212.

In Step S212, the CPU 21 checks if the check box 83d for "Pressure" shown above the box 83 in FIG. 27 is marked. If it is (i.e. if the answer is YES), the CPU 21 extracts from the data from Step S210 or the data from Step S208, the data of traps which are used in piping systems having a steam pressure(s) marked in the pressure window 83 shown in FIG. 27 (Step S214). The extracted data is now subject to the processing in Step S216. If the check box 83d is not marked, the CPU 21 skips Step S214 to Step S216.

In Step S216, the CPU 21 checks if the check box 84d for "Month of Use" above the window 84 in FIG. 27 is marked with a check. If the box 84d is marked (i.e. if the answer is YES), the CPU 21 extracts, from the data from Step S214 or the data from Step S212, the data of traps which have been used for time periods marked in the window 84 (Step S218). If the check box 84d is not marked (i.e. the answer is NO), the CPU 21 skips Step S218 to Step S220.

In Step S220, the CPU 21 checks if the check box 85d for "Priority" displayed above the window 85 in FIG. 27 is marked. If the box 85d is marked, i.e. if the answer to the question in Step S220 is YES, the CPU 21 extracts, from the data from Step S218 or the data from Step S216, the data of traps having priority marked in the window 85 (Step S222). If, on the other hand, the check box 85d is not marked (i.e. if the answer is NO), the CPU skips Step S222 to Step S224.

In Step S224, the CPU 21 checks if the check box 86d for "Trap Type" displayed above the window 86 in FIG. 27 is marked with a check mark. If the box 86d is marked (i.e. if the answer to the question in Step S224 is YES), the CPU 21 extracts, from the data from Step S222 or the data from Step 220, the data of traps of the trap type(s) marked in the window 86 (Step S226). Then, the CPU 21 ends the data searching step S4 (FIG. 31). On the other hand, if it is found in Step S224 that the check box 86d is not marked (i.e. the answer is NO), the CPU 21 skips Step S226 and ends the searching step S4.

Then, the CPU 21 displays the result of the search made in Step S4 in the form as shown in FIG. 28 (Step S6). The data displayed include the trap management numbers 91a, the area numbers 91b and the icons 91c of the traps of which detailed data have been extracted in accordance with flow chart shown in FIGS. 32A and 32B. The extracted data are re-arranged in the manner as described with reference to FIGS. 28 and 30 (Step S8), and the re-arranged data are stored in the memory 24 (Step S10) to end the management program based on the flow chart of FIG. 31.

According to the present invention, the trap inspection order determined in the above-described manner in the management system 2 can be transferred to the inspection and evaluation system 1 and checked on the system 1.

Specifically, after the trap inspection order is determined in the management system 2, the management system 2 is connected to the inspection and evaluation system 1 by the cable 3, as shown in FIG. 1. Then, the inspection and evaluation system 1 is conditioned for receiving data from the management system 2 in a manner not described in detail. After that, data is transferred from the management system 2 to the inspection and evaluation system 1. Now, the trap inspection order is stored in the memory 16 of the inspection and evaluation system 1. The stored data of trap inspection order include at least the trap management numbers, the area numbers and the trap model names.

After the trap inspection order is transferred to the inspection and evaluation system 1, the engagement system 2 is separated from the inspection and evaluation system 1 by removing the cable 3. After that, the inspection and evaluation of traps are initiated with the inspection and evaluation system 1.

Figure 33:
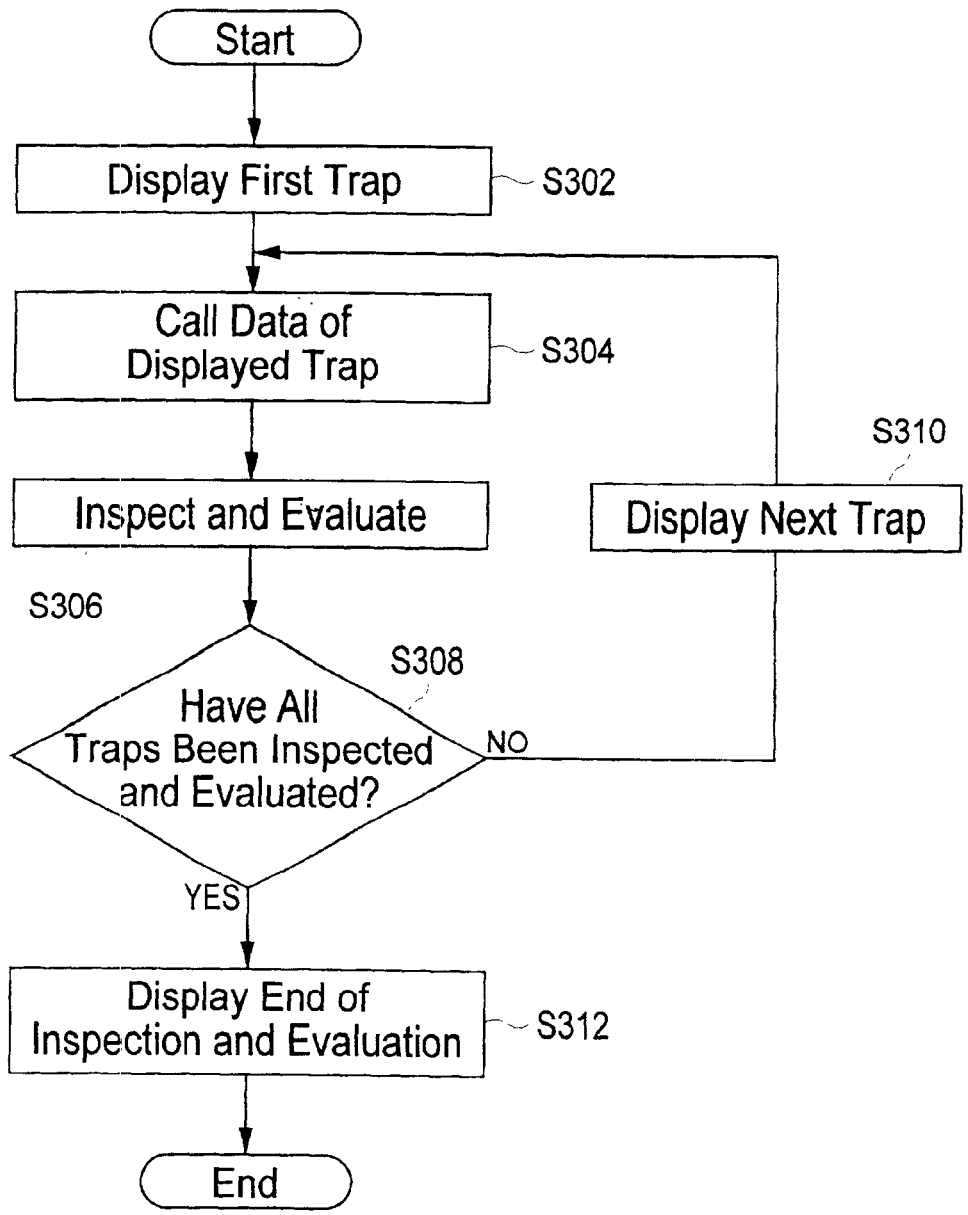
FIG. 33 is a flow chart illustrating the operation of the CPU of the inspection and evaluation system controlled in accordance with an inspection and evaluation order determined in the management system.

FIG. 33 shows a flow chart of the operation of the CPU 13 of the inspection and evaluation system 1. The program shown in FIG. 33 is stored in the control program region 163 in the memory 16 of the inspection and evaluation system I as part of the control program.

First, the CPU 13 displays, on the display 17, the area and management numbers of the first one of the traps transmitted in the order determined in the management system 2, in the form as shown in FIG. 5 (Step S302). Specifically, letters "NO." followed by the area number 171 and the trap management number 172 with a hyphen disposed between the numbers 171 and 172, are displayed in the upper row. In the lower row of the display, letters "MODEL" and the trap model name 173 are displayed.

The CPU 13 calls the correlation data D for the displayed trap model name 173 from the trap data shown in FIG. 3 (Step S304). Then, an operator urges the probe 1 against the surface of the housing of the first trap (not shown) to be inspected, to thereby initiate the inspection and evaluation (Step S306). In case of the example shown in FIG. 5, the trap to be inspected first is of a model name "JKL", has a management number "00005" and is used in an area having an area number "001".

Whether or not the inspection and evaluation of all the traps are finished is checked (Step S308). If the answer to the question made in Step S308 is NO, which means that there is another trap to be inspected, the CPU 13 displays the area number 171, the trap management number 172 and the model name of the trap to be inspected and evaluated next, on the display 17 (Step S310). Then, the CPU 13 returns to Step S304. The processing provided in Step S304 through Step S308 is repeated until all of the selected traps are inspected and evaluated.

When all of the selected traps have been inspected and evaluated, i.e. if the answer to the question in Step S308 is YES, the CPU 13 displays a message (not shown) indicating that all the traps have been inspected and evaluated, on the display 17 (Step S312). Then, the operation illustrated in FIG. 33 ends.

As described above, according to the invention, only desired ones of a number of traps used in a plant can be selected and arranged in a desired order for inspection. Thus, efficient inspection and evaluation of traps can be realized.

In the inspection and evaluation system 1, each time a trap is inspected and evaluated, the area number 171, the trap management number 172 and the model name 173 of the next trap to be inspected are displayed on the display 17. Thus, the operator can easily know which trap should be inspected next. At the same time, the correlation data D for the displayed trap is automatically set for use in inspecting and evaluating that trap. In other words, there is no need for the operator to take any special steps for calling the required correlation data D.

In the above, six conditions have been described as bases for searching for traps to be inspected. They are the area number, the application or use of traps, the steam pressure, the time period traps have been used, the priority or importance of traps, and trap types. But the conditions need not be limited to those discussed above. For example, a trap model name, a manufacturer, a level (height) at which traps are disposed, an operating condition of the piping system including traps (e.g. whether the piping system is continuously operated or intermittently operated) etc. may be used as the bases.

Although the described program is to search for data of traps which meet all the set conditions, but the program may be arranged to search for data of traps which meet at least one of the set conditions.

In the described example, the order of extracted traps to be inspected is changed manually, but the re-arrangement of data may be done automatically on the basis of, for example, positional relationship among the traps as shown in FIG. 21. For example, traps may be arranged automatically in accordance with the distance from the entrance to a particular plant.

In the above-described example, the trap to be inspected is displayed on the display 17, but it may be output in the form of sound. For example, the trap to be inspected may be announced through a loudspeaker disposed in association with the inspection and evaluation system 1.

The CPU 13 and 21 of the inspection and evaluation system 1 and the management system 2 have been described to operate in the manners as represented by the flow charts shown in FIGS. 33 and 31, respectively. However, they can be operated in different manners only the same effects can be obtained.

In the described example, the steam pressure in the interior of a trap is determined indirectly by detecting the temperature of the surface of the housing of that trap. However, if the exact steam pressure in the trap can be known, it may be manually input through the data entry section or keys 18. The use of exact steam pressures can provide more exact trap evaluation than using indirectly obtained steam pressures. Further, if high exactness is not required in evaluation, only measurements of vibrations may be used in evaluating traps or computing the amount of steam leakage.

The present invention has been described by means of systems for inspecting and evaluating and managing steam traps, but the present invention may be equally applied to systems for other traps, such as air traps and gas traps. Further, the present invention may be applied to systems for inspecting and evaluating and managing other devices, such as valves and rotary machines.

The management system 2 need not be a personal computer, but it may be constructed as a dedicated system.

Though the inspection and evaluation system 1 and the management system 2 have been described as being separate systems, but they may be integrated in a single system.

What is claimed is:

1. An equipment management system for managing devices forming equipment, comprising:
   a detailed data memory section having stored therein detailed data of the respective devices;
   a display having a display screen;
   a first display control section causing a representation of the equipment to be displayed on the display screen and also causing at least one of symbols corresponding to the respective devices to be displayed on the display screen at locations on the representation of the equipment;
   a symbol selecting section selecting a desired one of the symbols displayed on the display screen; and
   a second display control section calling detailed data corresponding to the selected symbol from the detailed data memory section and causing the called detailed data to be displayed on the display screen, wherein none of the detailed data for non-selected symbols is displayed.

2. The equipment management system according to claim 1 wherein:
   the detailed data of the device includes one of first judgment data indicating that the device is operating normally and second judgment data indicating that the device is not operating normally; and
   the first display control section causes a symbol of a device, for which the detailed data contains one of the first and second judgment data, to be displayed in a different manner than a symbol of a device for which the detailed data contains the other of the first and second judgment data.

3. The equipment management system according to claim 1 wherein:
   the first display control section includes an equipment representation display control section displaying the equipment representation on the display screen in response to an externally applied representation drawing command, and a symbol display control section displaying a symbol at a desired position on the equipment representation on the display screen in response to an externally applied symbol positioning command.

4. The equipment management system according to claim 1 wherein the equipment is a piping system, and the devices are traps of different types disposed in the piping system.

5. A computer-readable record medium having recorded therein an equipment management program which is executed by a computer including a display having a display screen for managing a plurality of devices constituting equipment, the equipment management program causing the computer to execute:

a first display sequence for displaying a representation of the equipment on the display screen and also displaying a symbol for at least one of the devices at an appropriate position on the equipment representation on the display screen;

a symbol selecting sequence for selecting a desired one of the symbols displayed on the display screen; and a second display sequence for calling detailed data of the device corresponding to the selected symbol out of detailed data stored beforehand and displaying the called detailed data on the display screen, wherein none of the detailed data for non-selected symbols is displayed.

6. The computer-readable record medium according to claim 5 wherein:

the detailed data of the device includes one of first judgment data indicating that the device is operating normally and second judgment data indicating that the device is not operating normally; and the first display control section causes a symbol of a device for which the detailed data contains one of the first and second judgment data to be displayed in a different manner than a symbol of a device for which the detailed data contains the other of the first and second judgment data.

7. The computer-readable record medium according to claim 5 wherein:

the first display sequence includes an equipment representation displaying sequence for displaying the equipment representation on the display screen in response to an externally applied representation drawing command, and a symbol displaying sequence for displaying a symbol at a desired position on the equipment representation on the display screen in response to an externally applied symbol positioning command.

8. The computer-readable record medium according to claim 5 wherein the equipment is a piping system, and the devices are traps of different types disposed in the piping system.

9. An equipment management method for managing devices forming equipment, comprising:

storing detailed data of the respective devices;

causing a representation of the equipment to be displayed on a display screen and also causing at least one of symbols corresponding to the respective devices to be displayed on the display screen at locations on the representation of the equipment;

selecting a desired one of the symbols displayed on the display screen; and calling detailed data corresponding to the selected symbol and causing the called detailed data to be displayed on the display screen, wherein none of the detailed data for non-selected symbols is displayed.

10. The equipment management method according to claim 9 wherein:

the detailed data of the device includes one of first judgment data indicating that the device is operating normal and second judgment data indicating that the device is not operating normal; and wherein the method further comprises:

causing a symbol of a device of which the detailed data contains one of the first and second judgment data to be displayed in a different manner than a symbol of a device of which the detailed data contains the other of the first and second judgment data.

11. The equipment management method according to claim 9 further comprising:

displaying the equipment representation on the display screen in response to an externally applied representation drawing command, and displaying a symbol at a desired position on the equipment representation on the display screen in response to an externally applied symbol positioning command.

12. An equipment management method for managing equipment including a plurality of devices, comprising:

displaying a representation of equipment on a display screen and also displaying a symbol for at least one of the devices at an appropriate position on the equipment representation on the display screen;

selecting a desired one of the symbols displayed on the display screen; and calling detailed data for the selected device out of detailed data stored beforehand and displaying the called detailed data on the display screen, wherein none of the detailed data for non-selected symbols is displayed.

13. The method according to claim 12 wherein:

the detailed data of the device includes one of first judgment data indicating that the device is operating normal and second judgment data indicating that the device is not operating normal; and the method further comprising causing a symbol of a device of which the detailed data contains one of the first and second judgment data to be displayed in a different manner than a symbol of a device of which the detailed data contains the other of the first and second judgment data.

14. The method according to claim 12 further comprising:

displaying the equipment representation on the display screen in response to an externally applied representation drawing command, and displaying a symbol at a desired position on the equipment representation on the display screen in response to an externally applied symbol positioning command.

* * * * *